US012321801B2

(12) United States Patent
Finn et al.

(10) Patent No.: US 12,321,801 B2
(45) Date of Patent: *Jun. 3, 2025

(54) ENCAPSULATING A METAL INLAY WITH THERMOSETTING RESIN AND METHOD FOR MAKING A METAL TRANSACTION CARD

(71) Applicant: Metaland LLC, Doral, FL (US)

(72) Inventors: David Finn, Fussen Weissensee (DE); Darren Molloy, Killour (IE); Daniel Pierrard, Killour (IE)

(73) Assignee: Metaland LLC, Doral, FL (US)

( * ) Notice: Subject to any disclaimer, the term of this patent is extended or adjusted under 35 U.S.C. 154(b) by 30 days.

This patent is subject to a terminal disclaimer.

(21) Appl. No.: 17/903,886

(22) Filed: Sep. 6, 2022

(65) Prior Publication Data
US 2023/0086189 A1 Mar. 23, 2023

Related U.S. Application Data

(63) Continuation-in-part of application No. 17/882,568, filed on Aug. 7, 2022, and a continuation-in-part of
(Continued)

(51) Int. Cl.
G06K 19/02 (2006.01)
B29C 45/14 (2006.01)
G06K 19/077 (2006.01)

(52) U.S. Cl.
CPC .. *G06K 19/07724* (2013.01); *B29C 45/14647* (2013.01)

(58) Field of Classification Search
CPC ......... G06K 19/07749; G06K 19/0723; G06K 19/077; G06K 19/07; G06K 19/07722;
(Continued)

(56) References Cited

U.S. PATENT DOCUMENTS 9,475,086 B2 * 10/2016 Finn ...................... B23K 26/361
9,836,684 B2 * 12/2017 Finn ................. G06K 19/07722
(Continued)

FOREIGN PATENT DOCUMENTS

CN 111684466 * 9/2020 ........... G06K 19/077
WO 0178021 * 10/2001 ............... G07C 9/00

OTHER PUBLICATIONS

Foreign Patent.*

*Primary Examiner* — Daniel St Cyr
(74) *Attorney, Agent, or Firm* — Michael D. Eisenberg

(57) ABSTRACT

Metal layers (650, 730, 750, 830, 850) of a smartcard (SC, 600, 700, 800) have module openings (614, 712, 714, 812, 814) for receiving a transponder chip module (TCM). Thermosetting resin (TR, 668B, 768A, 768B, 868A, 868B) coats (encapsulates) the bottom surfaces and fills the module openings of the metal layers. A first metal layer (650, 750, 850) may have a slit (S; 620, 720B, 820) which may also be filled by the thermosetting resin. A second metal layer (ML, 730) disposed above the first metal layer (750) may have a slit (S, 720A) which may also be filled by the thermosetting resin. A booster antenna circuit (BAC, 844) may be disposed between the first and second metal layers, with magnetic shielding material (842) disposed between the booster antenna circuit and the second metal layer (730).

11 Claims, 19 Drawing Sheets

Related U.S. Application Data application No. 17/882,569, filed on Aug. 7, 2022, and a continuation-in-part of application No. 17/866,547, filed on Jul. 17, 2022, now Pat. No. 11,948,036, and a continuation-in-part of application No. 17/857,912, filed on Jul. 5, 2022, and a continuation-in-part of application No. 17/839,521, filed on Jun. 14, 2022, now abandoned.

(60) Provisional application No. 63/349,106, filed on Jun. 5, 2022, provisional application No. 63/345,430, filed on May 25, 2022, provisional application No. 63/334,671, filed on Apr. 26, 2022, provisional application No. 63/283,561, filed on Nov. 29, 2021, provisional application No. 63/241,005, filed on Sep. 6, 2021.

(58) Field of Classification Search
CPC ........... G06K 19/07758; G06Q 20/357; G06Q 20/3278; G06F 3/044
USPC ............... 235/487, 492, 486, 462.46, 472.02
See application file for complete search history.

(56) References Cited

U.S. PATENT DOCUMENTS

| | | | |
|---|---|---|---|
| 2010/0012817 A1* | 1/2010 | Vogel | H10K 59/60 250/201.1 |
| 2013/0126622 A1* | 5/2013 | Finn | H05K 3/103 29/601 |
| 2015/0180229 A1* | 6/2015 | Herslow | G06K 19/07749 156/60 |
| 2021/0049431 A1* | 2/2021 | Finn | G06K 19/07722 |

* cited by examiner (FIG. 3D of US 9,898,699)

Dual Interface (DI) Metal Core Smartcard (SC)

Transponder Chip Module (TCM)

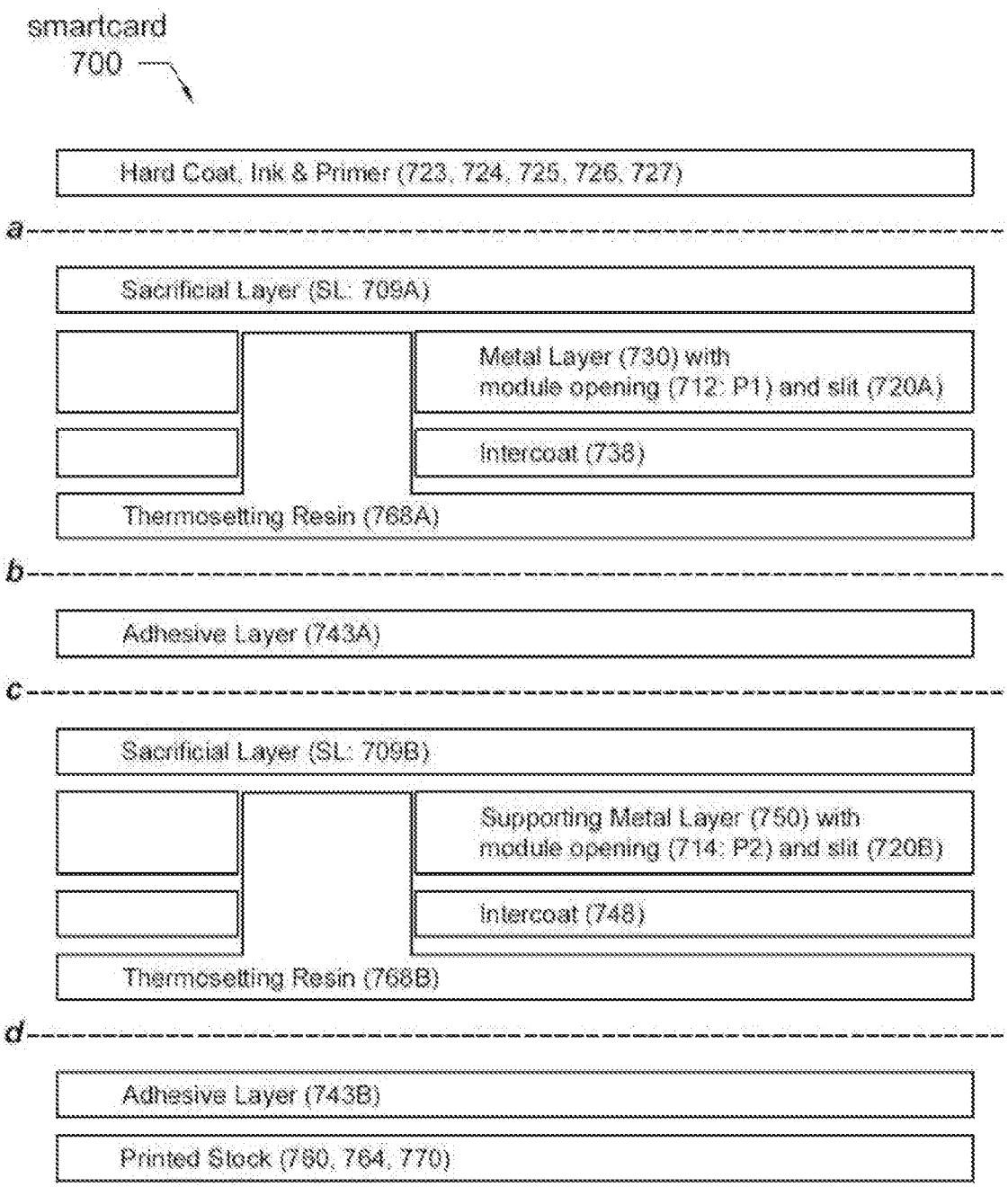

Dual Interface (DI) Metal Face Smartcard (SC) with Booster Antenna Circuit (BAC)

ENCAPSULATING A METAL INLAY WITH THERMOSETTING RESIN AND METHOD FOR MAKING A METAL TRANSACTION CARD

CROSS-REFERENCES TO RELATED APPLICATIONS

This application is:
a continuation-in-part of Ser. No. 17/882,569 filed 7 Aug. 2022
Ser. No. 17/882,569 is a non-provisional of 63/349,106 filed 5 Jun. 2022
Ser. No. 17/882,569 is a non-provisional of 63/345,430 filed 25 May 2022
Ser. No. 17/882,569 is a non-provisional of 63/334,671 filed 26 Apr. 2022
Ser. No. 17/882,569 is a non-provisional of 63/283,561 filed 29 Nov. 2021
Ser. No. 17/882,569 is a non-provisional of 63/241,005 filed 6 Sep. 2021
a continuation-in-part of Ser. No. 17/882,568 filed 7 Aug. 2022
Ser. No. 17/882,568 is a non-provisional of 63/349,106 filed 5 Jun. 2022
Ser. No. 17/882,568 is a non-provisional of 63/345,430 filed 25 May 2022
Ser. No. 17/882,568 is a non-provisional of 63/334,671 filed 26 Apr. 2022
Ser. No. 17/882,568 is a non-provisional of 63/283,561 filed 29 Nov. 2021
Ser. No. 17/882,568 is a non-provisional of 63/241,005 filed 6 Sep. 2021
a continuation-in-part of Ser. No. 17/866,547 filed 17 Jul. 2022
a continuation-in-part of Ser. No. 17/857,912 filed 5 Jul. 2022
a continuation-in-part of Ser. No. 17/839,521 filed 14 Jun. 2022
a non-provisional of 63/349,106 filed 5 Jun. 2022
a non-provisional of 63/345,430 filed 25 May 2022
a non-provisional of 63/334,671 filed 26 Apr. 2022
a non-provisional of 63/283,561 filed 29 Nov. 2021
a non-provisional of 63/241,005 filed 6 Sep. 2021

FIELD OF THE INVENTION

The present invention relates generally to smartcards (or transaction cards) and, more particularly, to a transaction card having a metal layer and a laser-cut module opening in the metal layer, with the metal layer encapsulated on at least one side with a thermosetting resin, and the module opening further filled with said resin, and later implanting of a chip module in a milled-out cavity in the fully cured resin. The hardened resin provides mechanical support to the chip module and electrical insulation from the metal layer. The transaction card may be "dual-interface" (DI)—capable of both contact and contactless functionality (communication with an external reader).

BACKGROUND

FIG. 2A of US 2013/0126622 (23 May 2013; David Finn; Finn) shows an exemplary stack-up (sequence of layers) for a metallized smart card 200, having the following layers, structures and components. Exemplary dimensions may be presented. All dimensions are approximate. Thickness refers to vertical dimension in the figure.

A top layer 202 may be a metal (or metallized) layer 202, such as 250 μm thick stainless steel
A layer 203 of adhesive, such as 40 μm thick of polyurethane
A layer 204 of ferrite material, such as 60 μm thick sheet of soft (flexible) ferrite
A layer 205 of adhesive, such as 40 μm thick of polyurethane
A layer 208 of plastic material, such as 50-100 μm thick PVC
A layer 210 of plastic material, such as 150-200 μm thick PVC
Wire 212, such as 112 μm diameter wire, forming the booster antenna (BA) with coupler coil (CC)
A layer 214 of plastic material, such as 150 μm thick PVC, which may include printing, magnetic stripe, etc.
A layer 216 of plastic material, such as 50 μm thick PVC, which may serve as an overlay
The overall thickness of the smart card 200 (layers 202, 203, 204, 208, 210, 214, 216) may be approximately 810 μm (0.81 mm).

As shown in FIG. 2A of US 2013/0126622, prior art metal transaction card with a front face metal layer, has used a layer 204 of ferrite material between the metal layer 202 and the internal antenna 212 of the card to shield the antenna from the deleterious effect of the metal layer. Polyurethane layers (40 μm) bond the ferrite layer to the metal layer and to an underlying plastic layer. However, the ferrite layer tends to delaminate under wear and tear, and when subject to temperature and humidity. The ferrite material is also quite expensive. It is therefore desirable to provide a metal transaction card having a metal layer, in which the ferrite material does not extend to the edges of the metal card body.

An example of a metal transaction card having a ferrite layer disposed between a front face metal layer and in-card antenna structure wherein the ferrite layer on the backside of the front face metal layer does not extend to the perimeter edge of the metal layer may be found in U.S. Pat. No. 9,898,699 (20 Feb. 2018; CompoSecure; Herslow et al.).

Implanting a transponder chip module in a laser-cut module opening in a front face metal layer previously filled with a thermosetting resin and allowed to fully cure, before machining (CNC milling) the hardened resin to create a recess or pocket to accept the implanting of the chip module is described in a plethora of patent applications: U.S. Ser. No. 17/839,521 (14 Jun. 2022; Finn et al.), U.S. Ser. No. 17/857,912 (5 Jul. 2022; Finn et al.), U.S. Ser. No. 17/866,547 (17 Jul. 2022; Finn et al.), U.S. Ser. No. 17/882,568 (7 Aug. 2022; Finn et al.) and U.S. Ser. No. 17/882,569 (7 Aug. 2022; Finn et al.).

Laser-cutting the module opening in the front face metal layer instead of milling the metal layer to create the module opening significantly reduces the machining time, but also eliminates the need to use expensive coated milling tools which have a short tool life in the application. In the case of a laser-cut module opening, a separation channel of a given width between the metal and the position of the milled-out recess or pocket in the resin intended for the implanting of the transponder chip module would ensure that the milling tool does not come in contact with the metal. The separation channel may also have the dual purpose of improving contactless communication.

An example of a metal transaction card having a separation channel between the metal edges in a module opening in a front face continuous metal layer and the module antenna of a transponder chip module to permit contactless communication may be found in FIG. 18A of U.S. 63/283, 561 (29 Nov. 2021; Finn) entitled "RFID Enabled Metal Transaction Cards".

The separation channel creates a gap between the metal edges in the module opening and the implanted transponder chip module. With the transponder chip module implanted in the milled-out recess or pocket in the hardened resin which has filled the module opening in the front face metal layer of the metal transaction card, the module antenna of the transponder chip module inductively couples with an underlying discontinuous metal layer (with slit) or inductively couples with the coupler coil of a booster antenna circuit.

It is an object of the current invention to encapsulate a metal layer in a metal card body with thermosetting resin and filling any openings, apertures, voids, recesses or gaps in the metal layer with said resin using conventional techniques for encapsulation.

An example of a smartcard having electronic components encapsulated with polymeric material may be found in U.S. Pat. No. 6,241,153 (5 Jun. 2001; CardXX; Tiffany), U.S. Pat. No. 7,220,615 (22 May 2007; Micron Technology; Bolken), U.S. Pat. No. 7,225,537 (5 Jun. 2007; CardXX; Reed), U.S. Pat. No. 8,012,809 (6 Sep. 2011; CardXX; Reed), U.S. Pat. No. 8,324,021 (4 Dec. 2012; CardXX; Reed), U.S. Pat. No. 9,916,992 (13 Mar. 2018; Dynamics; Mullen et al.) and U.S. Pat. No. 11,392,860 (19 Jul. 19 2022; Dynamics; Mullen et al.)

Some Patents and Publications of Interest

The following patents and/or publications ("references") may be of interest or relevant to the invention(s) disclosed herein, and some commentary may be provided to distinguish the invention(s) disclosed herein from the following references.

U.S. Pat. No. 9,898,699 (20 Feb. 2018; CompoSecure; Herslow et al.), entitled "Smart metal card with radio frequency (RF) transmission capability", incorporated by reference herein, discloses a ferrite material utilized in a smart metal card as a shield between a metal layer and an antenna does not occupy a complete layer. Instead, only sufficient ferrite material is utilized to track and conform to the antenna.

Claim 1 of U.S. Pat. No. 9,898,699
A smart metal card comprising:
a plastic layer having a top surface;
a metal layer overlying the plastic layer, said metal layer having an inner surface;
a groove formed within the inner surface of said metal layer;
antenna windings disposed within said groove and wound along the top surface of or within said plastic layer; and
a strip of ferrite material lining said groove and disposed between the inner surface of the metal layer and the antenna windings, said strip of ferrite material overlying the antenna windings and limited to a length and a width sufficient to track the underlying antenna windings to form an RF shield between the antenna windings and the metal layer.

U.S. Ser. No. 17/839,521, entitled "RFID Enabled Metal Transaction Cards", incorporated by reference herein, discloses a metal transaction card comprising a front face continuous metal layer and a rear continuous metal layer sandwiching electronic component elements adhesively attached to each other using a thermosetting adhesive coating (epoxy or polyurethane) or a thermosetting adhesive film layer (epoxy or polyurethane). The thermosetting adhesive coating or film (epoxy or polyurethane) may be applied in B-stage, and converted to C-stage after a lamination process involving selected temperature and pressure profiles over a specific cycle time.

U.S. Ser. No. 17/857,912, entitled "Contactless Metal Cards With Fingerprint Sensor", incorporated by reference herein, discloses a biometric transaction card with a metal chassis wherein a first continuous or discontinuous metal layer is coated on one side with a chemical bonding agent (primer) followed by a coating of thermosetting resin of a defined thickness filling any opening, void, recess or slit in the first metal layer, and a second continuous or discontinuous metal layer is also coated on one side with a chemical bonding agent (primer) followed by a coating of thermosetting resin of a defined thickness filling any opening, void, recess or slit in the second metal layer, wherein both resin coated metal layers are joined together using a thermosetting adhesive film layer placed between the cured thermosetting resin layers in a hot press lamination process. The thermosetting adhesive film layer may be replaced by a coating of primer to one or both resin coated metal layers.

A dual interface chip module and or a fingerprint touch sensor (or components) may be implanted in milled-out pockets in the thermosetting resin. Removed metal sections may also be encased in (by) the thermosetting resin.

A rear side of the front continuous metal layer may be surface treated and coated with an adhesion promoter to enhance the adhesion of the thermosetting resin to the metal. The surface may be chemically etched, or sand blasted resulting in a "scuffed-up" surface. The metal surface may undergo chemical treatment as a metal finishing process. The adhesion promoter may be a thermosetting adhesive coating, a thermosetting adhesive film layer or a primer (chemical bonding agent) acting as an interface. After the deposition of the adhesive promoter, the thermosetting resin may be applied, seeping into any opening, aperture, void, cavity or recess, and encapsulating the entire area to a defined thickness.

U.S. Ser. No. 17/866,547, entitled "RFID Enabled Metal Transaction Cards", incorporated by reference herein, discloses a method for producing a metal transaction card having a front face metal layer (continuous) and a rear metal layer (discontinuous) sandwiching a magnetic shielding layer assembled to a booster antenna circuit for contactless communication separated by a resin spacing layer, wherein the metal layers and magnetic shielding layer are coated with a thermosetting resin (e.g., epoxy or polyurethane) by means of a roll coating process or any suitable over-molding process such as casting, and wherein a layer of thermosetting resin is applied to the primed surface of a metal layer with an array of card body sites forming a metal inlay having a resin thickness which can be mechanically reduced after final curing; the roll coating process also fills any pockets, channels or recesses in the metal layer with thermosetting resin; the roll coating process in addition fills any voids or holes in the magnetic shielding layer, the PET carrier layer for the booster antenna circuit and any subsequent synthetic or adhesive layers in the stack-up construction; the roll coating process further fills any openings or slits in the intermediate discontinuous metal layer covered by a sacrificial layer on one side. Optionally, thermosetting resin can be dispensed into any pocket, channel or recess in any of the layers forming a metal card body.

The metal transaction card may comprise a front face continuous or discontinuous metal layer and may have a layer of polyurethane (PU) resin upon which graphic elements may be digitally (inkjet) printed (primer and ink) thereon. The polyurethane resin may be further doped to facilitate laser engraving or marking of its polymer surface for the purpose of personalization. Prior to the application of the polyurethane resin, the metal layer may be surface treated and primed. The polyurethane resin may be a two-component, low viscosity, semi-flexible PU compound with the physical properties (mix ratio (w/w): polyol/isocyanate, viscosity (mPa*s, or millipascal seconds), density (g/cm³), pot life (min), gel-time (min), curing time (hr) and final cure (days)) determining the adhesion, hardness and tensile strength of the compound.

U.S. Ser. No. 17/882,568, entitled "RFID Enabled Metal Transaction Cards", incorporated by reference herein, discloses a metal transaction card having a front face "continuous" (no slit) or "discontinuous" (with slit) metal layer having a module opening for accepting a dual interface chip module. Coating thermosetting resin (e.g., epoxy or polyurethane) may be used to replace (in lieu of) conventional thermosetting adhesive film layers and plastic slugs or plugs, and to fill module openings, apertures, voids and recesses in layers of the card body. A booster antenna circuit, comprising of a perimeter coil, coupler coil and a capacitor bank on a polyethylene terephthalate (PET) carrier layer, disposed behind the magnetic shielding, may be encapsulated in a thermosetting resin. The magnetic shielding layer and the PET carrier layer may have voids to allow for inductive coupling. The thermosetting resin may further fill and seal the module opening in the front face continuous metal layer and any apertures, voids or recesses in subsequent layers. The resin may fill and seal any discontinuity (in the form of a slit) or opening in a rear discontinuous metal layer. The dual interface chip module may be implanted in a milled-out cavity in the thermosetting resin. Flexible glass may be laminated to a resin coated discontinuous metal layer or the flexible glass may be submerged in a layer of thermosetting resin to enhance the mechanical strength of the glass assembled on the front face metal layer.

For the purpose of clarity, a layer of thermosetting resin may be used in combination with a film layer of thermosetting adhesive. A thermosetting adhesive film layer may be used as an adhesion promoter to bond thermosetting resin to a layer of metal or may be used as a bonding interface between a cured thermosetting resin layer and a synthetic print layer. An adhesion promoter in the form of a primer (chemical bonding agent) and or a thermosetting adhesive coating may be used to laminate a cured thermosetting resin layer to a synthetic printed layer of PVC with graphic artwork.

A method of manufacturing a metal transaction card having a front face metal layer with a module opening to accept the implanting of a dual interface chip module and additional layers of thermosetting adhesive film and synthetic material may comprise: applying an adhesion promoter comprising a primer layer to a rear surface of the front face metal layer; and allowing the primer layer to dry; wherein the adhesion promoter further comprises an adhesive top-coat; further comprising: applying the adhesive top-coat onto the dried primer layer; and coating the top-coat with thermosetting resin. The thermosetting resin may be applied by a process of roll coating or slot nozzle coating. At least some of the layers may have openings, apertures, voids, or cavities; and the thermosetting resin may seep into the openings, apertures, voids, or cavities. The thermosetting resin may encapsulate an entire area of the transaction card to which it is applied to a defined thickness.

The adhesion promoter may comprise a chemical bonding agent (primer) acting as an interface, or a two-coat adhesive formulation. The adhesion promoter may be deposited by spraying, dipping, rod coating or screen printing. The thermosetting resin, when cured, may contribute to the smartcard exhibiting a metallic sound when tossed on a hard surface.

After the thermosetting resin is fully cured, at least one of the following steps may be performed: back-lapping the cured thermosetting resin to reduce its thickness; laser etching or mechanically engraving the cured thermosetting resin; and printing on the cured thermosetting resin. The cured thermosetting resin may be receptive to ink.

The thermosetting resin may be filled with glass fiber for increased strength. The thermosetting resin may be colored with a pigment.

Prior to applying the primer layer, a surface treatment may be performed on the rear surface of the front metal layer to produce a scuffed-up surface. The surface treatment may comprise chemically etching or sand blasting the rear surface of the front metal layer.

In filling and sealing any openings, apertures, voids or cavities in any metal layer or any subsequent layer in the card construction, the front face and rear face surfaces of the metal card body are devoid of any indents or dimples. Synthetic printed layers assembled to a metal layer may not reveal any deformations at the position of the openings, apertures, voids or cavities post lamination.

U.S. Ser. No. 17/882,569, entitled "Coating and Filling Openings in a Metal Inlay And Method for Making a Metal Transaction Card", incorporated by reference herein, discloses a method of covering an opening, an aperture, a void or a slit at each site in an array of card body positions in a layer of metal forming a metal inlay (typically in a 16- or 25-up format), using a sacrificial layer to create a pocket, cavity, recess or channel. The pockets, cavities, recesses or channels created by the presence of the sacrificial layer on one side (front side) of the layer of metal may be further sealed using a non-conductive polymeric material such as a thermosetting resin (e.g., epoxy or polyurethane). The thermosetting resin may be transparent or pigmented. The side (front side) of the layer of metal disposed with the sacrificial layer is further protected from surface scratches which may occur from general handling, conveying and production processing.

A thermosetting adhesive film layer on a release liner may be applied to the same side of the layer of metal in which the thermosetting resin is applied (rear side). The thermosetting adhesive film layer on a release liner may have cut-outs matching approximately the dimensional and geometrical positions of the pocket, cavity, recess or channel (in the x and y axis) at each card body site. The thermosetting adhesive film layer in B-stage may be bonded to the layer of metal (rear side) by application of heat and pressure over time to convert to C-stage.

The thermosetting resin (e.g., epoxy or polyurethane) may be roll coated to the cured thermosetting adhesive film layer to a defined thickness, encapsulating or encasing the entire side of the layer of metal with the thermosetting resin (rear side), and simultaneously filling and sealing the pockets, cavities, recesses or channels. The encapsulation layer may be further compressed with a pressure plate to remove gases. The cured thermosetting resin may facilitate the retention of the drop acoustics of the layer of metal in a final laminated metal card body.

The fully cured thermosetting resin in a hardened state may be machined (back-lapped) to reduce the overall thickness on the side of the layer of metal (rear side) encapsulated by the resin.

The sacrificial layer may comprise a protective release film with low tack adhesive such as polyethylene film tape or plasticized PVC film. The sacrificial layer may be polytetrafluoroethylene (PTFE, Teflon®).

After removal of the sacrificial layer from the layer of metal (front side), an unscratched metal surface is revealed with openings (module openings) sealed with fully cured thermosetting resin.

The fully cured thermosetting resin in each (module) opening at each card body site in the array may be CNC milled to create a stepped recess for later embedding of a chip module. The front side of the layer of metal may be roll coated with a transparent thermosetting resin by first applying an adhesion promoter in the form of a primer (chemical bonding agent) and or a thermosetting adhesive coating, shrouding the entire front side with resin.

U.S. Ser. No. 17/882,569 further discloses a metal inlay comprising a layer of metal defining a plurality of card body sites (typically an array of 16 or 25 card body positions) on the layer of metal, each card body site corresponding to a single metal card body, performing a laser or water cutting operation to form corner struts extending from corners of the card body sites to the metal inlay, with void sections extending around sides of the card body sites except for where the card body site is supported by the corner struts of the metal inlay and filling the void sections with thermosetting resin. In addition, forming a module opening at each card body site and filling the openings with the thermosetting resin. In a further production step, synthetic layers (e.g., sheets of adhesive film, PVC with printed artwork and protective overlay material) are laminated to the encapsulated metal inlay, followed by singulation of the card body sites by removing the struts through cutting or punching.

Some Additional References

The following patents and/or publications ("references") may be of interest or relevant to the invention(s) disclosed herein, and some commentary may be provided to distinguish the invention(s) disclosed herein from some of the following references.

| | |
|---|---|
| 11,068,770 | Connection bridges for dual interface transponder chip modules |
| 10,599,972 | Smartcard constructions and methods |
| 10,552,722 | Smartcard with coupling frame antenna |
| 10,518,518 | Smart cards with metal layer(s) and methods of manufacture |
| 10,248,902 | Coupling frames for RFID devices |
| 10,193,211 | Smartcards, RFID devices, wearables and methods |
| 9,960,476 | Smart card constructions |
| 9,836,684 | Smart cards, payment objects and methods |
| 9,812,782 | Coupling frames for RFID devices |
| 9,798,968 | Smartcard with coupling frame and method of increasing activation distance of a transponder chip module |
| 9,697,459 | Passive smartcards, metal cards, payment objects and smart jewelry |
| 9,634,391 | RFID transponder chip modules |
| 9,622,359 | RFID transponder chip modules |
| 9,489,613 | RFID transponder chip modules with a band of the antenna extending inward |
| 9,475,086 | Smartcard with coupling frame and method of increasing activation distance of a transponder chip module |
| 9,390,364 | Transponder chip module with coupling frame on a common substrate for secure and non-secure smartcards and tags |
| 2018/0339503 | Smartcards with metal layer(s) and methods of manufacture |
| 2018/0341846 | Contactless metal card constructions |
| 2019/0114526 | Smartcard constructions and methods |
| 2019/0171923 | Metallized smartcard constructions and methods |
| 2019/0197386 | Contactless smartcards with multiple coupling frames |
| 2019/0392283 | RFID transponder chip modules, elements thereof, and methods |
| 2020/0005114 | Dual interface metal hybrid smartcard |
| 2020/0034578 | Smartcard with display and energy harvesting |
| 2020/0050914 | Connection bridges for dual interface transponder chip modules |
| 2020/0151534 | Smartcards with metal layers and methods of manufacture |
| 2020/0226443 | Smartcard with a booster antenna and a wireless connection between modules |
| 2020/0250504 | Manufacturing metal inlays for dual interface metal cards |
| 2020/0250506 | Smartcard constructions and methods |
| 2020/0257953 | Contactless smartcards with coupling frames |
| 2020/0327387 | Smartcard with a coupling frame and a wireless connection between modules |
| 2020/0387768 | Contactless metal card constructions |
| 2021/0056374 | Transponder chip module with module antenna(s) and coupling frame(s) |
| 2021/0056375 | Smart cards with metal layer(s) and methods of manufacture |
| 2021/0182650 | Smartcards with Multiple Coupling Frames |
| 2021/0192311 | Coupling frames for smartcards with various module opening shapes |
| 2021/0192312 | Smart Cards with Metal Layer(s) and Methods of Manufacture |
| 2021/0256341 | Smart Cards with Metal Layer(s) and Methods of Manufacture |

U.S. Pat. No. 11,250,305 (15 Feb. 2022; Finn)
U.S. Pat. No. 11,113,593 (7 Sep. 2021; Finn)
US 2021/0049431 (18 Feb. 2021; Finn)
US 2021/0049439 (E117) (18 Feb. 2021; Finn), issued as U.S. Pat. No. 11,113,593
US 2021/0073608 (E119v2) (11 Mar. 2021; Finn), issued as U.S. Pat. No. 11,347,993
US 2021/0081743 (18 Mar. 2021; Finn et al.)
US 2021/0081748 (18 Feb. 2021; Finn)
US 2021/0110231 (15 Apr. 2021; Finn)
US 2021/0117744 (22 Apr. 2021; Finn et al.)

US 2021/0150294 (20 May 2021; Finn) issued as U.S. Pat. No. 11,341,385 (24 May 2022; Finn)
US 2021/0174159 (10 Jun. 2021; Finn)
US 2021/0216838 (E112v1) (15 Jul. 2021; Finn), issued as U.S. Pat. No. 11,250,305
US 2021/0350198 (FCS 019) (11 Nov. 2021; Finn), issued as U.S. Pat. No. 11,315,003

Some Additional References

U.S. Pat. No. 6,452,563 (17 Sep. 2002; Gemplus aka Gemalto; Porte)
U.S. Pat. No. 6,491,229 (10 Dec. 2002; NJC Innovations; Berney)
U.S. Pat. No. 7,306,163 (11 Dec. 2007; IBM; Scholz et al.)
U.S. Pat. No. 7,701,350 (20 Apr. 2010; Hitachi; Sakama, et al.)
U.S. Pat. No. 8,186,582 (29 May 2012; American Express; Varga et al.)
U.S. Pat. No. 8,393,547 (12 Mar. 2013; Perfect Plastic Printing; Kiekhaefer et al.)
U.S. Pat. No. 8,523,062 (3 Sep. 2013; American Express; Varga et al.)
U.S. Pat. No. 8,608,082 (17 Dec. 2013; Oberthur Technologies, aka IDEMIA; La Garrec et al.)
U.S. Pat. No. 8,725,589 (13 May 2014; JPMorgan Chase; Skelding et al.)
U.S. Pat. No. 8,737,915 (27 May 2014; J.H. Tonnjes E.A.S.T.; Beenken)
U.S. Pat. No. 9,024,763 (5 May 2015; Hamedani Soheil)
U.S. Pat. No. 9,299,020 (29 Mar. 2016; TheCard; Zimmerman et al.)
U.S. Pat. No. 9,390,366 (12 Jul. 2016; CompoSecure; Herslow et al.)
U.S. Pat. No. 9,564,678 (7 Feb. 2017; Murata Manufacturing; Kato et al.)
Reference is also made to U.S. Pat. Nos. 8,976,075, 9,203,157 and 9,231,305.
U.S. Pat. No. 9,721,200 (1 Aug. 2017; CompoSecure; Herslow et al.)
U.S. Pat. No. 9,760,816 (12 Sep. 2017; American Express; Williams et al.)
U.S. Pat. No. 9,836,687 (5 Dec. 2017; American Express; Williams et al.)
U.S. Pat. No. 9,881,247 (30 Jan. 2018; Le Garrec et al.)
U.S. Pat. No. 9,898,699 (20 Feb. 2018; CompoSecure; Herslow et al.)
U.S. Pat. No. 10,089,570 (2 Oct. 2018; CompoSecure; Herslow et al.)
U.S. Pat. No. 10,140,569 (27 Nov. 2018; Kim et al.)
U.S. Pat. No. 10,275,703 (30 Apr. 2019; CompoSecure; Herslow et al.)
U.S. Pat. No. 10,289,944 (14 May 2019; CompoSecure; Herslow et al.)
U.S. Pat. No. 10,318,859 (11 Jun. 2019; CompoSecure; Lowe, et al.)
U.S. Pat. No. 10,445,636 (15 Oct. 2019; Giesecke & Devrient; Virostek et al.)
U.S. Pat. No. 10,534,990 (14 Jan. 2020; CompoSecure; Herslow et al.)
U.S. Pat. No. 10,583,683 (10 Mar. 2020; Federal Card Services; Ridenour et al.)
U.S. Pat. No. 10,748,049 (18 Aug. 2020; CompoSecure; Herslow et al.)
U.S. Pat. No. 10,885,419 (5 Jan. 2021; CompoSecure; Lowe et al.)
U.S. Pat. No. 11,151,437 (19 Oct. 2021; CompoSecure; Lowe et al.)
U.S. Pat. No. 11,182,662 (23 Nov. 2021; CompoSecure; Lowe)
US 2011/0181486 (28 Jul. 2011; Murata; Kato), reference is also made to US 2011/0186641
US 2012/0112971 (10 May 2012; Panasonic; Takeyama et al.)
US 2013/0126622 (23 May 2013; AmaTech; Finn)
US 2014/0091149 (3 Apr. 2014; Finn et al.)
US 2014/0231503 (21 Aug. 2014; Smart Co.; Kunitaka)
US 2015/0206047 (23 Jul. 2015; CompoSecure; Herslow)
US 2015/0221624 (6 Aug. 2015; Sandisk; Ye et al.)
US 2019/0050706 (14 Feb. 2019; CompoSecure; Lowe) now U.S. Pat. No. 10,406,734
US 2019/0073578 (7 Mar. 2019; CompoSecure; Lowe et al.)
US 2019/0156994 (23 May 2019; X-Card Holdings; Cox)
US 2019/0160717 (30 May 2019; CompoSecure; Lowe)
US 2019/0236434 (1 Aug. 2019; CompoSecure; Lowe)
US 2019/0286961 (19 Sep. 2019; CompoSecure; Lowe)
US 2019/0291316 (26 Sep. 2019; CompoSecure; Lowe) (now U.S. Pat. No. 10,583,594).
US 2019/0311235 (10 Oct. 2019; Giesecke & Devrient; Sexl et al.)
US 2019/0311236 (10 Oct. 2019; Giesecke & Devrient; Sexl et al.)
US 2019/0384261 (19 Dec. 2019; Kona I; Nam et al.)
US 2019/0354825 (21 Nov. 2019; CompoSecure; Lowe)
US 2020/0151535 (14 May 2020; CompoSecure; Herslow et al.) now U.S. Pat. No. 10,748,049
US 2020/0164675 (28 May 2020; FCS; Ridenour et al.)
US 2020/0364531 (19 Nov. 2020; CompoSecure; Lowe et al.)
US 2020/0364532 (19 Nov. 2020; CompoSecure; Herslow et al.)
US 2021/0073606 (11 Mar. 2021; CompoSecure; Lowe et al.)
US 2021/0073607 (11 Mar. 2021; CompoSecure; Lowe et al.)
US 2021/0154898 (27 May 2021; CompoSecure; Lowe et al.)
US 2021/0158124 (27 May 2021; CompoSecure; Lowe et al.)
US 2021/0209437 (8 Jul. 2021; CompoSecure; Lowe et al.)
US 2021/0232887 (29 Jul. 2021; Ritter)
US 2022/0058457 (24 Feb. 2022; Thales; Meridiano et al.)
Chen, S. L., Kuo, S. K. and Lin C. T. (2009) incorporated by reference herein, discloses "A metallic RFID tag design for steel-bar and wire-rod management application in the steel industry" (Progress in Electromagnetics Research, PIER Vol. 91: pp. 195-212.)
EP 0 494 471 (1 Jan. 1992; Chubb Lips; Nieuwkoop)
JP 4016322 (5 Dec. 2007; FEC; Takeda)
EP 2372840 (25 Sep. 2013; Panasonic; Hashimoto) including US 2011/0227799
U.S. Pat. No. 8,665,069 (4 Mar. 2014; Petratec; Weitzhandler et al.)
CN 205158409U (13 Apr. 2016)
WO 2017/090891 (1 Jun. 2017; Biosmart; Yoon et al.)
KR 10-1754985 (30 Jun. 2017; Aichi CK Corporation aka ICK; Kim et al.)
PCT/US2019/020919 (12 Sep. 2019; X-Card Holding; Cox)

US 2004/0118930 (24 Jun. 2004; American Express; Berardi et al.)
US 2019/0114526 (18 Apr. 2019; Finn et al.)
US 2019/0171923 (6 Jun. 2019; Finn)
US 2016/0180212 (23 Jun. 2016; Herslow et al)
WO 2017/162311 (28 Sep. 2017; Zwipe AS)
WO 2017/177905 (19 Oct. 2017; Hightec Tech)
WO 2018/132404 (19 Jul. 2018; CompoSecure, LLC)
U.S. Pat. No. 3,214,324 (26 Oct. 1965; General Mills; Peerman)
U.S. Pat. No. 6,329,958 (11 Dec. 2001; TDK; McLean et al.)
U.S. Pat. No. 6,817,085 (16 Nov. 2004; TDK; Uchikoba et al.)
U.S. Pat. No. 7,948,057 (24 May 2011; TDK; Furukawa et al.)
U.S. Pat. No. 8,158,018 (17 Apr. 2012; TDK, Nakahata et al.)
U.S. Pat. No. 9,673,506 (6 Jun. 2017; TDK; Asou et al.)
US 2017/0271746 (21 Sep. 2017; TDK; Komachi et al.)

Some Additional References

The following references may also be applicable to the invention(s) disclosed herein:
U.S. Pat. Nos. 6,581,839, 6,749,123, 6,764,014, 7,306,158, 7,377,443, 7,607,583, 7,837,116, 8,066,190, 8,186,598, 7,494,057, 7,530,491, 7,819,310, 7,823,777, 7,971,786, 8,033,457, 8,079,514, 8,186,582, 8,523,062, 9,760,816, 9,836,687
US D879,196, US D942,538 and US 943,024
WO 2007/049273 (3 May 2007; Vilnai et al.)
WO 2007/049274 (3 May 2007; Weitzhandler et al.)
U.S. Pat. No. 7,237,724 (3 Jul. 2007; Singleton)
U.S. Pat. No. 7,607,249 (27 Oct. 2009; Innovatier; Singleton)
U.S. Pat. No. 7,959,085 (14 Jun. 2011; Innovatier; Singleton)
U.S. Pat. No. 8,657,983 (25 Feb. 2014; Innovatier; Singleton)
U.S. Pat. No. 8,727,224 (20 May 2014; Innovatier; Singleton)
U.S. Pat. No. 9,258,898 (9 Feb. 2016; FiTeq; Singleton)
U.S. Pat. No. 6,687,131 (3 Feb. 2004; Sokymat; Miehling)
U.S. Pat. No. 7,012,530 (14 Mar. 2006; NagraID; Droz)
U.S. Pat. No. 7,205,899 (17 Apr. 2007; Schreiner Group; Surkau)
U.S. Pat. No. 5,498,388 (12 Mar. 1996; Mitsubishi; Kodai et al.), entitled "Production method for an IC card", incorporated by reference herein, discloses an IC card production method includes the steps of mounting a card board (12) having a through opening onto a lower mold (16) of molding dies (15), mounting a semiconductor module (2) onto the opening of said card board (12), tightening an upper die (17) of the molding dies (15) having a gate (19) onto a lower die (16), and molding by injecting resin (13) into the opening from the gate (19) in a state in which only an electrode terminal face (7) for external connection of the semiconductor module (2) is exposed. The IC card includes a card board (12) having a through opening, a semiconductor module (2) mounted onto this opening, and a molded resin (13) injected into said opening so that the resin molding is formed under such condition that only an electrode terminal face for external connection (7) of said semiconductor module (2) is made to expose.

U.S. Pat. No. 6,025,054 (15 Feb. 2000; CardXX; Tiffany), entitled "Smart cards having glue-positioned electronic components", incorporated by reference herein, discloses smart cards having high quality external surfaces can be made through the use of partially cured, low shrinkage glues to hold the smart card's electronic elements during their immersion in a thermosetting material that becomes the core layer of said cards. Mounds of low shrinkages give serve to hold the electronic component in a given position in the core layer.

U.S. Pat. No. 6,241,153 (5 Jun. 2001; CardXX; Tiffany), entitled "Method for making tamper-preventing, contact-type, smart cards", incorporated by reference herein, discloses smart cards having high quality external surfaces can be made through use of a primer/adhesive (and, optionally, anchor hooks) on the lower surface of an electrical component in order to affix said electrical component to a thermosetting material that becomes the core layer of said cards.

Claim 1 of U.S. Pat. No. 6,241,153

A method for making a contact type smart card comprising a top layer in which an electrical sensing device resides, a core layer and a bottom layer, said method comprising: (1) coating a layer of primer and/or adhesive on the underside of the electrical sensor device such that said layer of primer/adhesive will come into direct physical contact with a thermosetting polymeric material that forms the core layers of the smart card; (2) positioning the electrical sensor device in an opening in the top layer; (3) positioning the top layer and bottom layer in a mold set up that defines a void space between the top layer and the bottom layer; (4) injecting a thermosetting polymeric material into the void space under conditions such that the primer/adhesive comes into direct physical contact with the thermosetting polymeric material to form a unified precursor smart card body; (5) removing the unified precursor smart card body from the mold set up; and (6) trimming the precursor smart card to a desired dimension to produce a smart card.

U.S. Pat. No. 6,256,873 (10 Jul. 2001; CardXX; Tiffany), entitled "Method for making smart cards using isotropic thermoset adhesive materials", incorporated by reference herein, discloses smart cards employing isotropic thermoset adhesive (ITA) based circuits can be made by associating a splitter edge material with the ITA-based circuit in order to direct an incoming stream of thermosetting polymeric above and below the ITA-based circuit.

Claim 5 of U.S. Pat. No. 6,256,873

The method of claim 1 that further comprises purging gases from the void space by injecting a quantity of thermosetting material into the void space that is in excess of the volume of the void space and thereby forcing gases out of said void space.

U.S. Pat. No. 7,220,615 (22 May 2007; Micron Technology; Bolken), entitled "Alternative method used to package multimedia card by transfer molding", incorporated by reference herein, discloses a semiconductor card is made by a disclosed method which, in one molding step, forms a plastic body on a substrate attached to a surrounding frame by narrow connecting segments spanning a peripheral opening. The connecting segments are motivated downward by pins outside of the card periphery, holding the substrate against a lower level of the mold cavity during molding. Molded wings extending laterally from the card periphery are also formed. Following molding and curing, the casting is removed and the card singulated by excising the wings from the card. The resulting card has smooth edge surfaces and precise dimensions. Separate glob top encapsulation is avoided.

U.S. Pat. No. 7,225,537 (5 Jun. 2007; CardXX; Reed), entitled "Method for making memory cards and similar devices using isotropic thermoset materials with high quality exterior surfaces", incorporated by reference herein, discloses memory Cards containing Integrated Circuits and other electronic components (e.g. resistors) in a variety of form factors having high quality external surfaces of polycarbonate, synthetic paper (e.g. Teslin™), or other suitable material (e.g. PVC) can be made through use of injection molded thermoplastic material or thermosetting material that becomes the core layer of said Memory Cards and similar devices. The object of the invention is to provide the following properties to Memory Cards: rapid production cycle, high volume manufacturing throughput, security, electronics protection, better tamper resistance, durability, and highly reliable complex electronics encapsulation, achieved through a process utilizing low temperature and low pressure.

Claim 1 of U.S. Pat. No. 7,225,537

A method for making a Memory Card or similar device comprising a top layer of synthetic paper or other suitable material, a bottom layer of synthetic paper or other suitable material, and a core layer in which electronic components reside, said method comprising: (1) constructing a bottom layer with precisely positioned openings for external electrical contacts; (2) placing at least one mound of low shrinkage glue on an inside surface of the bottom layer; (3) mounting an electronic component, having external electrical contacts, on the at least one mound of low shrinkage glue, thereby forming a bottom layer assembly, wherein the external electrical contacts are positioned in alignment with the openings in the bottom layer; (4) partially curing the at least one mound of low shrinkage glue, wherein the electronic component is secured in a stable position; (5) positioning the bottom layer assembly in a bottom mold; (6) positioning the top layer in a top mold; (7) closing the top mold to the bottom mold in a manner that creates a void space between the top layer and bottom layer; (8) injecting a thermosetting polymeric material into the void space at temperature and pressure conditions which are such that: (a) the electronic component is secured in position by the partially cured glue while the electronic component and partially cured glue are immersed in the thermosetting material, (b) gases and excess polymeric material are driven out of the void space, (c) the electronic component is encapsulated in the thermosetting polymeric material before the partially cured glue becomes completely cured, (d) the shrinking of the partially cured glue as it is fully cured brings the lower surface of the external electrical contacts flush with the bottom surface of the bottom layer, and (e) the thermosetting polymeric material bonds with both the top layer and the bottom layer to produce a unified precursor Memory Card body; (9) removing the unified precursor Memory Card body from the mold device; and (10) trimming the precursor Memory Card or similar device to a desired dimension to produce a Memory Card.

Claim 9 of U.S. Pat. No. 7,225,537

The method of claim 1 wherein the inside surface of the top layer and the inside surface of the bottom layer are treated to facilitate the creation of a strong bond between the top layer and the thermosetting material and the bottom layer and the thermosetting material.

Claim 10 of U.S. Pat. No. 7,225,537

The method of claim 1 wherein the inside surface of the top layer and the inside surface of the bottom layer are treated by coating each with a bonding agent.

Claim 11 of U.S. Pat. No. 7,225,537

The method of claim 1 wherein the inside surface of the top layer and the inside surface of the bottom layer are treated by a corona discharge process.

Claim 22 of U.S. Pat. No. 7,225,537

The method of claim 1 wherein the thermosetting material is a polyurethane.

Claim 23 of U.S. Pat. No. 7,225,537

The method of claim 1 wherein the thermosetting material is an epoxy.

Claim 24 of U.S. Pat. No. 7,225,537

The method of claim 1 wherein the thermosetting material is an unsaturated polyester.

U.S. Pat. No. 8,012,809 (6 Sep. 2011; CardXX; Reed), entitled "Method for making advanced smart cards with integrated electronics using isotropic thermoset adhesive materials with high quality exterior surfaces", incorporated by reference herein, discloses advanced Smart Cards and similar form factors (e.g. documents, tags) having high quality external surfaces of Polyvinylchloride (PVC), Polycarbonate (PC), synthetic paper or other suitable material can be made with highly sophisticated electronic components (e.g. Integrated Circuit chips, batteries, microprocessors, Light Emitting Diodes, Liquid Crystal Displays, polymer dome switches, and antennae), integrated in the bottom layer of the card structure, through use of injection molded thermosetting or thermoplastic material that becomes the core layer of said Advanced Smart Cards. A lamination finishing process can provide a high quality lower surface, and the encapsulation of the electronic components in the thermosetting or thermoplastic material provides protection from the lamination heat and pressure.

In any case, such thermosetting polymeric materials will be injected into, and fill, the void space 36 defined between the inside surface 38 of the top layer 24 and the inside surface 40 of the bottom layer 26. Upon curing, the polymeric material 34 of the center layer 28 should bond or otherwise adhere to both the inside surface 38 of the top layer 24 and the inside surface 40 of the bottom layer 26 to produce a unified Advanced Smart Card body. Such adhesion can be aided by treating the inside surfaces 38 and 40 of the top and bottom layers, respectively, in any one of several ways.

For example, bond promoting agents known to this art (e.g. chloro-polyolefins) may be employed to enhance bonding between the core layer-forming thermoset material and the material(s) from which the top and bottom layers are made (e.g., PVC, polyimide). By way of example only, Minnesota Mining and Manufacturing's base primer product 4475.RTM can be used for this bond enhancing purpose, especially when the top or bottom layer material is PVC. Other treatments that can be applied to the inside surfaces of the top and/or bottom layers include plasma corona treatments and acid etching.

Claim 1 of U.S. Pat. No. 8,012,809

A method for making an advanced smart card comprising a top layer, a core layer of thermoset polymeric material, and a bottom layer comprising an integrated electronics assembly mounted on a substrate, said method comprising: (1) positioning a bottom layer comprising the integrated electronics assembly mounted on a substrate in a bottom mold (2) positioning a top layer comprising synthetic paper or other plastic material in a top mold; (3) closing the top mold to the bottom mold in a manner that creates a void space between the top layer and the bottom layer comprising the integrated electronics assembly; (4) injecting a thermosetting polymeric material into the void space to form a core layer of polymeric material, the injection taking place at a temperature and pressure which are such that: (a) the top layer of material is at least partially cold, low pressure molded into a cavity in the top mold; (b) gases and excess polymeric material are driven out of the void space; (c) the injected polymeric material flows over and around all exposed portions of the electronic components of the integrated electronic assembly positioned on the top surface of the bottom layer such that the bottom surface of the bottom layer remains free of the injected polymeric material; and (d) the thermosetting polymeric material bonds with both the top layer and the bottom layer to produce a unified precursor advanced smart card body; (5) removing the unified precursor advanced smart card body from the top and bottom molds; and (6) trimming the precursor advanced smart card to a desired dimension to produce a finished advanced smart card.

Claim 5 of U.S. Pat. No. 8,012,809

The method of claim 1 wherein the inside surface of the top layer and the inside surface of the bottom layer are treated by coating each with a bond promoting agent.

Claim 6 of U.S. Pat. No. 8,012,809

The method of claim 1 wherein the inside surface of the top layer and the inside surface of the bottom layer are treated by a corona discharge process.

Claim 9 of U.S. Pat. No. 8,012,809

The method of claim 1 wherein the integrated electronics assembly includes electronic components selected from the following group: microprocessors, antennae, Integrated Circuit (IC) chips, batteries, Light Emitting Diodes (LED), Liquid Crystal Displays (LCD), polymer dome switches, acoustic speakers, and sensors (such as fingerprint sensors).

Claim 13 of U.S. Pat. No. 8,012,809

A method for making an advanced smart card comprising a top layer, a core layer of thermoset polymeric material, and a bottom layer comprising an integrated electronics assembly mounted on a substrate, said method comprising: (1) using an integrated electronics assembly mounted on a substrate, with maximum dimensions of 54 mm wide, 85.6 mm long, and 0.50 mm thick, and positioning the integrated electronics assembly mounted on a substrate in a bottom mold; (2) positioning a top layer comprising synthetic paper or other plastic material in a top mold; (3) closing the top mold to the bottom mold in a manner that creates a void space between the top layer and the bottom layer comprising the integrated electronics assembly; (4) injecting a thermosetting polymeric material into the void space to form a core layer of polymeric material, the injection taking place at a temperature less than 150.degree. F. and pressure less than 100 PSI which are such that: (a) the top layer of material is at least partially cold, low pressure molded into a cavity in the top mold; (b) gases and excess polymeric material are driven out of the void space; (c) the injected polymeric material flows over and around all exposed portions of the electronic components of the integrated electronics assembly positioned on the top surface of the bottom layer such that the bottom surface of the bottom layer remains free of the injected polymeric material; and (d) the thermosetting polymeric material bonds with both the top layer and the bottom layer to produce a unified precursor advanced smart card body; (5) removing the unified precursor advanced smart card body from the top and bottom molds; and (6) trimming the precursor advanced smart card to a desired dimension to produce a finished advanced smart card.

U.S. Pat. No. 8,324,021 (4 Dec. 2012; CardXX; Reed), entitled "Advanced smart cards with integrated electronics in bottom layer and method of making such advanced smart cards", incorporated by reference herein, discloses an advanced smart card with a top layer, a core layer of thermoset polymeric material, and a bottom layer comprising an integrated electronics assembly mounted on a substrate. The advanced smart card is formed by positioning a bottom layer in a bottom mold, placing a top layer in a top mold, closing the mold, injecting a thermosetting polymeric material to form a precursor advanced smart card, removing the precursor, and trimming the precursor to produce a finished smart card.

U.S. Pat. No. 9,916,992 (13 Mar. 2018; Dynamics; Mullen et al.), entitled "Systems and methods for flexible components for powered cards and devices", incorporated by reference herein, discloses a die may be thinned using a thinning and/or a polishing process. Such thinned die may be flexible and may change operational characteristics when flexed. The flexible die may be applied to a mechanical carrier (e.g., a PCB) of a card or device. Detection circuitry may also be provided on the PCB and may be used to detect changed operational characteristics. Such detection circuitry may cause a reaction to the changed characteristics by controlling other components on the card or device based upon the flex-induced changed characteristics. The thinned die may be stacked, interconnected, and encapsulated between sheets of laminate material to form a flexible card or device.

A card may, for example, be formed as a laminate structure of two or more layers. A card may, for example, include top and bottom layers of a plastic material (e.g., a polymer). Electronics package circuitry (e.g., one or more printed circuit boards, a dynamic magnetic stripe communications device, a battery, a display, a stacked-die processor, other stacked-die components, wire-bond interconnects, ball grid array interconnects, and buttons) may be sandwiched between top and bottom layers of a laminate structure of a card. A material (e.g., a polyurethane-based or silicon-based substance) may be injected between top and bottom layers and cured (e.g., solidified by an exposure to light, chemicals, or air) to form a hardened card that may include a flexible laminate structure having stacked structures sandwiched between layers of laminate.

Card 200 may include an encapsulant, which may include a layer of material 222 (e.g., a material formed from one or more polyurethane-based or silicon-based substances). Material 222 may be a substance that changes its physical state (e.g., changes from a liquid substance to a solid substance) when cured by one or more conditions (e.g., air, heat, pressure, light, or chemicals) for a period of time. Accordingly, for example, card 200 may be hardened, but may remain flexible, so that card 200 may be flexed to exhibit either of a convex or concave shape, while returning to a substantially flat orientation once flexing ceases.

FIG. 3 shows card or device 300. Card or device 300 may, for example, be a laminated assembly, which may include top and bottom layers of a plastic (e.g., polymer top and bottom layers) with components 302, 304 and 306 encapsulated there between. An encapsulant of card or device 300 may be cured (e.g., hardened) such that card or device 300 may be rigid, yet flexible.

U.S. Pat. No. 11,392,860 (19 Jul. 19 2022; Dynamics; Mullen et al.), entitled "Systems and methods for contactless communication mechanisms for cards and mobile devices", incorporated by reference herein, discloses a card may be formed using two or more printed circuit boards. Each printed circuit board may include one or more RFID antennas, RFID chips and a processor. A processor on a board may transfer data to one or more RFID chips on the same board. Alternately, a processor on a board may transfer data to one or more RFID chips on a different board via conductive terminals between boards. Data stored in one or more RFID chips may be erased after being communicated to an RFID device via an RFID antenna or after a configurable timeout period elapses. A card and a mobile device may include more than one RFID antenna to increase efficiency, reliability, and/or a number of data channels that may be communicated.

A card assembly may, for example, be laminated such that all printed circuit boards, electronic circuitry and components are covered in a polymer. For example, an electronics package may be provided between two layers of polymer and a liquid polymer may be introduced between these layers and hardened to form a card. A laminated card assembly may, for example, be devoid of electrical contacts on either surface of the laminated card. A laminated card assembly may, for example, provide electrical contacts (e.g., EMV chip contacts) on one or more surfaces of a laminated card assembly.

All boards, circuitry, and other components of card 400 may be laminated to form card assembly 410. Such a lamination may, for example, be implemented using a series of lamination process steps, such that an electronics package containing boards 402, 404, and/or 408 and associated electronics may be encapsulated by an injection molding process (e.g., a reaction injection molding process), whereby a silicon-based material or a polyurethane-based material may be injected and cured (e.g., using temperature and/or chemical reaction) to form the electronics package. The electronics package may then be sandwiched between layers of laminate (e.g., layers of polymer laminate). Accordingly, for example, both surfaces of card assembly 410 may be formed by a layer of laminate such that no electrical contacts exist on either surface of card assembly 410. Alternately, for example, a surface of card assembly 410 may be formed by a layer of laminate such that electrical contacts may exist on a surface of card assembly 410 to provide connectivity from a surface of card assembly 410 to a processor (e.g., an EMV chip) of card 400.

Claim 2 of U.S. Pat. No. 11,392,860

A card, comprising: a first board including a first RFID antenna and a second RFID antenna; and a second board including a first RFID chip and a processor, wherein a first data is transferred from said processor to said RFID chip and wherein said first data is communicated from said first RFID chip to a first RFID communication channel via said first RFID antenna.

Claim 17 of U.S. Pat. No. 11,392,860

The card of claim 2, wherein said first and second boards are encapsulated, said encapsulation being laminated between first and second lamination layers.

SOME DEFINITIONS

Some of the following terms may be used or referred to, herein.

Booster Antenna Circuit

A booster antenna circuit in a metal transaction card may comprise a perimeter coil component with a given number of windings extending around the periphery edge of the card body, a coupler coil component with a given number of windings, a capacitor bank component connected in parallel with the coupler coil for frequency trimming, and a secondary coil component(s) contributing to energy harvesting. The components of the booster antenna circuit (e.g., tracks, windings or turns, parallel plates, vertical interconnects) may reside on both sides of a carrier layer. The carrier layer may comprise polyethylene terephthalate (PET).

In a conventional booster antenna circuit (chemically etched circuitry, plated copper circuitry, conductive printed circuitry or equivalent), the perimeter coil on the periphery of the card body inductively couples with the contactless reader while the coupler coil inductively couples with the module antenna of a transponder chip module driving the RFID payment chip.

The secondary coil(s) has or have a range of functions including tuning, additional power generation, picking up surface currents at the edges and inner locations of the card body, coupling to other components such as to a biometric sensor, and customized to drive sound, piezo haptic actuator, light and display devices.

The coupler coil may be an open or closed loop circuit being assembled on the PET carrier layer having vertical interconnects to the upper and lower plate electrodes of the capacitor bank.

In some card constructions, the perimeter coil may be eliminated, with the coupler coil coupled inductively to an in-card discontinuous metal layer having a slit, opening, a metal ledge and metal edges, functioning as a one turn RLC circuit.

The booster antenna circuit is assembled to a continuous metal layer using a magnetic shielding layer to offset the effects of field attenuation caused by the continuous metal layer.

Magnetic Shielding

Magnetic shields have historically been ferrite-based materials, but non-ferrite materials having properties that impact RF performance are used in metal card applications. Magnetic shields can be powdered iron, ferrite, permalloy, polymer-based or a whole host of other materials (e.g. nanocrystalline).

Thermosetting Resin

The International Union of Pure and Applied Chemistry (IUPAC) defines a thermosetting resin as a petrochemical in an indulgent solid or viscous state that changes irreversibly into an infusible, insoluble polymer network by curing.

Thermosetting resins undergo chemical reactions (curing process) that crosslink the polymer chains and thus connect the entire matrix together in a three-dimensional network. Once cured, they cannot be remelted or reformed. Thermosetting resins tend to have high dimensional stability, high-temperature resistance, and good resistance to solvents because of their three-dimensional cross-linked structure.

Thermosetting resins describe a generic family of products that includes unsaturated polyesters, vinyl esters, epoxy, and polyurethane resins. The materials used with them are generally described as hardeners, curing agents, peroxide initiators, isocyanates, fillers, and flexibleness.

Thermosetting resins are popular because uncured and at room temperature they are in a liquid state. Common thermosetting resins include polyester resin, vinyl ester resin, epoxy, phenolic and urethane. They are commonly used in polyester fiberglass systems, sheet molding compounds, polyurethanes and adhesives.

Reference: Handbook of Thermoset Plastics, 4th Edition, Oct. 21, 2021, Editor: Hanna Dodiuk Polyurethane A polyurethane (PU) is typically produced by reacting an isocyanate with a polyol. Since polyurethane contains two types of monomers, which polymerize one after the other, they are classed as alternating copolymers. It is a versatile polymeric material that can be tailored to meet the demands of a number of adhesive and sealant systems.

Polyurethane Resins

Any resin resulting from the reaction of diisocyanates (such as toluene diisocyanate) with a phenol, amine, or hydroxylic or carboxylic compound to produce a polymer with free isocyanate groups; used as protective coatings, potting or casting resins, adhesives, rubbers, and foams, and in paints, varnishes, and adhesives.

They are synthetic resins that have two-component systems which consist of a polyol component (resin) and an isocyanate component (hardener) that must be mixed in a defined ratio prior to application. Synthetic resins are thinner than epoxy resins, making them very easy to mix; they also work very well in molds.

Polyurethane Adhesives

Adhesives based on polyurethane (PU) resins show good strength at low and high temperatures and are resistant to chemicals, water and humidity. The polyurethane polymer forms rigid and soft domains that give the polymer its balance of flexibility and high strength. Reference: Handbook of Adhesives and Sealants, Volume 2, 2006, Pages 355-480, xl-xlii Epoxy Epoxy is the family of basic components or cured end products of epoxy resins. Epoxy resins, also known as polyepoxides, are a class of reactive prepolymers and polymers which contain epoxide groups. The epoxide functional group is also collectively called epoxy. The IUPAC name for an epoxide group is an oxirane. It is a type of petroleum-based adhesive. Epoxy contains the important element, epocholohydrin, which forms a hard layer that is highly resistant to excessive cold, heat, and moisture.

Epoxy Resins

Epoxy resins may be reacted (cross-linked) either with themselves through catalytic homopolymerisation, or with a wide range of co-reactants including polyfunctional amines, acids (and acid anhydrides), phenols, alcohols and thiols (usually called mercaptans). These co-reactants are often referred to as hardeners or curatives, and the cross-linking reaction is commonly referred to as curing.

They are often referred to as laminating resins and are well suited for coating surfaces. They may be mixed with colorants and filling materials to get the desired results.

Epoxy Adhesives

They are considered the strongest of all types of adhesives. They are used to build vehicles, planes, as well as sports equipment. They are water-resistant and are solvent-free.

B-staged Epoxy

This is a descriptive term used to define a one component epoxy system, using a latent (low reactivity) curing agent. This unique product can be partially cured (sometimes referred to as "pre-dried"), as an initial stage after being applied onto one substrate/surface. It can, at a later time, be completely cured under heat and pressure.

Partially cured epoxy, or B-staged epoxy adhesive, does have processing advantages. The adhesive can have its initial application and partial cure in one location, and its final cure in another location weeks later.

C-staged Epoxy

The B stage is a solid, thermoplastic stage. When given additional heat, the B-stage epoxy will flow and continue to cure to a crosslinked condition or C stage.

Urethane Casting

Urethane casting uses silicone molds to produce plastic and rubber components using two-component polyurethane resins under a vacuum. Also known as vacuum casting or polyurethane casting, it is a versatile manufacturing technology capable of producing complicated engineering parts in polyurethane resins and cast nylon by simulating injection molding. Because the process takes place inside a vacuum chamber, it creates high-quality bubble-free casting with a smooth surface texture and no defects. Urethane resins are also available to make entirely opaque, translucent, or transparent cast parts.

Urethane Casting vs Injection Molding

Urethane casting and injection molding are similar processes that can create identical plastic parts using similar materials. However, in contrast to urethane casting, which relies on gravity to fill the molds, injection molding employs a pressured nozzle to push the molten plastic into the mold cavity.

Reaction Injection Molding (RIM)

Reaction injection molding (RIM) is similar to injection molding except thermosetting polymers are used, which requires a curing reaction to occur within the mold.

In this process, highly reactive plastic liquids are mixed under high pressure and then injected into a mold to react, polymerize and produce principally polyurethane thermoset plastic or thermoplastic parts.

Instead of using already polymerized materials as matrices, highly reactive monomeric or oligomeric ingredients are placed in two tanks which are then quickly mixed by impingement and injected into the mold cavity. As soon as the two materials are mixed, chemical reaction begins to form a polymeric matrix which completes typically within 5-30 s. The major portion of the reaction injection molding machine is a high-pressure pump and a metering system.

RIM can be used for the production of polyurethane, ureaformaldehyde, nylon, styrene class resin, and epoxy resin for use in automobile parts.

Reaction Assisted Molding Process (RAMP)

It is an offshoot of existing Reaction Injection Molding (RIM) molding technology, being used to encapsulate electronics into smart cards without requiring the traditional layering manufacturing process.

RAMP is based on low pressure and low temperature dispensing of polyurethanes (unlike RIM which is based on high pressure and temperature).

The RAMP technique precisely positions computer chips and electronic components within a mold between two sheets of PVC or polycarbonate film, after which a polyurethane mixture is injected at low temperature and low pressure to completely immerse the electronic element. The electronic element is securely encapsulated and protected when curing is completed in less than an hour.

Reference is made to: https://www.plasticsnet.com/doc/first-reaction-injection-molding-now-reaction-0001

Mold Casting

It is a manufacturing process in which a liquid material is poured into a mold, which contains a hollow cavity of the desired shape, and then allowed to solidify. The solidified part (i.e. casting) is ejected or broken out of the mold to complete the process. The casting material is a time setting liquid that cures after mixing two or more components together; examples are thermosetting epoxies and polyurethanes.

Thermosetting epoxies are rigid polymeric materials that are resistant to higher temperatures than ordinary thermoplastics. These materials are normally made up of lines of polymers, which are highly cross-linked that irreversibly cure. Polyurethanes are synthetic resins or plastics that result from a polyaddition reaction between dialcohols or polyols and polyisocyanates. Essentially, polyurethanes have a higher cross-link density than epoxies, making them more durable.

In general, the casting resin consists of a two-component system of resin and hardener, which hardens after mixing through a chemical reaction. PU casting resins can, just like epoxy resin and polyester resin, be combined with various additives as well as filling materials or colorants. This gives them the desired properties. For example, an inhibitor can be added to the resin to increase the so-called pot life, i.e., the processing time.

There are also color pigments and fluorescent dyes that can give the polyurethane resin a specific color. Examples of fillers are, among others, cotton flocks, glass fibers, mineral fillers, and lightweight fillers. Also, fillers can be added to the resins to influence properties such as mechanical strength, stiffness, surface hardness, and in the case of metal transaction cards the fillers influence the drop acoustics. Reference: https://en.wikipedia.org/wiki/Casting and https://resin-expert.com/en/guide/polyurethane-resin Casting Polyester Resin In its liquid form, casting polyester resin has a consistency of corn syrup and a slight color ranging from straw to light aqua. During the hardening process the slight color bleaches out and the resin becomes crystal clear.

Added to liquid casting resin, catalyst (hardener) produces a chemical reaction, which generates heat, causing the resin to harden.

Coating of Metal

A coating, such as polyurethane resin, is a covering that is applied to the surface of a substrate such as a metal layer, a metal inlay, a metal frame or a metal chassis. The purpose of applying the coating may be to fill openings, voids or recesses in the substrate, to encapsulate the substrate, and or to encase any components or devices assembled thereto.

Functional coatings may be applied to change the surface properties of the substrate, such as the acoustic properties of the substrate, mechanical robustness of the substrate, electrical isolation of the substrate, radio frequency response of components and devices assembled to the substrate, protection of the surface of the substrate from environmental conditions, and to fill and cover openings, apertures, voids and recesses in the substrate, with the coating forming an essential part of the finished product.

A major consideration for most coating processes is that the coating is to be applied at a controlled thickness. After applying the coating, a compression step (under vacuum) may be implemented to extract any air pockets or release of gases. After contraction and curing of the coating over a long duration, the solidified coating may be mechanically planed to a certain thickness.

An adhesion promoter such as a primer (chemical bonding agent) or a single layer of thermosetting adhesive film may be applied to the substrate, before coating the substrate. An adhesion promoter encourages the subsequent coating to adhere well.

Adhesion Promoter

A primer in the form of a chemical bonding agent is a low viscous liquid (e.g. 30 mPa·s) for the pre-treatment of metal surfaces to promote the adhesion of polyurethane thereto. Adhesion can be further improved with surface treatment such as sanding, ultrasonic cleaning, blasting and chemical activation or combinations of these before applying the primer. The primer is applied in a single coat to the metal surface by spraying, dipping, coating or screen printing. Ideally, the film thickness of the primer is very thin (5 μm to 15 μm).

A typical primer is comprised of film-forming polymers, cross-linkable resins, fillers, and a solvent or water-based carrier system.

Two-coat adhesive formulations for coating polyurethane to metal may comprise a primer layer and an adhesive topcoat. The primer provides a means of obtaining robust adhesion to the metal substrate such as stainless steel while providing the necessary reactivity with the adhesive topcoat for bonding to polyurethane.

Sacrificial Layer

To protect sheet metal from scratches during mechanical processing, a number of protective release films or peel-off films with low tack adhesive are available, such as polyethylene film tape with an acrylic low tack adhesive and plasticized PVC film with low tack adhesive. The sacrificial layer may be polytetrafluoroethylene (PTFE, Teflon®) or polyolefin backing film.

Release Agent

Also known as a mold release agent is a chemical used to prevent other materials such as adhesives or plastics from bonding to surfaces such as metal. Release agents provide the critical barrier between a molding surface and the substrate, facilitating separation of the cured part from the mold. Many kinds of release agents are used. They are waxes, fatty ester, silicones, and metallic soaps.

Silicone release agents are widely used as additives (having nonstick properties) in mold release applications where they enable quicker release of products made in molds.

Lapping Cured Polyurethane Resin

There are several methods to horizontally lap cured thermosetting polyurethane (PU) resin bonded to a metal layer such as stainless steel, to reduce the thickness of the PU, and to accomplish ultra-high precision geometries. Planing is a machining process that uses linear relative motion between a workpiece (e.g., PU coated metal inlay) and a single point cutting tool, to generate an accurate flat surface. Grinding (abrasive cutting) uses a grinding wheel as cutting tool. Lapping is a machining process in which two surfaces are rubbed together with an abrasive between them.

Roll Coating System

A roll coating system coats a polymeric material (single or 2-component formulation) such as a thermosetting epoxy or polyurethane resin for all-over coating of a substrate and parts with irregular shapes. A roll coating system typically has a resin reservoir, a coating drum, a doctor blade and a conveyor roller, with the width of the drum dictating the width of the coating being applied to the substrate. In order, to avoid resin spillage during application, the substrate may be larger than the start and stop positions of the coating. A sacrificial layer may be applied to one side of the substrate for protection, and should the substrate have any apertures, openings or windows. Reference is made to:

https://www.hardo.eu/adhesive-technology/?lang=en

Slot Die Coating

Slot coating is a high-precision coating method used to deposit a thin liquid film onto a moving substrate. It is a pre-metered coating method, where film thickness is directly controlled by the flow rate and web speed. Slot die coating may also be referred to as "slot nozzle coating".

The liquid flow in the application region, so called the coating bead, is strongly affected by operating parameters, liquid properties, and design parameters, such as web speed, surface tension, and geometry of the coating die.

Slot die coating technology is an alternative process to roll coating.

Metal Surface Treatment (Corona)

Treating metal surfaces is primarily a surface cleaning issue. Plasma treatment is a process designed to change the surface properties of a substrate to increase surface energy and/or make it chemically compatibility with a bonding material. Plasma treatment creates an electron bombardment that breaks the surfaces chemical bonds while the ions hitting the surface are designed to alter the chemical composition of the surface. Plasma systems may also be used to treat a variety of material types including polymers, glass and ceramics.

Passivation

Passivation is a non-electrical metal finishing process to help prevent metal surfaces from corrosion and pitting. The chemical treatment for stainless steel and other alloys makes the metal more resistant to rust and reduces chemical reactivity.

Metal Inlay Passivation

It involves immersing a stainless steel sheet in an acid bath (usually nitric or citric acid). The process removes free iron from stainless steel surfaces. When the stainless steel is exposed to oxygen containing environments, a thin chromium oxide film layer is formed. While most stainless steels naturally form this protective oxide layer, the passivation process thickens the layer and significantly speeds up the process. The oxide layer creates a passive surface that acts as protection from corrosive environmental stimuli.

Polyurethane Conductivity

Due to their chemical compositions, most elastomers, including rubbers, polyurethanes, and silicones, are natural insulators. Electrical conductivity can be improved in these materials by including conductive additives in the material's manufacturing process. In the case of polyurethanes, using conductive additives will result in semi-conductive materials. The specifics of the chemistry being employed will determine the conductivity level, as well as the physical properties the material will possess. Semi-conductive polyurethanes are ideal for dissipating static build-up or transferring an electrical charge. Reference is made to:

https://knowledgecenter.mearthane.com/polyurethane-and-conductivity
  https://www.globalspec.com/ds/4041/areaspec/type_casting_resin
  https://gallaghercorp.com/white-papers-polyurethane-electrical-properties/

SUMMARY

The invention may relate to innovations in or improvements (add-ons or variations) to RFID-enabled ("contactless capable") metal smartcards or metal transaction cards with/having a transponder chip module or an inductive coupling chip module, which may also be referred to as an electronic chip module or dual interface chip module.

The invention may further relate to innovations in or improvements to RFID-enabled metal smartcards or metal transaction cards having two metal layers (both modified to function as coupling frames), and to an appropriate thermosetting resin disposed between the two metal layers to retain the metal sound.

It is an object of the invention, to provide improved techniques for making (manufacturing) metal layers and inlays, or metal card bodies for smartcards.

Over-molding or casting thermosetting resin may be used to replace thermosetting adhesive film layers, plastic slugs and to fill module openings, cut-outs, gaps and voids in a metal transaction card. The use of thermosetting resin may also enhance or preserve (safeguard) the drop acoustics of the metal card. The method of coating thermosetting resin to a layer of metal may be substituted by the manufacturing techniques of casting, over-molding or reaction injection molding.

According to the invention, generally, metal layers (650, 730, 750, 830, 850) of a smartcard (SC, 600,700, 800) have module openings (614, 712, 714, 812, 814) for receiving a transponder chip module (TCM). Thermosetting resin (TR, 668B, 768A, 768B, 868A, 868B) coats (encapsulates) the bottom surfaces and fills the module openings of the metal layers. Inter-coat (638, 738, 748, 838, 858) may be disposed between the thermosetting resin and the bottom surfaces of the layers. A second layer of thermosetting resin (TR, 668A) may (coat (encapsulate) the top surface of the metal layer (650). A first metal layer (650, 750, 850) may be a discontinuous metal layer (DML), having a slit (S; 620, 720B, 820) which may also be filled by the thermosetting resin. A second metal layer (ML, 730, 830) having a second module opening (MO, 712, 812) may be disposed atop the first metal layer, and thermosetting resin (768A, 868A) may coat (encapsulate) the bottom surface of the metal layer and fill the module opening. The second metal layer (730) may be discontinuous, having a slit (S, 720A). The second metal layer (830) may be "continuous", without a slit. A booster antenna circuit (BAC, 844) may be disposed between the first and second metal layers, with magnetic shielding material (842) disposed between the booster antenna circuit and the second metal layer.

As used herein, the term "metal inlay" refers to a metal layer that has be processed, such as by forming a module opening or a slit therein, and also to a metal layer having a synthetic or adhesive layer on one or both sides thereof.

As used herein, the term "encapsulating" (and variations thereof) refers to coating (e.g., a metal layer or metal inlay) on at least one side or surface thereof, and may include filling openings and slits in the metal layer.

According to an embodiment of the invention, a smartcard (SC, 600,700, 800) may comprise: a first metal layer (ML, 650, 750, 850) having a top surface, a bottom surface, and a module opening (MO, 614, 714, 814) extending between the top and bottom surfaces for receiving a transponder chip module (TCM); and a first layer of thermosetting resin (TR, 668B, 768B, 868B) coating (encapsulating) the bottom surface of the first metal layer and filling the module opening of the first metal layer. A first layer of inter-coat (638, 748, 858) may be disposed between the first layer of thermosetting resin and at least the bottom surface of the first metal layer. A second layer of thermosetting resin (TR, 668A) may coat (encapsulate) the top surface of the first metal layer. The first metal layer (650, 750, 850) may be a discontinuous metal layer (DML), having a slit (S; 620, 720B, 820). The first layer of thermosetting resin may also fill the slit in the first metal layer.

The smartcard (SC) may further comprise: a second metal layer (ML, 730, 830) having a top surface, a bottom surface, and a module opening (MO, 712, 812) extending between the top and bottom surfaces for receiving the transponder chip module (TCM); and a second layer of thermosetting resin (TR, 768A, 868A) disposed on the bottom surface of the second metal layer and into the module opening of the second metal layer. A second layer of inter-coat (738, 838) may be disposed between the second layer of thermosetting resin and the bottom surface of the second metal layer. The second metal layer may be a discontinuous metal layer (DML, 730), having a slit (S); and the second layer of thermosetting resin on the bottom surface of the second metal layer may also fill the slit in the second metal layer.

Alternatively, the second metal layer may be a continuous metal layer (CML, 830), not having a slit (S). A booster antenna circuit (BAC, 844) may be disposed between the second continuous metal layer and the first discontinuous metal layer; and magnetic shielding material (842) may be disposed between the second continuous metal layer and the booster antenna circuit. Adhesive (843, 848) may be disposed on both sides of the booster antenna circuit.

The second layer of thermosetting resin (868A) separates the booster antenna circuit a given distance from the magnetic shielding layer to achieve optimum shielding and RF functionality. The distance may be at least 50 μm.

An adhesive layer (743A) may be disposed between the first resin coated (encapsulated) metal layer (750) and the second resin coated (encapsulated) metal layer (730).

The transponder chip module may be a dual-interface module having an upper larger ("P1") portion and a lower smaller ("P2") portion. The module opening in the first metal layer (650) may be "stepped", having a larger ("P1") portion aligned atop a smaller "P2" portion. The module opening maybe be larger than the module, with a separation channel of approximately 0.25 mm between edges of the module opening in the metal layer and corresponding portions of the module implanted therein.

The second metal layer (730, 830) may be disposed below the first metal layer (750, 850); and the module opening in the second metal layer may be smaller ("P2") than the module opening ("P1") in the first metal layer. The module opening in the first metal layer may be 0.4-0.5 mm larger than an upper portion of the chip module; and the module opening in the second metal layer may be 0.4-0.5 mm larger than a lower portion of the chip module. There may be a separation channel of approximately 0.25 mm between metal edges of the metal layer in the module opening a corresponding portion of the module implanted therein.

According to an embodiment of the invention, a method of making a smartcard (SC) may comprise: providing a metal layer (ML, 650, 750, 850) having a top surface, a bottom surface, and a module opening (MO, 614, 714, 814) extending between the top and bottom surfaces for receiving a transponder chip module (TCM); attaching a sacrificial layer (SL, 609) to the top surface of the metal layer; and encapsulating (such as coating) the metal layer with a thermosetting resin (TR, 668B, 768B, 868B) disposed on the bottom surface of the first metal layer and filling the module opening of the first metal layer up to the sacrificial layer. The process of encapsulating may be selected from the group consisting of coating, open cast molding, pressure casting, over-molding, compression molding, reaction injection molding (RIM) and reaction assisted molding process. A surface treatment may be performed on the metal layer prior to coating (encapsulating) it. The surface treatment may be selected from the group consisting of mechanical surface preparation, chemical preparation, sanding, cleaning, ultrasonic cleaning, and dichromate treatment. The sacrificial layer may comprise polytetrafluoroethylene (PTFE, Teflon®) or polyolefin backing film. The sacrificial layer may be removed after the thermosetting resin is sufficiently cured to remain in the module opening. Before coating (encapsulating) the metal layer, an inter-coat (638) may be applied to the bottom surface of the metal layer to promote adhesion of the thermosetting resin and the metal layer. The thermosetting resin may be transparent or pigmented. Printed stock may be laminated with elevated pressure and temperature to one or both of the top and bottom surfaces of the coated (encapsulated) metal layers.

The transponder chip module may be implanted in the module opening(s) of the smartcard.

In their various embodiments, the invention(s) described herein may relate to industrial and commercial industries, such RFID applications, payment smartcards (metal, plastic or a combination thereof), electronic credentials, identity cards, loyalty cards, access control cards, and the like.

Other objects, features and advantages of the invention(s) disclosed herein may become apparent in light of the following illustrations and descriptions thereof.

BRIEF DESCRIPTION OF THE DRAWINGS

Reference will be made in detail to embodiments of the disclosure, non-limiting examples of which may be illustrated in the accompanying drawing figures (FIGS.). The figures may generally be in the form of diagrams. Some elements in the figures may be stylized, simplified or exaggerated, others may be omitted, for illustrative clarity.

Although the invention is generally described in the context of various exemplary embodiments, it should be understood that it is not intended to limit the invention to these particular embodiments, and individual features of various embodiments may be combined with one another. Any text (legends, notes, reference numerals and the like) appearing on the drawings are incorporated by reference herein.

Some elements may be referred to with letters ("AS", "CBR", "CF", "CLS", "FC", "MA", "MT", "TCM", etc.) rather than or in addition to numerals. Some similar (including substantially identical) elements in various embodiments may be similarly numbered, with a given numeral such as "310", followed by different letters such as "A", "B", "C", etc. (resulting in "310A", "310B", "310C"), and may collectively (all of them at once) referred to simply by the numeral ("310").

Figure 1:
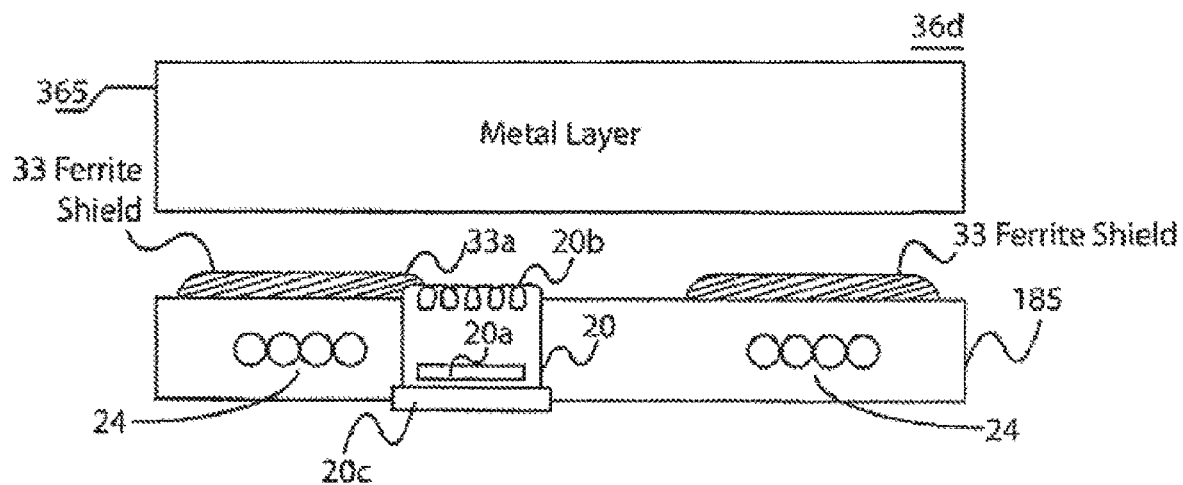
Figure 2:
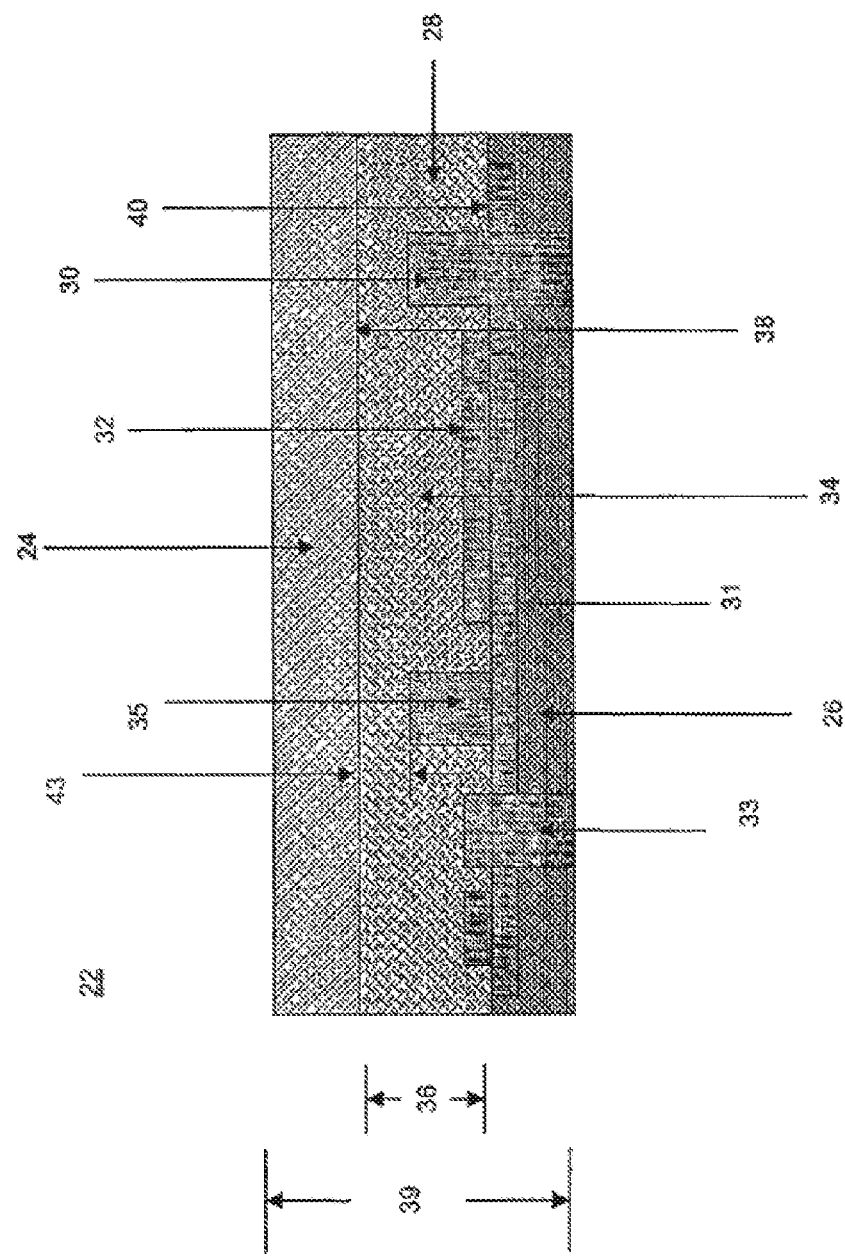
Figure 3:
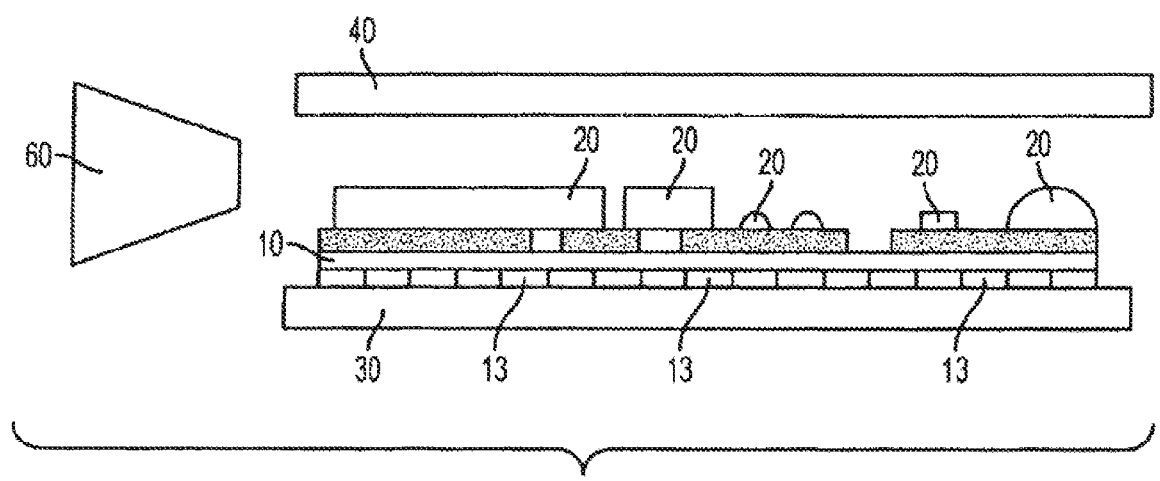
Figure 4:
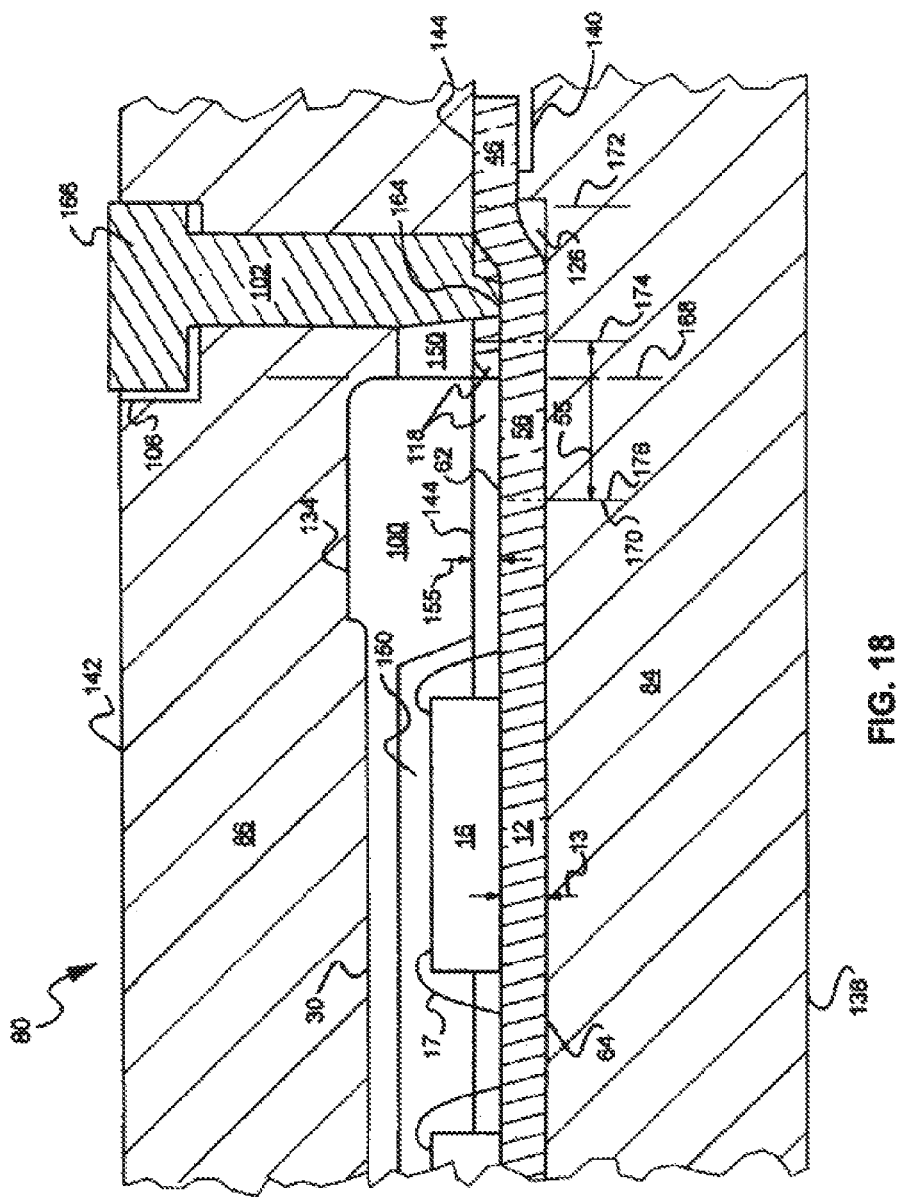
Figure 5:
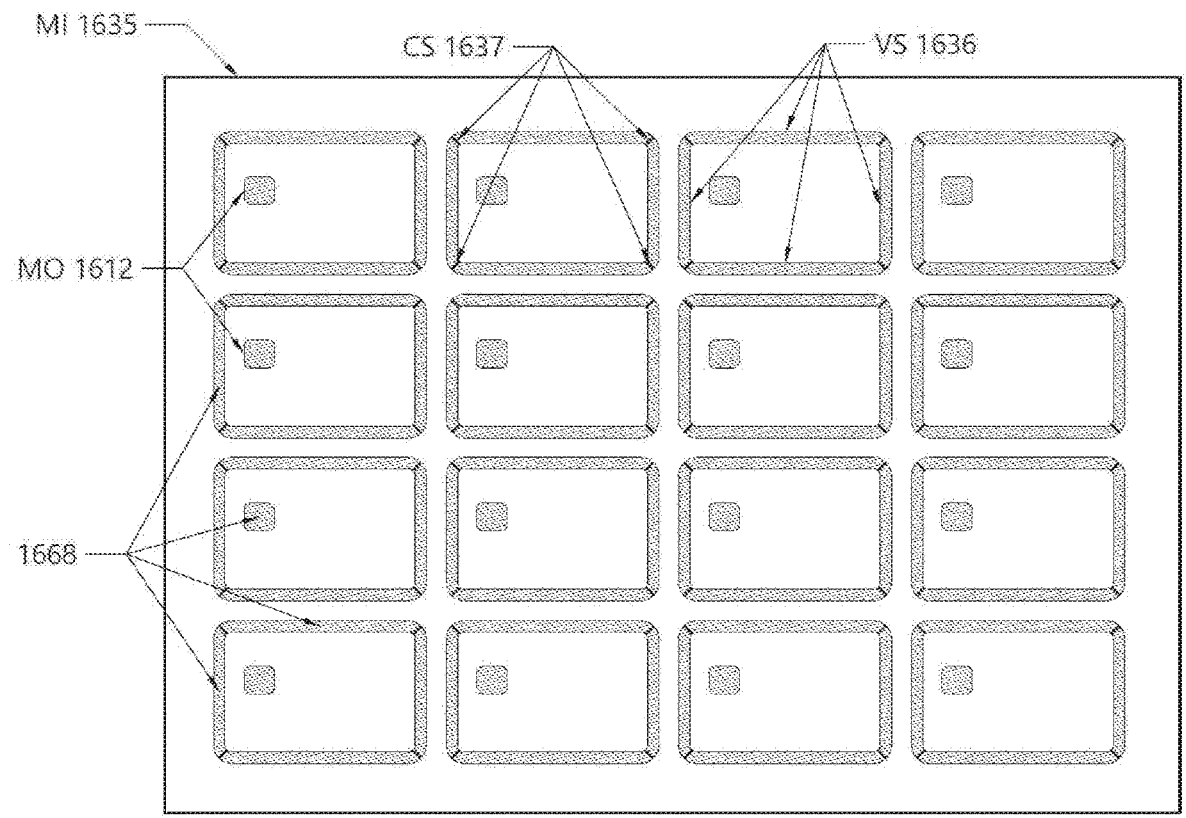

FIG. 1 (FIG. 3D of U.S. Pat. No. 9,898,699) is a cross sectional diagram of a smart metal card with a ferrite shield formed between the card and chip antenna and the card metal layer, according to the prior art;

FIG. 2 (FIG. 1 of U.S. Pat. No. 8,012,809) is a cut-away side view of an Advanced Smart Card made according to the teachings of the patent disclosure, according to the prior art;

FIG. 3 (FIG. 3 of U.S. Pat. No. 9,258,898) is a sectional view of an embedded electronic device and an injection nozzle, according to the prior art;

FIG. 4 (FIG. 18 of U.S. Pat. No. 7,220,615) is an enlarged partial cross-sectional end view of a molding apparatus illustrating a configuration of the molding cavity for fabrication of a plastic body on a substrate, according to the prior art;

FIG. 5 (FIG. 16 of U.S. Ser. No. 17/882569 (ML 029)) is a diagram, front view of a metal inlay having an array of card body sites, with each card body in the array suspended by corner struts from all four corners, and between struts air gaps or void sections exist around all four edges of the card body, according to the prior art.

Figure 6A:
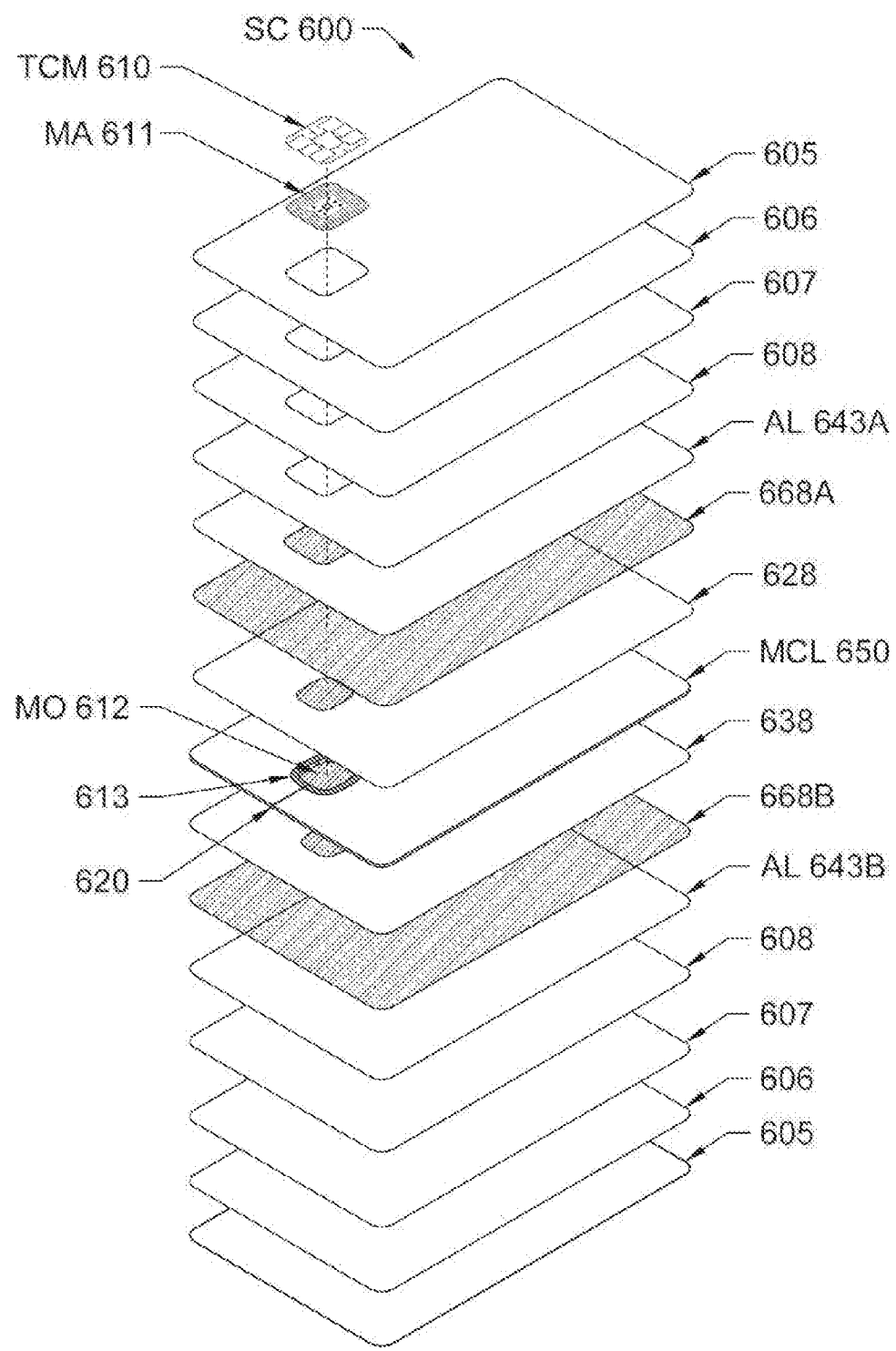

FIG. 6A is a diagram (exploded perspective view) of the stack-up construction of a dual interface metal core smartcard (SC) having contactless "tap to pay" functionality operating from both sides of the card body (CB), according to an embodiment of the invention.

Figure 6B:
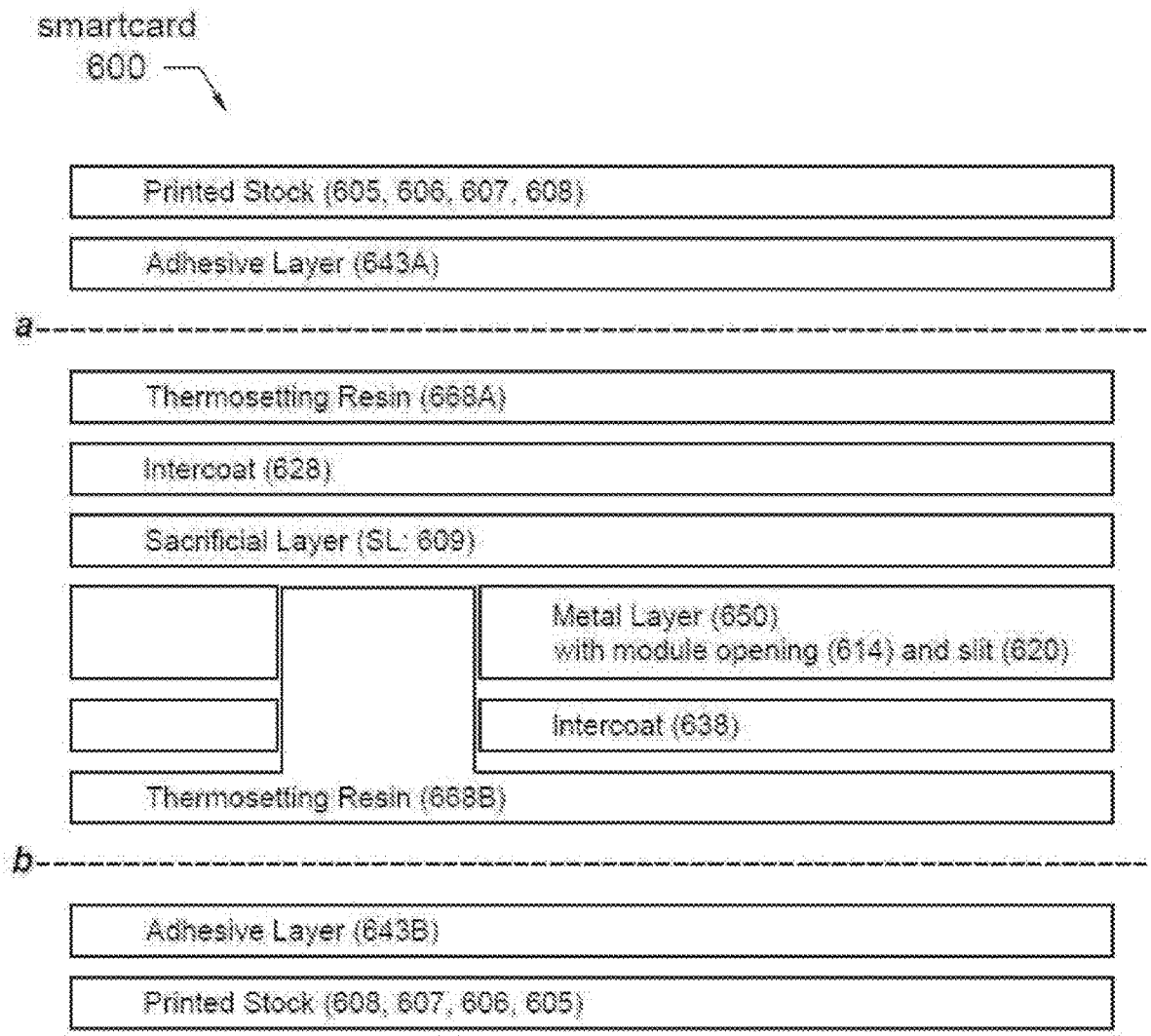

FIG. 6B is an exploded cross-sectional view (not to scale) of a smartcard having a metal core, such as the smartcard shown in FIG. 6A, according to an embodiment of the invention.

Figure 6C:
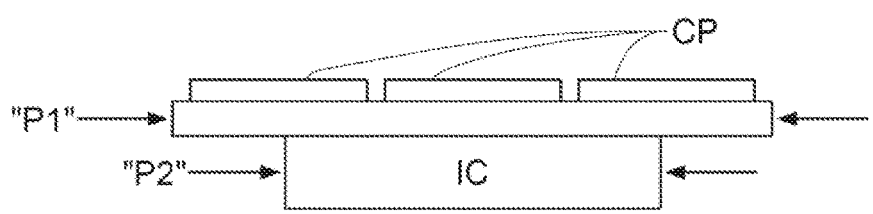

FIG. 6C is a cross-sectional view of a typical module, which may be a transponder chip module (TCM) or an inductive coupling module (ICM).

Figure 7A:
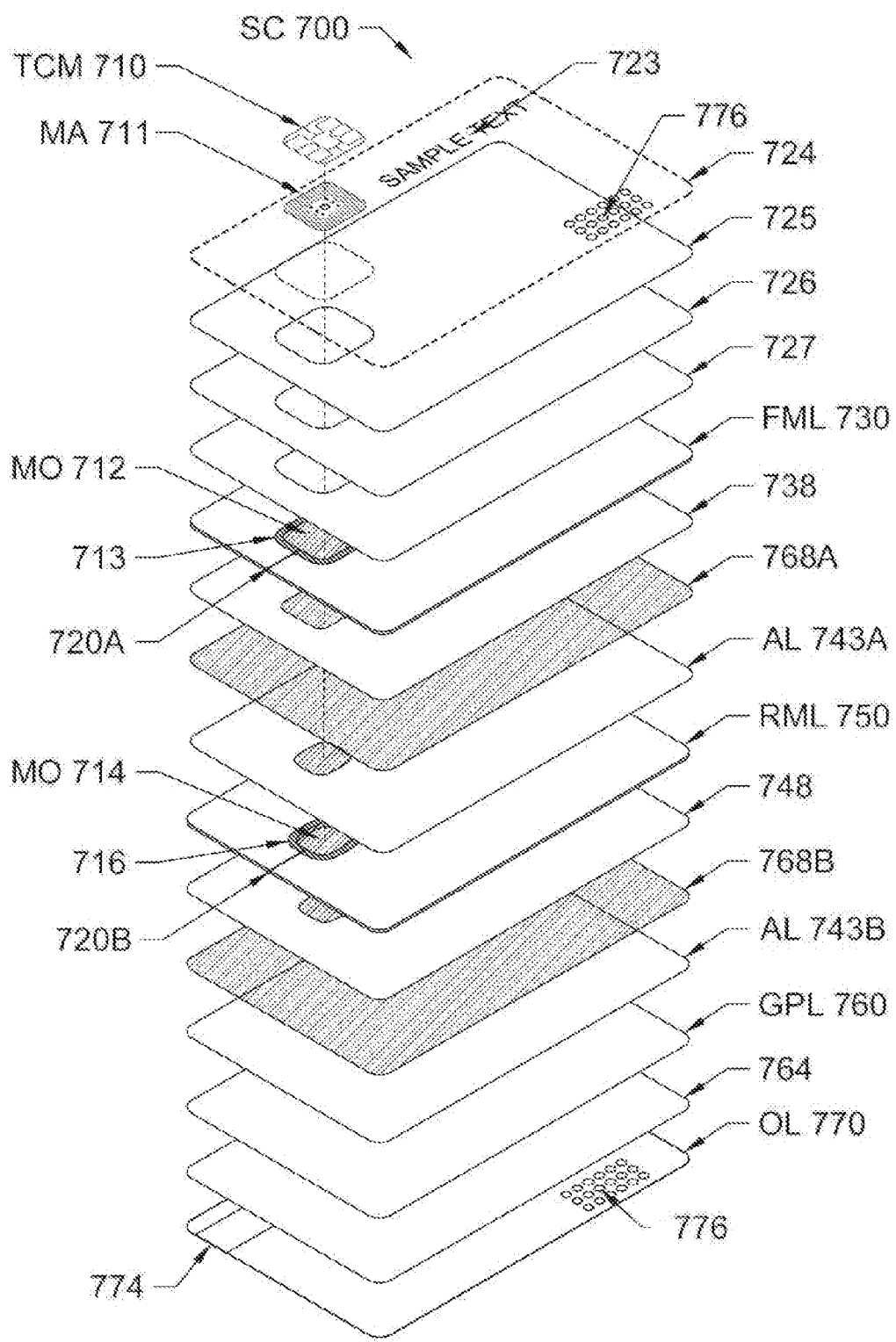

FIG. 7A is a diagram (exploded, perspective view) of a metal face smartcard or transaction card showing different layers in the stack-up construction, according to an embodiment of the invention.

FIG. 7B is an exploded cross-sectional view (not to scale) of a smartcard having a metal face, such as the smartcard shown in FIG. 7A, according to an embodiment of the invention.

Figure 8A:
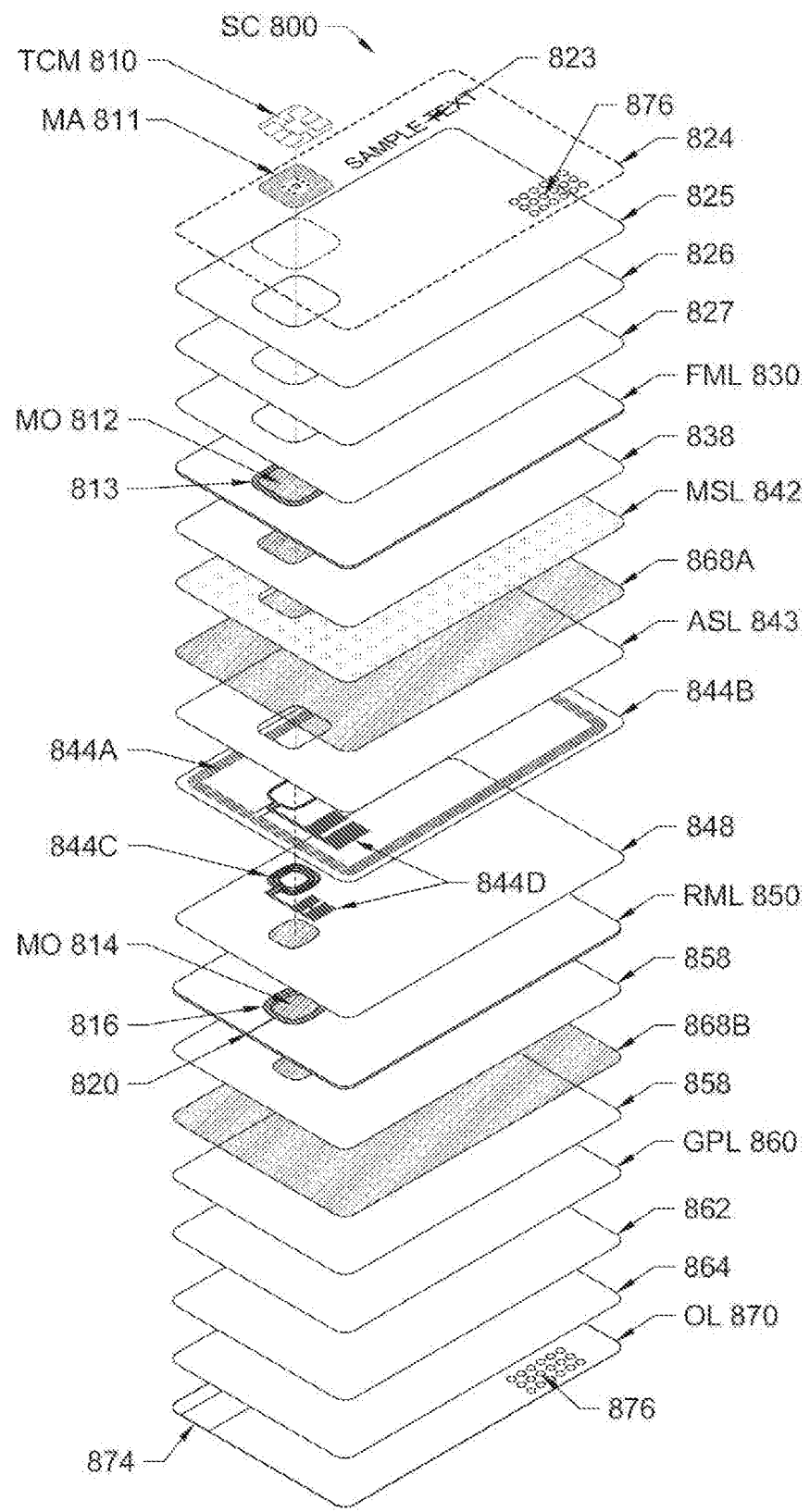

FIG. 8A is a diagram (exploded perspective view) of the stack-up construction of a dual interface metal face smartcard having front continuous metal layer (CML) and further having magnetic shielding material and a booster antenna circuit (BAC) enabling contactless "tap to pay" function operating from the rear side of the card body, according to an embodiment of the invention.

Figure 8B:
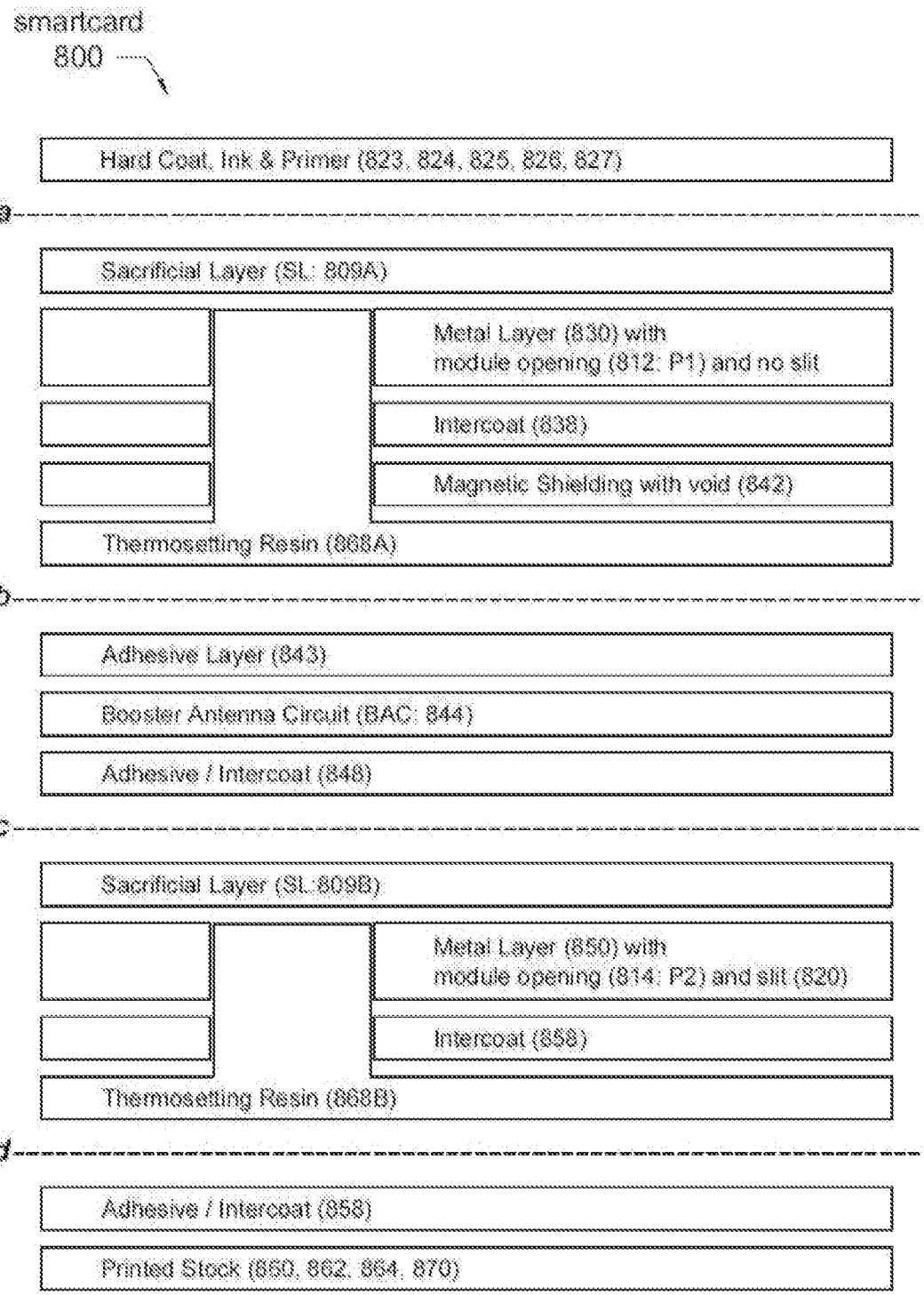

FIG. 8B is an exploded cross-sectional view (not to scale) of a smartcard having a booster antenna circuit (BAC), such as the smartcard shown in FIG. 8A, according to an embodiment of the invention.

Figure 8C:
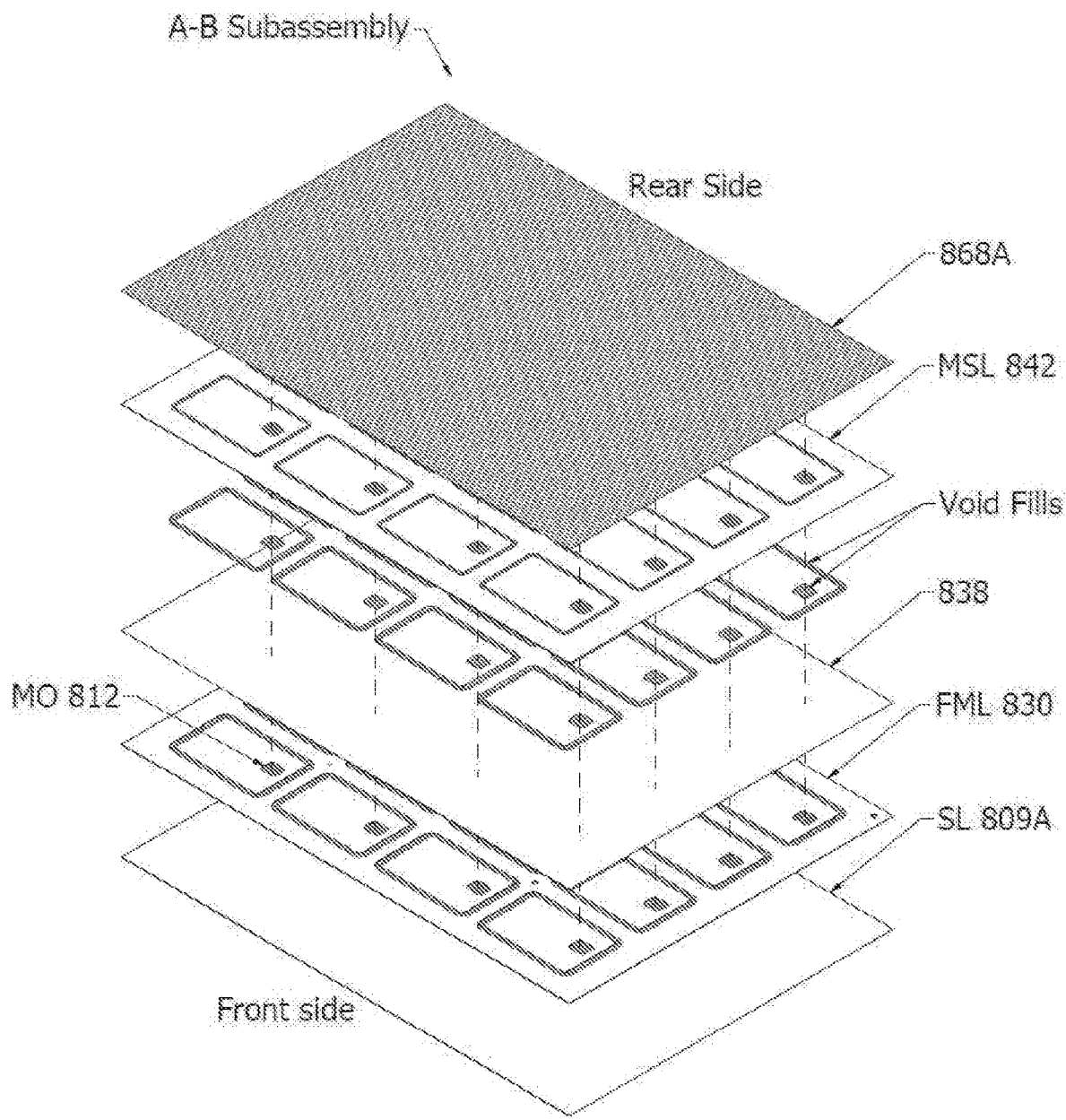

FIG. 8C is an exploded perspective view of a subassembly with an array of 16 card body sites representing the front stack-up constriction of section "a to b" as presented in FIG. 8B, according to an embodiment of the invention.

Figure 8D:
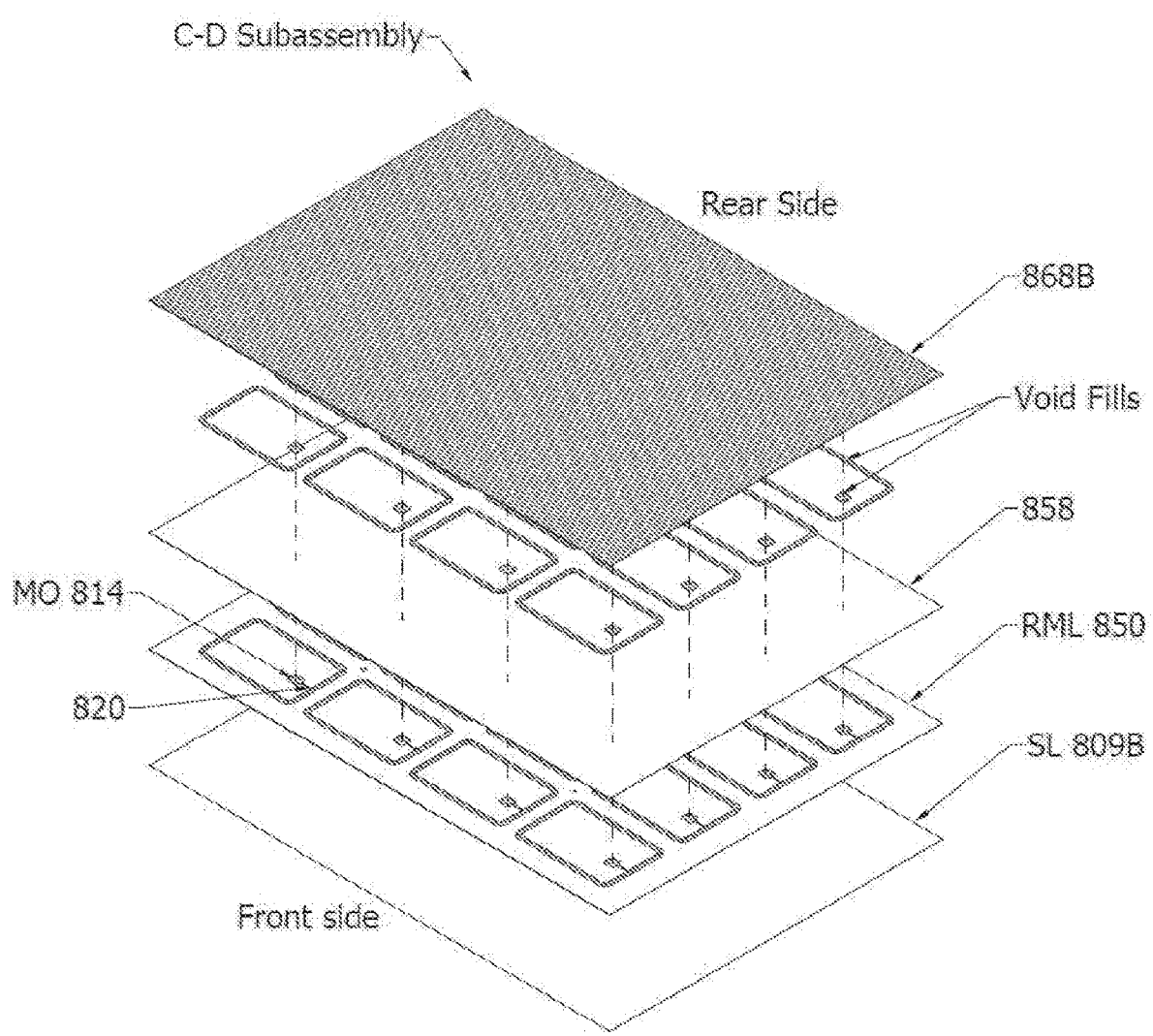

FIG. 8D is an exploded perspective view of a subassembly with an array of 16 card body sites representing the rear stack-up constriction of section "c to d" as presented in FIG. 8B, according to an embodiment of the invention.

Figure 8E:
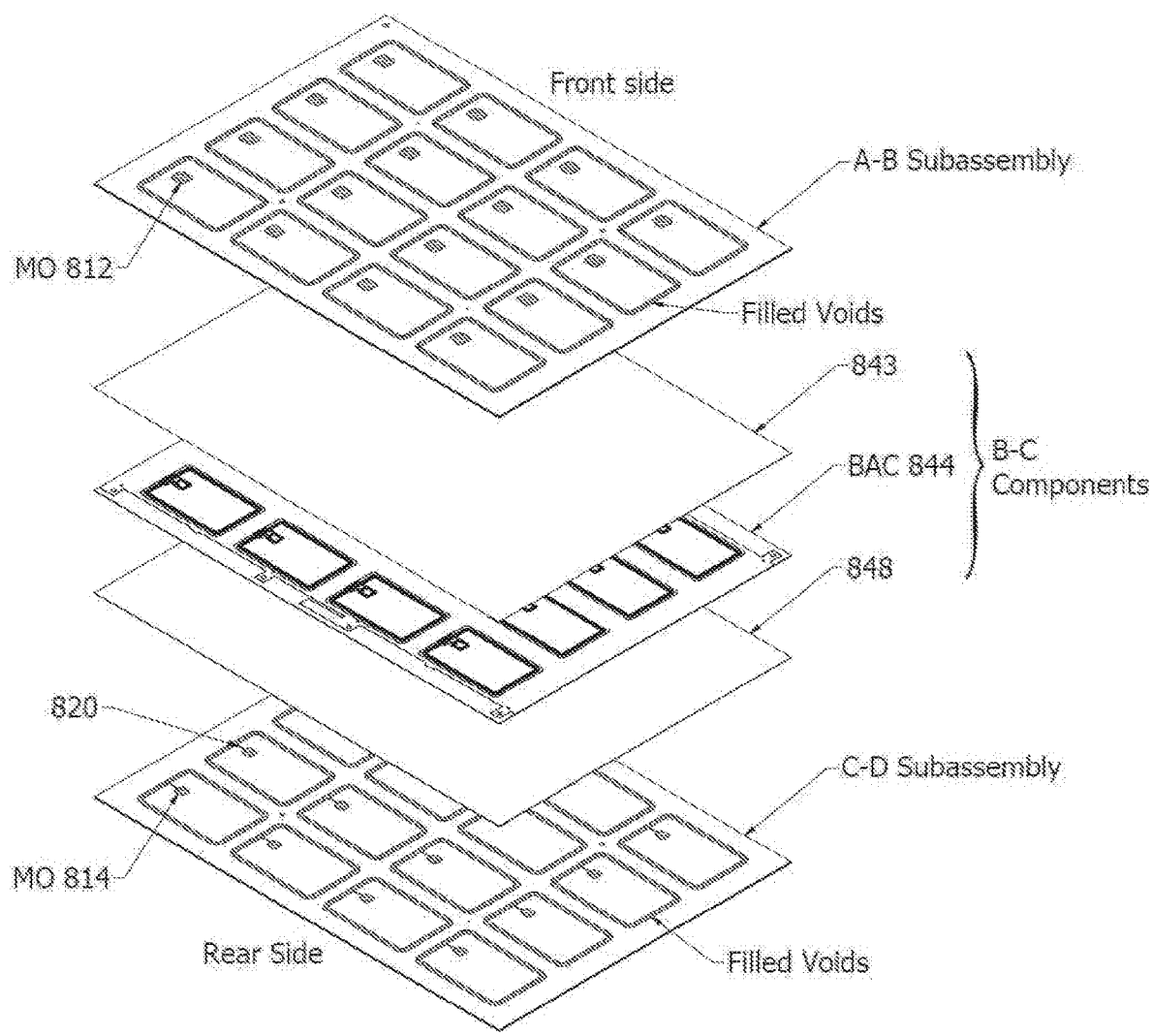

FIG. 8E is an exploded perspective view of the subassemblies "a to b" as shown in FIG. 8C and "c to d" as shown in FIG. 8D, with a center component section "b to c" as presented in FIG. 8B ready for press lamination with the subassemblies, according to an embodiment of the invention.

Figure 9A:
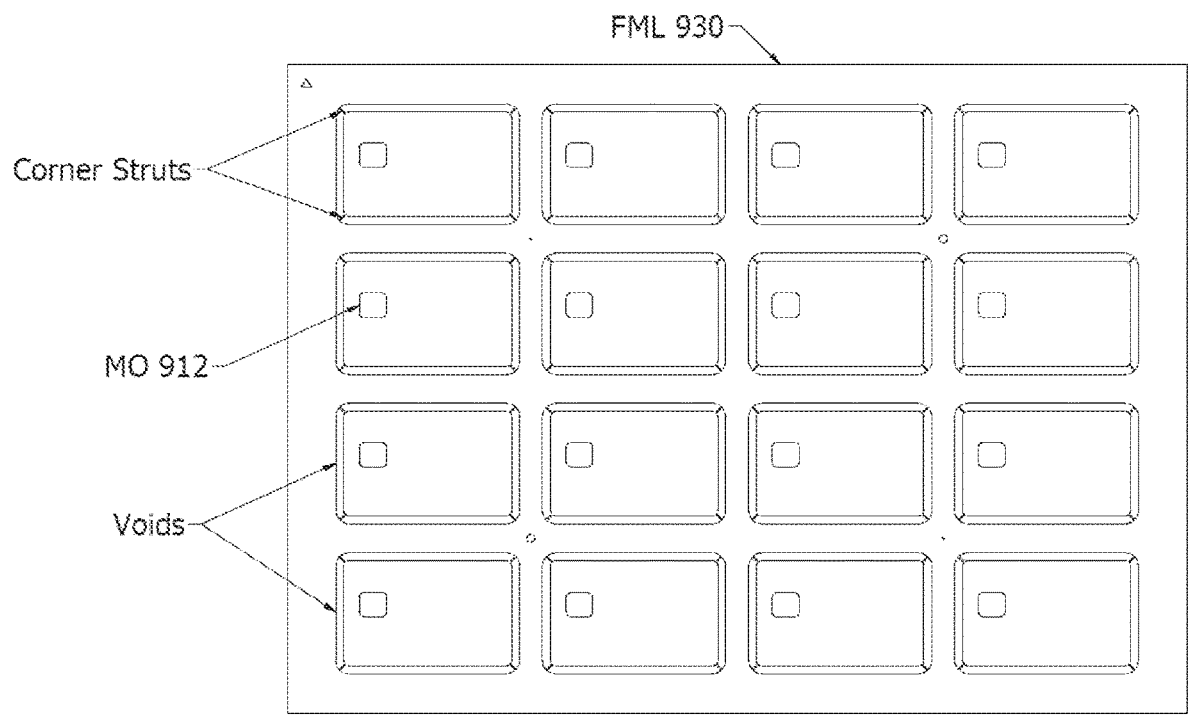

FIG. 9A is a front view diagram of a 16-up metal inlay with each card body site supported by corner struts with void sections between struts, similar to the prior art in FIG. 5 (FIG. 16 of U.S. Ser. No. 17/882569), and each card body site in the metal inlay provided with a laser-cut module opening, according to an embodiment of the invention.

Figure 9B:
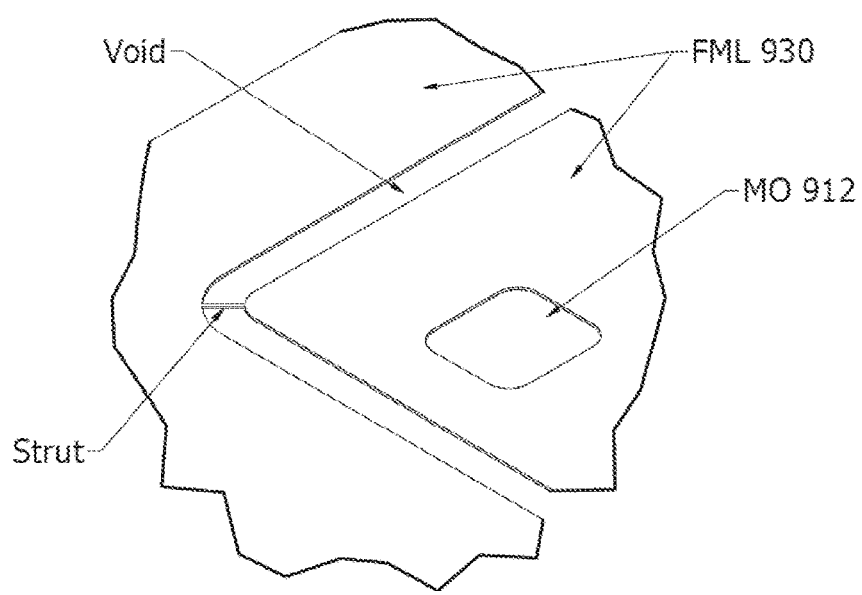

FIG. 9B is an exploded view of a card body site supported by a corner strut from the 16-up metal inlay array in FIG. 9A, according to an embodiment of the invention.

Figure 9C:
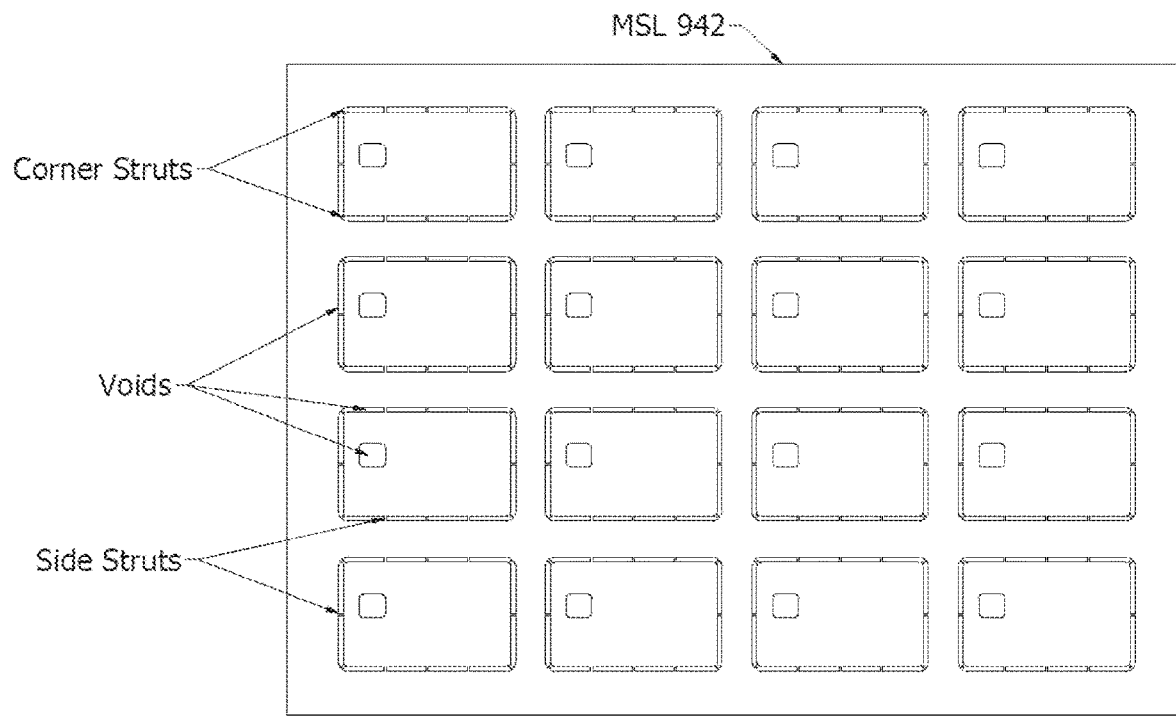

FIG. 9C is a front view diagram of a layer of magnetic shielding (ferrite or non-ferrite material) having an array of card body sites with a module opening at each site in the 16-up format, with each card body site in the array suspended by supporting struts and between struts void sections around all four edges, wherein the card body site of magnetic shielding material is sized slightly smaller than ISO 7810 card dimensions (ID-1) so that after final lamination of the card stack-up construction the magnetic shielding layer does not protrude to all four sides of the metal transaction card except in the areas of the supporting struts, according to an embodiment of the invention.

Figure 9D:
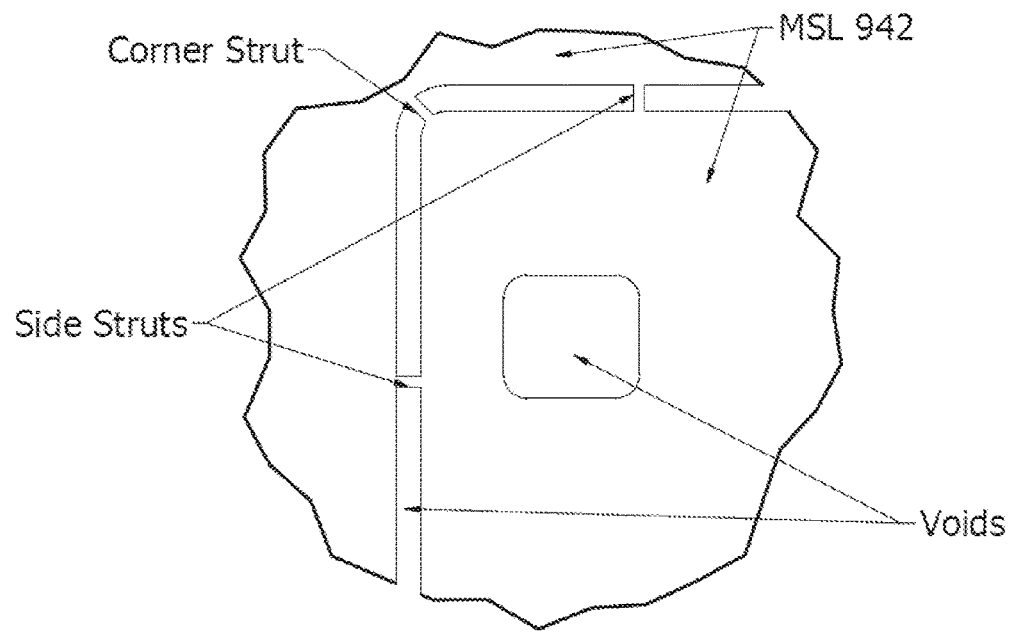

FIG. 9D is an exploded view of a card body site supported by multiple struts from the 16-up array of magnetic shielding material in FIG. 9C, according to an embodiment of the invention.

Figure 9E:
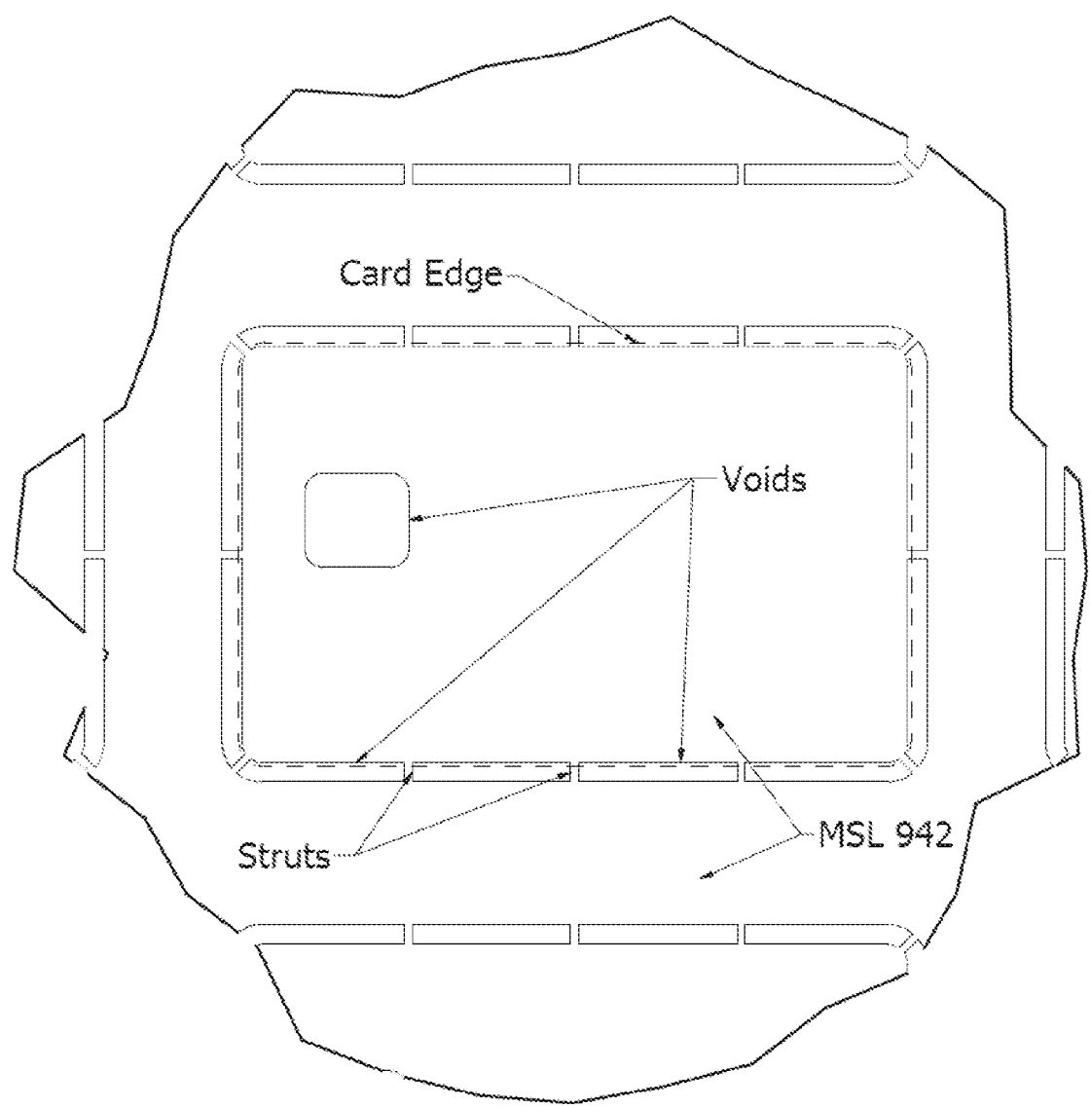

FIG. 9E is a diagram, enlarged view, of a single card body site of magnetic shielding material from the array of card body sites presented in FIG. 9C, with the card body of magnetic shielding sized slightly smaller than ISO card dimensions and suspended by 10 struts on the straight edges and corners for mechanical stability during handling and processing, ready for assembly to a front face metal layer and or for encapsulation with a thermosetting resin, according to an embodiment of the invention.

Figure 9F:
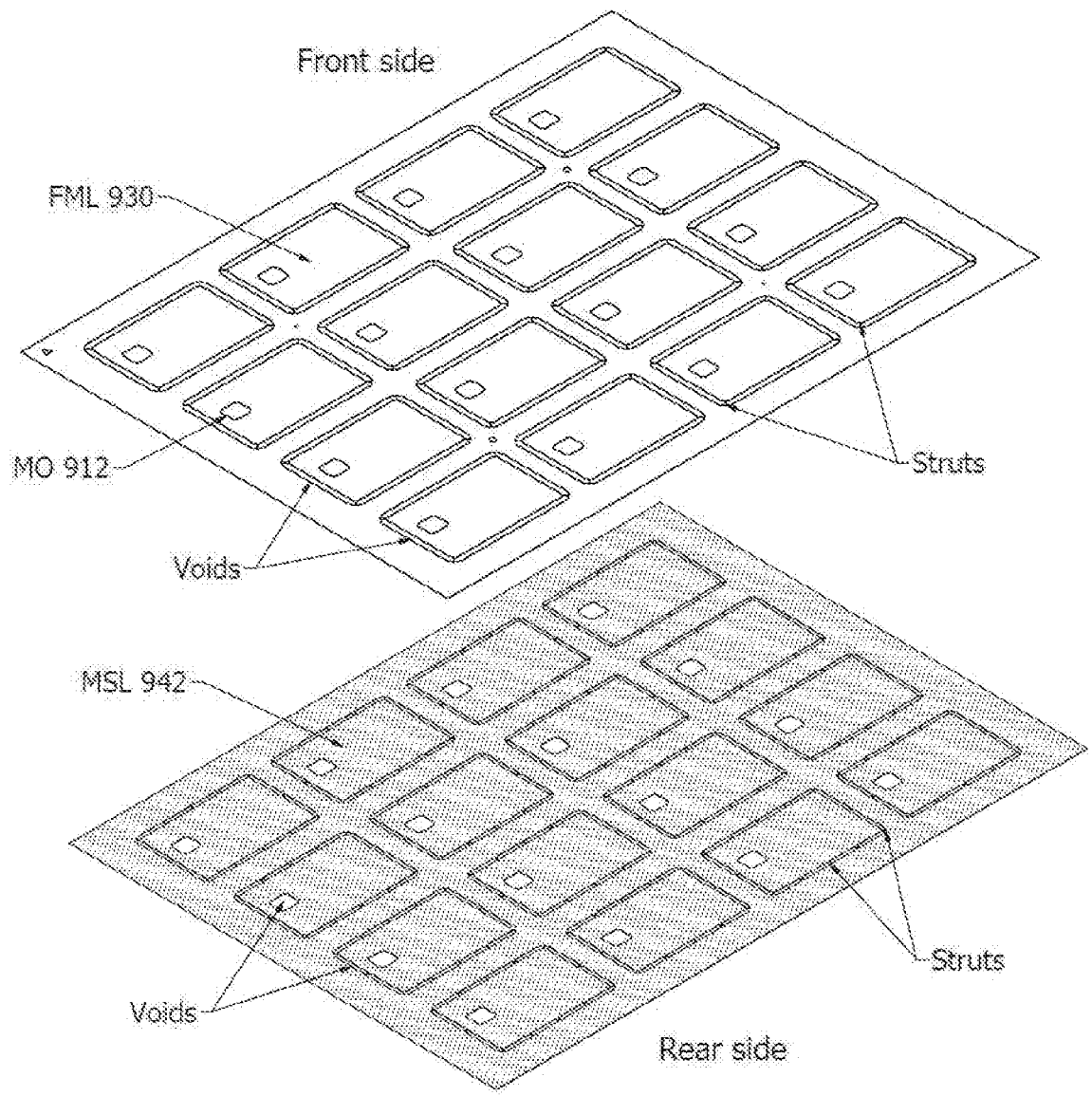

FIG. 9F is a perspective view of a metal inlay (front layer) with an array of card body sites supported by corner struts in the 16-up format and an underlying magnetic shielding layer (rear layer) with a corresponding array of card body sites of magnetic shielding supported by multiple struts, according to an embodiment of the invention.

Figure 9G:
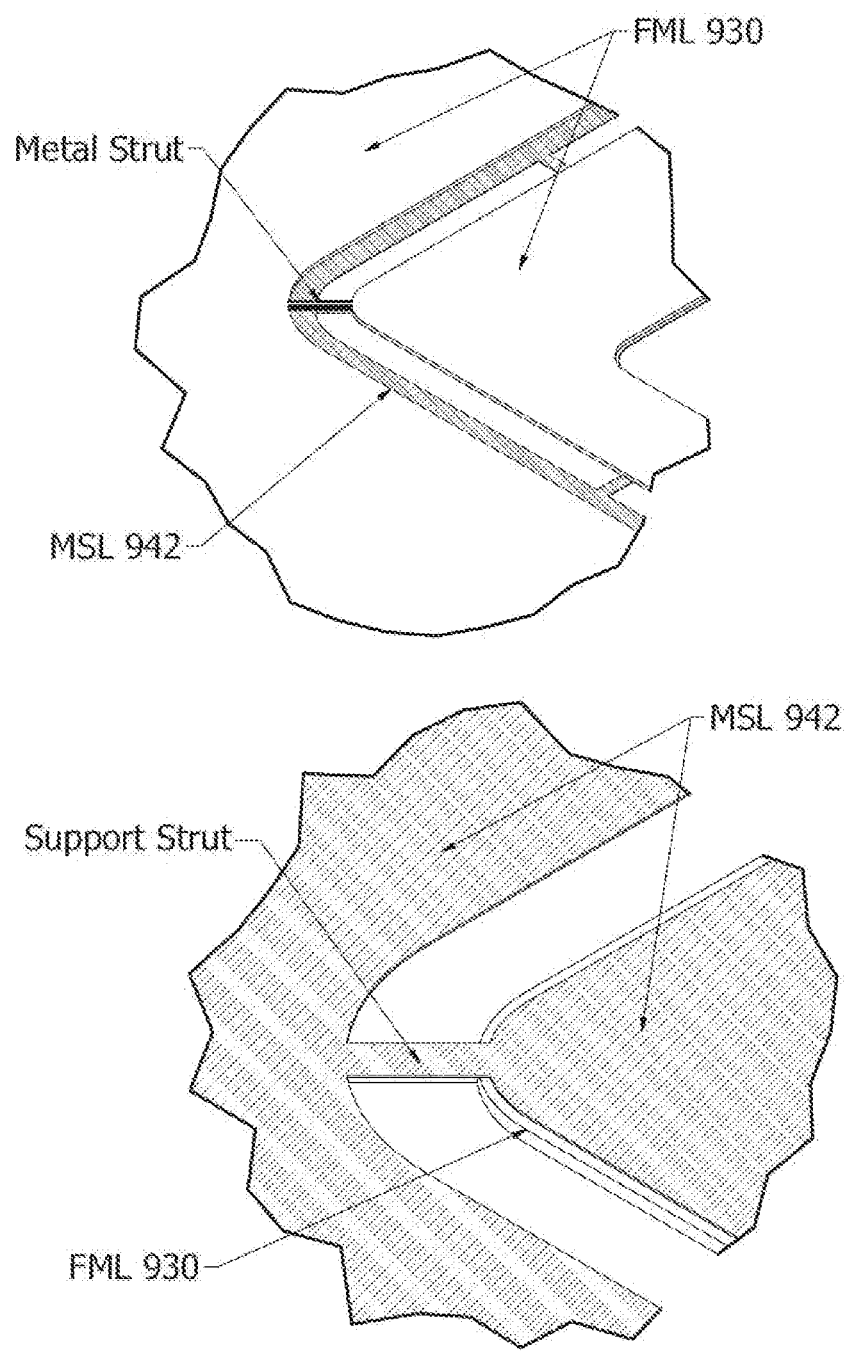

FIG. 9G is detailed view of the area around a corner strut after adhesive attachment of the magnetic shielding layer to the metal inlay, illustrating that the magnetic shielding material does not extend to the edges of the metal card body, accept at the position of the struts, according to an embodiment of the invention.

DESCRIPTION

Various embodiments (or examples) may be described to illustrate teachings of the invention(s), and should be construed as illustrative rather than limiting. It should be understood that it is not intended to limit the invention(s) to these particular embodiments. It should be understood that some individual features of various embodiments may be combined in different ways than shown, with one another. Reference herein to "one embodiment", "an embodiment", or similar formulations, may mean that a particular feature, structure, operation, or characteristic described in connection with the embodiment is included in at least one embodiment of the present invention. Some embodiments may not be explicitly designated as such ("an embodiment").

The embodiments and aspects thereof may be described and illustrated in conjunction with systems, devices and methods which are meant to be exemplary and illustrative, not limiting in scope. Specific configurations and details may be set forth in order to provide an understanding of the invention(s). However, it should be apparent to one skilled in the art that the invention(s) may be practiced without some of the specific details being presented herein. Furthermore, some well-known steps or components may be described only generally, or even omitted, for the sake of illustrative clarity. Elements referred to in the singular (e.g., "a widget") may be interpreted to include the possibility of plural instances of the element (e.g., "at least one widget"), unless explicitly otherwise stated (e.g., "one and only one widget").

In the following descriptions, some specific details may be set forth in order to provide an understanding of the invention(s) disclosed herein. It should be apparent to those skilled in the art that these invention(s) may be practiced without these specific details. Any dimensions and materials or processes set forth herein should be considered to be approximate and exemplary, unless otherwise indicated. Headings (typically underlined) may be provided as an aid to the reader, and should not be construed as limiting.

Reference may be made to disclosures of prior patents, publications and applications. Some text and drawings from those sources may be presented herein, but may be modified, edited or commented to blend more smoothly with the disclosure of the present application.

FIG. 1 shows a subassembly 36d which includes a metal substrate 365 and a plastic layer chip carrier assembly 185. FIG. 1 shows that the metal layer 365 can be a metal layer requiring no scribing or engraving. That is, there is no need to form a groove in the metal layer. A second sub-assembly 185 is formed which includes: (a) a ferrite shield 33 to shield a card antenna 24 formed on or within the plastic layer 185; (b) a chip module 20 and chip antenna 20b formed on or within the layer 185; and (c) a ferrite shield extension 33a to shield the chip antenna 20b and its pacing to the card antenna 24 to improve RF coupling. The card antenna 24 and the chip module may be formed as a step in the process of forming a sub-assembly 185 which, after being formed, could be subsequently attached to a metal layer 365. Not having to scribe or engrave the metal layer may be a significant saving in the cost of manufacture.

FIG. 2 shows an Advanced Smart Card 22 made according to the teachings of this patent disclosure. In its finished form, such an Advanced Smart Card will be comprised of a top layer 24, a bottom layer 26, and a center or core layer 28.

The top layer 24 is a film or sheet of synthetic paper PVC, Polycarbonate, or other suitable material. The bottom layer 26 is an electronics assembly on substrate circuit board (e.g. polyimide for flexible printed circuits or industry standard FR4 for conventional printed circuit boards) containing a number of integrated electronic components such as a Light Emitting Diode (LED) 30, a battery 32, a polymer dome switch 33, a microprocessor 35, an antenna 31, a Liquid Crystal Display (not shown). The center or core layer consists of a thermosetting polymeric material 34 (e.g., an initially liquid or semi-liquid thermosetting resin) that, upon curing, constitutes the center or core layer 28 of a finished Advanced Smart Card. The center or core layer 28 completely encapsulates all exposed electronic components on the top surface of the bottom layer 26. The thermosetting material 34 that eventually becomes the center layer 28 of the Advanced Smart Card is injected into the void space 36 between the top layer 24 and bottom layer 26. This injected polymeric material 34 should be capable of being injected under the relatively cold, low pressure forming conditions employed in applicant's process.

In any case, such thermosetting polymeric materials will be injected into, and fill, the void space 36 defined between the inside surface 38 of the top layer 24 and the inside surface 40 of the bottom layer 26. Upon curing, the polymeric material 34 of the center layer 28 should bond or otherwise adhere to both the inside surface 38 of the top layer 24 and the inside surface 40 of the bottom layer 26 to produce a unified Advanced Smart Card body. Such adhesion can be aided by treating the inside surfaces 38 and 40 of the top and bottom layers, respectively, in any one of several ways.

For example, bond promoting agents known to this art (e.g. chloro-polyolefins) may be employed to enhance bonding between the core layer-forming thermoset material and the material(s) from which the top and bottom layers are made (e.g., PVC, polyimide). By way of example only, Minnesota Mining and Manufacturing's base primer product 4475.RTM can be used for this bond enhancing purpose, especially when the top or bottom layer material is PVC. Other treatments that can be applied to the inside surfaces of the top and/or bottom layers include plasma corona treatments and acid etching.

The Advanced Smart Card's thickness 39 is defined by placement of the mold faces (not shown in FIG. 1) as the thermoset material is injected into the void space 36 as part of the cold, low pressure forming process of this patent disclosure. In effect, the injection of the thermoset material into the void space 36 between the top and bottom layers fills any portion of that void space 36 that is not otherwise occupied by the electronic components protruding from the bottom layer 26.

The layout of electronic components on the top surface of the bottom layer in the manner generally suggested in FIG. 2 allows the incoming liquid or semi-liquid polymeric material to flow over and around all sides of exposed electronic components.

The elastomeric properties of the cured thermoset polymer provide protection from physical and thermal stressors for the electronic components in the bottom layer. The shock-absorbing properties of the elastomer that encapsulates all exposed electronics enable the assembly to resist flexion and/or torsion and/or impact forces that the Advanced Smart Card may encounter upon either of its major outside surfaces or on any of its four outside edge surfaces. The thermal insulation properties of the elastomer also reduce the amount of heat to which the electronic components may be exposed during a final hot lamination process employing a thin layer of PVC to create a high quality exterior surface on the bottom surface of the bottom layer.

FIG. 3 shows an embedded electronic device and an injection nozzle. The injection molding apparatus injects thermosetting polymeric material via a nozzle 60 between the top overlay 40 and the bottom overlay 30 forming the core layer 50 from thermosetting polymeric material. Preferably, as mentioned above, the thermosetting polymeric material is polyurea.

Cold, low pressure forming conditions generally mean forming conditions wherein the temperature of the core layer 50 consisting of thermosetting polymeric material, is less than the heat distortion temperature of the top 40 and bottom 30 overlays, and the pressure is less than about 500 psi. Preferably, the cold forming temperatures will be at least 100° F. less than the heat distortion temperature of the top 40 and bottom 30 overlays. The heat distortion temperature of many polyvinyl chloride (PVC) materials is about 230° F. Thus, the temperatures used to cold form such PVC sheets in the present invention will be no more than about (230° F.−100° F.) 130° F.

In FIG. 4 shows a module 48 inserted between the upper side 140 of a first or lower plate 84 and the lower side 144 of a second or upper plate 86. The module section is shown with a frame 46, a substrate 12, and one of the four connecting segments 56 linking the substrate to the frame. The connecting segment 56 has an inner end 170 and an outer end 172. The connecting segment 56 is shown pushed downward by the inner end 164 of one of the down-set pins 102 into the depressed portion 112 of the lower plate 84. The displacement 155 of the substrate 12 from the frame 46 may be small, i.e., about ⅕ of the substrate thickness 13, or may be up to about three times the substrate thickness 13, depending on the thicknesses of substrate and semiconductor card 10.

The substrate 12 is shown with a circuit side 62 on which are mounted exemplary semiconductor elements 16 with connecting bond wires 17. The substrate 12 is held downward to depressed portion 112 (not shown) by the connecting segments 56, generally preventing passage of pressurized fluid polymer 15 (not shown) onto the substrate's opposing back side 64. For reference purposes, the peripheral opening 54 over the majority of the substrate 12 generally has a width 55 extending from the inner end 170 to the opening's outer edge 174 (see also FIGS. 19 and 20).

In FIG. 4, the central depressed region 134 forming the front face of the molded semiconductor card 10 is shown with a slightly indented label area 30 in which a label may be applied. In addition, FIG. 18 depicts a final singulation plane 168 relative to the molding apparatus 80. The semiconductor card 10 will be singulated from the frame 46 and wings 148 following removal from the molding apparatus 80.

Following molding and solidification of the casting in the molding apparatus 80, the unsingulated semiconductor card 10 may be ejected from the mold by further insertion of down-set pins 102, or use of other pins, not shown. Ease of ejection is enabled by the use of sloped lateral surfaces and rounded or oblique corners on the molded casting 180.

FIG. 5 shows a large generally rectangular metal inlay (MI: 1635) comprising a sheet or layer of metal (which may be referred to as the "body" of the metal inlay, and further comprising defining a plurality (sixteen shown) of smaller generally rectangular metal card body (MCB) sites arranged in a 4×4 array of card body sites. Each card body site corresponds with a single smartcard or transaction card. Each of the card body sites in the metal inlay is suspended by corner struts (CS: 1637) extending from all four corners thereof to the body of the metal inlay, with air gaps or void sections (VS: 1636), extending around all four sides of the card body sites (except for where the card body site is attached to the metal inlay). This results in the card body sites being "suspended" in the metal inlay by the corner struts.

The metal inlay (MI: 1635) may comprise 302 or 304 stainless steel, half hard or full hard. The card body sites (i.e., the voids or air gaps) may be laser cut, water cut or chemically etched from the metal inlay, leaving only the corner struts (CS: 1637) supporting each card body site. Later, removing (cutting) the corner struts will result in the card body sites being singulated from the metal inlay, and serving as a metal layer (ML) of a smartcard (or transaction card).

Reference is made to US 2021/0073608 (11 Mar. 2021; Finn), entitled DUAL INTERFACE METAL CARDS AND METHODS OF MANUFACTURING. Struts are shown therein at FIGS. 12-14, and are described as follows: [0448] FIG. 12 illustrates a perforated metal inlay (MI) site with a metal frame (MF) formed by laser cutting, water cutting or chemical etching, featuring a front and rear metal layer with a slit (S) and module opening (MO) to act as a coupling frame (CF), and the coupling frame (CF) supported by struts (SRTs) connected to said metal frame (MF), [0450] FIG. 13 illustrates a metal inlay (MI) in which the front and rear metal layers, consisting of a metal frame (MF) supporting a coupling frame (CF), are folded over on each other at the point of perforations (perfs). The coupling frame (CF) is supported in the metal frame (MF) by struts (SRTs), resulting in an air gap (ag). [0451] FIG. 14 illustrates a metal inlay (MI) disposed with a metal frame (MF) supporting a coupling frame (CF) which is suspended from the metal frame (MF) using supporting struts.

In each of FIGS. 12-14 in US 2021/0073608, a coupling frame (CF) is supported in a metal frame (MF) by only two struts, both extending from one side (of the four sides) of the coupling frame.

FIG. 5 shows four corner struts (CS) struts supporting each rectangular metal card body (MCB) site in the metal inlay (MI), the struts emanating from respective four corners of the meta card body. This provides more stability to the card body site in the metal inlay than the two struts on one side of a coupling frame disclosed in US 2021/0073608. It is within the scope of the invention that each rectangular metal card body (MCB) site may be supported in the metal inlay (MI) by struts located at other than the corners of the sites. For example, a site may be supported in the inlay by struts extending from at least two sides, such as opposite sides of the site. Or, there may be only three corner struts extending from three corners of the sites. Or, there may be a combination of corner struts and struts extending from the sides of the sites.

Each card body site comprises a module opening (MO: 1612) for receiving a transponder chip module (TCM) or the like. For a card body site intended to function as a discontinuous metal layer (ML), a discontinuity in the form of a slit (S) may be formed in the site, extending from the module opening to a perimeter edge thereof.

The metal inlay (MI: 1635) may have registration edges (or features, or fiducials) for later precision punching or cutting in facilitating the card singulation process. During the laser or water cutting process, the edges of the metal card bodies (MCBs) may be dulled (smoothed) to remove sharp edges.

The metal card body (MCB) at each site may be separated from the metal inlay (MI: 1635) by an air gap or a void section (VS: 1636) having a width of approximately 5 mm. The supporting corner struts (CS: 1637) may be positioned at the four corners of each metal card body (MCB), projecting at an angle therefrom and having a width of 0.5 mm to hold in position each metal card body (MCB).

A sacrificial layer (SL: not shown, see FIG. 14), such as polytetrafluoroethylene (PTFE), may be disposed on a front side (or face) of the metal inlay (MI: 1635) to protect the exposed metal surface from scratches, and to cover the air gaps or void sections (VS: 1636), module openings (MO: 1612) and slits. The sacrificial layer may be slightly larger than the metal inlay (MI: 1635), hanging over at least one edge thereof, to facilitate its later removal. The sacrificial layer may form pockets/channels at each air gap or void section (VS: 1636), module opening (MO: 1612) and slit in the metal inlay (MI: 1635).

The reverse side (or face) of the metal inlay (MI: 1635) may be provided with an adhesion promoter such as a primer (chemical bonding agent) and/or a thermosetting adhesive (coating or film) or a doubled-sided thermosetting adhesive film on a release carrier layer, with said adhesion promoter provided with cut-outs matching the dimensional and geometrical positions of the air gaps (or void sections (VS: 1636)), module openings (MO: 1612) and slits in the metal inlay (MI: 1635). The thermosetting adhesive film may be partially bonded to the metal inlay (MI: 1635) through a process of lamination. Subsequent removal of the release liner will leave a layer of thermosetting adhesive film disposed on the metal inlay (MI: 1635) with pockets/channels at each site in the array.

A coating of polyurethane resin (PU: 1668) with a given viscosity may be roll coated onto the surface of the adhesion promoter (a primer and/or a thermosetting adhesive (coating or film). The thickness of the coating may be controlled by a doctor blade and a rotating drum of resin to create an encapsulation layer of polyurethane (1668) having a controllable thickness (e.g. 50 μm), while at the same time filling the pockets and channels with resin (1668) at each site in the array of metal card body (MCB) sites. The encapsulation layer (1668) may contain glass fiber for rigidity and/or a pigment for color. The encapsulation layer (1668) may be further compressed with a pressure plate to remove gases, and left to cure to its final stage, typically after storage for a duration of one week. Before final curing of the encapsulation layer (1668), components and devices may be embedded into the resin (1668), followed by an additional coating layer (not shown). The solidified resin (1668) in its final curing state may be mechanically milled or planed to a preferred thickness before assembly of other layers in the card stack-up construction.

In a final step the shrouded metal inlay with polyurethane resin (1668) is laminated to other layers in the card stack-up construction, before separating (singulating) the metal card body sites from the metal inlay. The singulation process may simply involve removing the corner struts (CS: 1637) from the corners of each metal card body (MCB). The card singulation process is significantly reduced in terms of machining time and production yield. A particular advantage of laser cutting metal card body sites in a metal layer, with each metal card body suspended by four narrow struts, is the ability to DLC or PVD coat the exposed edges of the individual metal card bodies.

The adhesion promoter in the form of a primer and/or a thermosetting adhesive (coating or film) may be removed with the polyurethane resin (1668) applied directly to the metal inlay (MI: 1635) or metal layer. The metal surface may be first sand blasted or chemically treated to create a rough surface, to promote adhesion of the polyurethane resin (1668).

Glossary of Terms for Molding Thermosetting Resins

C stage: The final, cured state of a thermosetting resin.

Castable polyurethane: Castable polyurethanes are all liquid nonfoam urethane polymers, 100% (or nearly 100%) solids, reactive polymer systems.

Castable polyurethane ingredients: Polyol, diisocyanate and the chain extender (commonly called the curative). These three items are reacted together to give the polyurethane.

Casting: (a) The process of forming solid or hollow articles from fluid plastic mixtures or resins by pouring or injecting the fluid into a mold or against a substrate with little or no pressure, followed by solidification and removal of the formed object. (b) The process of forming solid or hollow articles from fluid plastic mixtures in a mold with little or no pressure. Following solidification, the articles are removed by the process known as demolding.

Compression mold: A precision-machined mold used in the process of compression molding.

Compression molding: A method of molding in which the preheated polymer is forced into a cavity. The material is subjected to pressure and (usually) heat until cure has been effected. The process most often employs thermosetting resins such as silicones for the production of medical devices.

Corona discharge treatment: An important surface treatment that renders normally inert polymers, such as olefins and fluorocarbons, more receptive to coatings, adhesives, and inks. The corona discharge oxidizes the surface of the polymer by the formation of polar groups on reactive site.

Curative: Materials that react with an isocyanate prepolymer to produce the final elastomer.

Cure time: The length of time required for sufficient reaction completion to develop desired polymer properties such as strength, dimensional stability, elongation, and so on. The longer the pot life, the longer is the cure time. Heat and catalysts facilitate the cure as they speed up the chemical activity of the compound.

Curing agent: A chemical that is added to a polyurethane mixture to affect a cure (molecular extension) in a polymer.

Curing agents (hardeners, curatives): Substances or mixtures of substances added to a compound to promote or control the curing reaction. Curing agents are reactive substances that become part of the molecular structure during cure.

Curing temperature: The temperature at which a thermosetting resin is subjected to attain final cure.

Curing time: The time necessary to attain full cure in a thermosetting resin.

Degassing: Also known as deaeration or vacuuming, removing air from a liquid material.

Delamination: The undesirable separation of one or more layers in a laminate caused by failure at the adhesive interphase.

Demold: The process of removing a specimen or cast from a mold.

Dip coating: A coating process wherein the object to be coated is immersed in a vessel containing a solution, dispersion, or heated fluid coating material, then withdrawn and subjected to heat or drying to solidify the film deposit. Fluidized-bed coating is a typical example of this technique.

Doctor bar (doctor blade, doctor knife): A precision-machined flat bar used for regulating the amount of liquid material on the rollers of a coating machine, or to control the thickness of a coating after it has been applied to a substrate.

Gel time: For polyurethanes, the interval of time between mixing together the polyol and diisocyanate or prepolymer and curative and the formation of a non-owing, semi-solid, jelly-like system.

Hardness: The resistance of a material to penetration, usually expressed in Shore A or Shore D units.

Hot cure: The curing of polyurethanes at temperatures between 50 and 110° C.

Inert gas: A gas that exhibits great stability and extremely low reaction rates under normal temperature and pressure conditions, for example, nitrogen, argon and helium. Nitrogen is commonly used in polyurethane processing.

Liquid injection molding (LIM): A process that involves an integrated system for proportioning, mixing, and dispensing two-component liquid resin formulations and directly injecting the resultant mix into a mold, which is clamped under pressure.

Mold release agent: A lubricant that prevents the casting from adhering to the mold. Useful release agents are telomers, silicones, synthetic and natural waxes, and various sorts of soaps.

Open cast molding: Polyurethane is smoothly poured into an open-top mold, or sometimes gently flowed up from the bottom of the mold. The product's top face, or open face, usually undergoes a secondary machining operation in order to remove the over-pour.

Open pour: The process of filling a mold by pouring polyurethane directly onto the lower surface of an open mold.

Pigment: A powdered or liquid substance used in resins that imparts coloration to the cured item. Can be organic or inorganic.

Polyurethanes: A large family of polymers based on the reaction products of an organic isocyanate with compounds containing a hydroxyl group. Polyurethanes are also called urethanes, a name that sometimes is confused with similar-sounding but totally different chemicals, including urea-formaldehyde and urethane (chemical name for ethyl carbamate). The general term polyurethane is not limited to those polymers containing only urethane linkages but includes polymers containing allophanate, biuret, carbodiimide, oxazolinyl, isocyanurate, uretidinedione, and urea linkages in addition to urethane.

Pot life: The period of time during which a reacting thermoset plastic remains suitable for processing after mixing with a reaction-initiating agent.

Prepolymer: The product from reacting a polyol with an isocyanate.

Primer: A coating applied to a substrate to improve the adhesion, gloss, or durability of a subsequently applied coating.

Process routes: Prepolymer process (bulk reaction between polyol and diisocyanate, with the curative added just before casting) or one-shot process (all ingredients mixed together and allowed to react).

Reaction injection molding (RIM): A process that involves the high-pressure impingement mixing of two or more reactive liquid components and injecting into a closed mold at low pressure. The RIM process includes four interdependent elements: the chemical system, the RIM machine, a mold support, and mold temperature-control system. Reaction injection molding refers to any molding system that involves filling a mold with a flowable polymerizable resin-forming composition, which may contain a reinforcement component, the resin-forming composition then undergoing polymerization to provide an article of desired molded configuration. The expression reaction injection molding as used is synonymous with those operations referred to as liquid reaction molding (LRM), reinforced reaction injection molding (RRIM), liquid injection molding (LIM), and liquid resin molding.

Release agent: A substance put on a mold surface or added to a molding compound to facilitate the removal of the molded product from the mold.

Shore hardness: The measure of firmness (resistance to indentation) of a compound determined by means of a durometer hardness gauge, measured on a Shore A or D scale.

Single shot: In this process all the ingredients are mixed together and the reaction is allowed to proceed to completion. The reaction often needs to be sped up by the addition of a catalyst. Due to the fact that the reaction gives off heat (exothermic), the process is mainly used in thin-walled applications where the generated heat can be readily dissipated. The equipment and mold set-up is similar to that used for RIM (reaction-in-mold) processing of two-part polyurethanes.

Venting: The displacement of air from the mold cavity as the cavity is filled by polyurethane. Venting normally occurs through small holes or seams in the mold located at strategic positions around the mold to ensure that all air is vented. When the mold is completely air free and polyurethane filled, a small amount of polyurethane also vents, further ensuring a completely air-free filling of the mold.

Polyurethane (PU) Casting
Introduction

Castable polyurethanes have the basic properties of thermosets in that they can only be processed once, plus they have the elastic of rubber over the full range of hardness. The equipment and mold set-up are similar to that used for RIM (reaction-in-mold) processing of two-part polyurethanes. Polyurethane will adhere to metal, but an engineering grade bond is required. This is obtained by proper preparation and the application of an inter-coat or bonding coat.

Vacuum Casting

In parts where amounts of entrapped air must be kept to an absolute minimum, the process may be carried out under full vacuum. The unit consists of two chambers, one for the mixing of the prepolymer, curative and other ingredients, and the lower chamber for the mold. The mixing is done under vacuum and the fully degassed mix is poured into the mold using remote handling equipment. As both chambers are under vacuum, there is no air to be displaced and the mold is filled completely with no entrapped gasses. In certain units the mix can be pressure transferred to the mold. A pot life of at least five to six minutes is needed for this method.

The advantage of this system is that bubble-free mixes are made, and the polyurethane will completely fill the mold as there is no air to displace.

Compression Molding

In this process the polyurethane mix is poured into a mold that can be placed into a compression molding press with heated platens. The material is allowed to gel and a top plate is placed on the material. The molding press is fully closed. The molds must be capable of withstanding the direct heat and pressure of the press. Aluminum or steel molds are preferred for this process. A variation in the compression molding technique is to use transfer molding.

Surface Preparation for Bonding

| Surface to which Polyurethane Can Be Bonded | Mechanical Preparation | Chemical Preparation |
| --- | --- | --- |
| Stainless steel | 40 grit-steel grit, clean sand, aluminum oxide grit | Dichromate treatment |

Bonding Primer

There are specialist primers on the market for bonding polyurethane to metals. The three most popular brands are:
1. Chemlok® (Lord Chemical Products, Erie, Pennsylvania)
2. Conap® R (Cytec Conap, Olean, New York)
3. Thixon® (Rohm and Hass, Philadelphia, Pennsylvania)

Avoid Forming Air Pockets

The mold must be designed so that the casting will fill from the bottom upward and not have a tendency to fold over itself. In other words, when pouring the polyurethane mix, care must be taken so that the polyurethane flows down to the base of the article and displaces the air as it fills from the bottom.

Competing Factors When Casting Polyurethanes

The temperature of the mix and the mold must be suitable for the part. The viscosity of the material must be as low as practicable to allow easy filling and release of entrapped air. The polyurethane temperature must not be too high as to cause too fast a gelation.

Machinability

Polyurethanes with a hardness above 90 Shore A are easy to machine. The harder the material, the easier it is to machine. All standard metal machining operations can be carried out with some care.

Liquid Resin Casting

Pouring a reactive liquid PU into molds, then allowing it to cure to solid form, describes the fundamentals of liquid resin casting.

Unlike injection molding, liquid resin casting is associated with mild processing conditions that allow delicate components, such as electronics, to be encapsulated directly into the final or near-net shape required.

New tooling starts with a model. A castable material of PU is poured over the model in one or more steps. The material then cures, creating a mold. (Molds may also be machined directly out of aluminum or another suitable material.) Once the mold is finished, parts are produced by pouring a resin into it and allowing the material to cure.

Equipment

Special equipment for liquid resin casting includes mixing and dispensing equipment for handling resins, degassing equipment for removing entrapped air within the resin, and ovens for curing materials.

Materials

Thermoset resins such as PUs are excellent general-purpose materials for both soft-rubber and hard-plastic applications where exceptional toughness and wear resistance are important.

Processing Parameters

Little or no pressure occurs within the liquid resin casting process, but humidity should be controlled during material handling. PUs are sensitive to moisture and will react to the presence of water in the mold. Release agents can be used on mold surfaces to facilitate part removal and are available in silicone-based and water-soluble formulations.

Reference is made to:

Ratna, D (2009): *Handbook of Thermoset Resins*, Shrewsbury, Shropshire: iSmithers—A Smithers Group Company Clemitson, I. R. (2012): *Polyurethane Casting Primer*, Boca Raton, Florida: CRC Press Taylor & Francis Group Szycher, M (2013): *Szycher's handbook of Polyurethanes Second Edition*, Boca Raton, Florida: CRC Press Taylor & Francis Group Clemitson, I. R. (2015): *Castable Polyurethane Elastomers*, Boca Raton, Florida: CRC Press Taylor & Francis Group Stainless Steel Protective Films During Pressing Operations Reference is made to:

https://www.novacel-protective.com/en/content/solutions/protective-films-tapes-for-metals/protective-films-for-stainless-steel/ https://www.novacel.world/en/content/this-is-novacel-to-always-serve-you/using-our-expertise-to-help-you-succeed/jean-loup-masson US 2016/0108291 (21 Apr. 2016; Novacel; Jean-Loup Masson et al.), entitled "Pressure-Sensitive Adhesive Film and use of Same for Protecting Surfaces", incorporated by reference herein, discloses a pressure-sensitive adhesive film that comprises a support coated with a pressure-sensitive adhesive, said support comprising an expanded polyolefin layer. Such an adhesive film is suitable for the temporary protection of surfaces.

US 2010/0255300 (7 Oct. 2010; Novacel; Catherine Coutey et al.), entitled "Pressure-Sensitive Adhesive Tape and Method for Production Thereof", incorporated by reference herein, discloses a pressure-sensitive adhesive film obtained by coating a polyolefin-based support layer with an aqueous acrylic dispersion-based adhesive layer. It also relates to the coating process for obtaining this film, and to methods of using the film.

FIG. 6A is a diagram (exploded perspective view) of the stack-up construction of a dual interface metal core smartcard (SC) having contactless "tap to pay" functionality operating from both sides of the card body (CB).

The smartcard (SC) comprises front synthetic layers (605, 606, 607, 608), and rear synthetic layers (608, 607, 606, 605) laminated with adhesive layers 643A and 643B, respectively, to a metal core comprising a single discontinuous metal layer (ML, DML: 650) having a module opening (MO: 612) and a slit (S: 620). The module opening and slit may both be laser cut into the metal layer.

The discontinuous metal layer (MCL, DML: 650) is encapsulated (covered) on at least one side with thermosetting resin, and is shown with its top and bottom sides both covered with thermosetting resin (668A, 668B). The thermosetting resin also fills the laser-cut module opening (MO: 612 or 614) and the slit (S: 620) in the discontinuous metal layer (DML: 650). In this, and other embodiments, the thermosetting resin may be transparent or pigmented.

Support

The thermosetting resin (668B) is disposed on the bottom surface of the metal layer (650), and "encapsulates" it. The intercoat (or inter-coat) (638) is shown disposed between the thermosetting resin (668B) and the bottom surface of the metal layer (650). The thermosetting resin (668B) is shown also filling the module opening (614) in the metal layer (650). The process of encapsulating may be coating, open cast molding, pressure casting, over-molding, compression molding, reaction injection molding (RIM) or reaction assisted molding process.

A similar situation exists with regard to the thermosetting resin (768A) disposed upon and encapsulating the bottom surface of the metal layer (730), with intercoat (738) therebetween, and filling the module opening (712). A similar situation exists with regard to the thermosetting resin (768B) disposed upon and encapsulating the bottom surface of the metal layer (750), with intercoat (748) therebetween, and filling the module opening (714). See FIG. 7B. A similar situation exists with regard to the thermosetting resin (868B) disposed upon and encapsulating the bottom surface of the metal layer (850), with intercoat (858) therebetween, and filling the module opening (814). A similar situation exists with regard to the thermosetting resin (868A) disposed upon and encapsulating the bottom surface of the metal layer (8300), with intercoat (838), therebetween, and filling the module opening (812), and as illustrated in FIG. 8B a magnetic shielding layer (842) may also be disposed between the bottom surface of the metal layer 830 and the thermosetting resin (868A).

The smartcard (SC: 600), which may also be referred to as a metal core transaction card, may comprise the following elements, and the following layers in the order shown. In this and other embodiments of smartcards disclosed herein, exemplary approximate thicknesses are presented for the various layers in the stack-up construction of the smartcard. Actual thicknesses may vary. Also, exemplary materials for the various layers of the various embodiments of smartcard constructions are disclosed herein.

- 600 smartcard (SC). The pre-lamination thickness of overall (all layers of) the card body (CB) may be approximately 810 μm. After lamination, the overall thickness of the card body (CB) may be approximately 790 μm.
- 610 transponder chip module (TCM) or inductive coupling chip module (ICM)
- 611 module antenna (MA)
- 605 top overlay layer (OL). The overlay layer may be laser engravable, and coated on one side (backside) with an adhesive coating. The thickness of the overlay layer may be 60 μm.
- 606 deposited ink
- 607 deposited primer. The combined thickness of the ink 606 and primer may be 8 μm.
- 608 transparent PVC print layer with printed artwork. The thickness of the print layer may be 125 μm.
- 643A adhesive layer (AL). The adhesive layer may comprise a thermosetting adhesive film layer (AL) which may be joined by way of press lamination of the front synthetic layer assembly (605, 606, 607, 608) to the top side of the encapsulated metal core (650?). An inter-coat layer (10 μm) may replace the adhesive film layer (25 μm)—thickness of the adhesive layer (AL): 25 μm

668A a layer of transparent thermosetting resin encapsulating (covering) the top side of the discontinuous metal core layer (DML: 650). The thickness of the thermosetting resin may be 40 μm.

628 inter-coat (an adhesion promoter in the form of a primer or an adhesive coating) applied to the top surface of the discontinuous metal core layer (DML: 650). The thickness of the inter-coat may be 10 μm.

650 metal core layer (ML, MCL), which may be a discontinuous metal layer (DML) with a laser-cut module opening (MO: 614) and slit (S: 620). The metal core layer may be stainless steel having a thickness of 304 μm (12 mils).

614 laser-cut module opening (MO: $P_2$)

616 metal edges around the laser-cut module opening (MO: 614)

620 slit in the discontinuous metal core layer (DML: 650)

638 inter-coat (an adhesion promoter in the form of a primer or an adhesive coating) applied to the bottom surface of the discontinuous metal core layer (DML: 650). The thickness of the inter-coat may be 10 μm.

668B a layer of transparent thermosetting resin encapsulating the bottom side of the discontinuous metal core layer (DML: 650) filling the laser-cut module opening (MO: 614) and the slit (S: 620). The thickness of the thermosetting resin may be 40 μm.

643B adhesive layer (AL). The adhesive layer may comprise a thermosetting adhesive film layer (AL) joining by way of press lamination the rear synthetic layer assembly to the bottom side of the encapsulated metal core layer, an inter-coat layer (10 μm) may replace the adhesive film layer (25 μm). The thickness of the adhesive layer (AL) may be 25 μm.

608 transparent PVC layer with printed artwork. The thickness of the print layer may be 125 μm.

607 deposited primer

606 deposited ink. The combined thickness of ink and primer may be 8 μm.

605 bottom overlay layer (OL) with magnetic stripe (not shown). The bottom overlay layer (OL) may be laser engravable, coated on one side (backside) with an adhesive coating. The thickness of the bottom overlay layer (OL) may be 60 μm.

FIG. 6B shows a smartcard (SC: 600) having a metal core, comprising three (3) main portions:

a top portion comprising front printed stock (605, 606, 607, 608)

a metal core; and a bottom portion comprising rear printed stock (608, 607, 606, 605).

Method and apparatus will be described.

The metal core portion of the smartcard comprises:

a metal layer (ML: 650) which is a discontinuous metal layer (DML) having a module opening (MO: 614) and a slit (S: 620);

thermosetting resin (TR: 668B) covering the bottom surface of the metal layer (ML) and filling the module opening and slit (S); and thermosetting resin (TR: 668A) covering the top surface of the metal layer (ML).

The layer of thermosetting resin on the bottom surface of the metal layer (and filling the module opening and slit), may be applied by a process of coating, over-molding, casting, reaction injection molding (RIM), or the like. In order to facilitate the process, a sacrificial layer (SL: 609) is applied on the top surface of the metal layer, covering the module opening (MO and slit (S), to retain the thermosetting resin in the module opening and slit, with a top surface of the thermosetting resin being substantially coplanar with the top surface of the metal layer. The sacrificial layer may comprise polytetrafluoroethylene (PTFE, Teflon®) or polyolefin backing film. The sacrificial layer will be removed after the thermosetting resin is sufficiently cured to remain in the module opening and slit, without leaking (bulging) out. Also, an inter-coat (638) is applied to the bottom surface of the metal layer to promote adhesion of the thermosetting resin and the metal layer.

The layer of thermosetting resin on the top surface of the metal layer may be applied by a process of coating, over-molding, casting, reaction injection molding (RIM) or the like, with the sacrificial layer in place (in situ).

Regarding the processes of applying the thermosetting resin on the top and bottom surfaces of the metal layer, injection molding is a problem because of the high temperature and pressure required. Other processes, such as Reaction Assisted Molding Process (RAMP) may be suitable. RAMP is already being used to encapsulate electronics into smart cards without requiring the traditional layering manufacturing process. Reference may be made to https://www-.plasticsnet.com/doc/first-reaction-injection-molding-now-reaction-0001

This results in a "metal core" component (between the dashed lines "a" and "b") comprising a metal layer coated on both of its top and bottom surfaces by thermosetting resin, and having the module opening and slit filled with thermosetting resin. (The sacrificial layer is part of the process, is removed, and is not part of the resulting metal core.)

In this, and other embodiments having a metal layer coated (encapsulated) by thermosetting resin, if the metal layer is stainless steel, an inter-coat in the form of an adhesion promoter such as a primer or thermosetting adhesive coating may be applied to the surfaces of the metal layer being encapsulated.

In this, and other embodiments, the metal layer, may benefit from mechanical and/or chemical surface preparation such as cleaning and dichromate treatment, sanding, sandblasting (or similar abrasive cleaning process), and/or ultra ultrasonic cleaning, particularly if the metal layer is stainless steel.

In this, and other embodiments having a metal layer coated (encapsulated) by thermosetting resin, the method of encapsulating may comprise coating, open cast molding, vacuum or pressure casting, over-molding, compression molding, reaction injection molding (RIM), reaction assisted molding process, and the like.

The thermosetting resin layers are cured.

A sacrificial layer on the top surface of a metal layer being encapsulated from the bottom side ensures that the thermosetting resin fills the module opening (and slit, if there is one), and will be flush with the top surface of the thermosetting resin encapsulated metal layer. The sacrificial layer may be removed before further process steps are performed, such as milling the filled module opening(s) to accept insertion of the transponder chip module (TCM).

The module opening, filled with thermosetting resin, may then be machined (milled) to accept insertion of a module (TCM, ICM). The module opening may be slightly larger than the module, so that the module does not contact the sides of the module opening of the metal layer. Also, the module will rest upon the thermosetting resin (668B). To enhance the machinability of resin encapsulated metal layers, polyurethanes with a hardness above 80 Shore A are recommended.

In a subsequent fabrication step, the front printed stock and rear printed stock may be laminated with elevated pressure and temperature to the metal core, with the module implanted after lamination.

FIG. 6C shows a typical module, which may be a transponder chip module (TCM) or an inductive coupling module (ICM). The module typically has a front portion supporting contact pads (CP) on its front surface and a module antenna (MA) on its rear surface, and has a rear portion supporting and encapsulating an integrated circuit (IC) chip.

The front portion of the module is typically larger (in area) than the rear portion of the module. A module opening (or openings) in layers of the smartcard may be "stepped", having an upper "P1" portion sized to receive the front (contact pads) portion of the module. A rear "P2" portion of the module opening may be sized to receive the rear (chip) portion of the module.

The terms "P1" and "P2" are used in FIG. 6C to identify the portions of the transponder chip module (TCM) corresponding with the "P1" and "P2" portions of a single module opening (FIG. 6B). In embodiments having two metal layers (refer, for example, to FIGS. 7B, 8B), a larger "P1" opening may be formed in the upper (front face) metal layer, and a smaller "P2" opening may be formed in the lower (supporting) metal layer. The "P1" opening in the upper metal layer is aligned above (atop) the "P2" opening in the lower metal layer.

The dimension of the front portion of the module may be 13.2×12.0 mm. The dimensions of a "P1" module opening (or portion of a stepped module opening) accepting the front portion of the module may be 13.7×12.5 mm. The depth (Z-height) of the P1 cavity is typically 0.195 mm The dimension of the rear portion of the module may be 9.4×8.4 mm. The dimensions of a "P2" module opening (or portion of a stepped module opening) accepting the rear portion of the module may be 9.8×8.8 mm. The depth (Z-height) of the P2 cavity is typically 0.65 mm The separation channel between the metal edges of the module opening in the front face metal layer and the upper portion of the chip module may be 0.25 mm on all (four) sides.

By having the module openings (and portions thereof) in the metal layer(s) larger than the corresponding portions of the module, this allows for thermosetting resin to "insulate" the module from the metal layer(s). In all of the embodiments, a separation channel of approximately 0.25 mm may be established between the module and the metal layer.

FIG. 7A illustrates a metal face smartcard (SC: 700) showing different layers in the stack-up construction, comprising:
 a front face (discontinuous) metal layer (ML, DML, FML: 730) encapsulated on its rear side with thermosetting resin (768A) acting as a dielectric medium and further filling a laser-cut module opening (MO: 712, $P_1$) and a slit (S: 720A) in the front face metal layer (FML: 730), and
 a supporting (discontinuous) rear metal layer (ML, DML, RML: 750) encapsulated on its rear side with thermosetting resin (768B) and further filling a laser-cut module opening (MO: 714, $P_2$) and a slit (S: 720B) in the supporting metal layer (RML: 750).

A transponder chip module (TCM/ICM: 710) is implanted in the resin filled laser-cut module opening (MO: 712) in the front face metal layer (FML: 730). The module antenna (MA: 711) of the module may inductively couple with the slit (S: 720B) and module opening (MO: 714) in the supporting (discontinuous) metal layer (RML: 750).

The front face discontinuous metal layer (DML: 730) has a straight or shaped slit (S: 720A) extending from (starting at) a perimeter edge of the discontinuous metal layer and ending at the laser-cut module opening (MO: 712). The module opening in the front face metal layer is sufficiently large to accept the "P1" dimension of the module which will be inserted (implanted) therein. The front face discontinuous metal layer (FML: 730) may be coated with a primer (727), followed by the selective application of ink (726) to print a filigree pattern and graphic elements on the metal surface, with the printed artwork protected by a coating of hard ink (725) and varnish (724). On top thereof, raised (embossed) characters (723) above the surface of the card may be digitally printed.

The front face discontinuous metal layer (FML: 730) with a straight or shaped slit (S: 720A) is mechanically reinforced by an underlying supporting metal layer (RML: 750) with a slit (720B) which is offset from the slit (720A) in the front face discontinuous metal layer (FML: 730). The supporting metal layer (RML: 750) is electrically separated from the front face metal layer by a layer of thermosetting resin (768A), epoxy or polyurethane, bonded by means of an upper inter-coat (738) and lower adhesive coat (743) to bond both of the (front face (730), supporting (750)) metal layers together. The straight or shaped slit (720A) and the laser-cut module opening (MO: 712) in the front face metal layer (FML: 730) may be filled with the thermosetting resin (768A) prior to assembly with the supporting metal layer. The underside of the supporting metal layer (RML: 750) is also encapsulated with a thermosetting resin (768B) which coats the bottom side of the metal layer and fills the laser-cut module opening (MO: 714) and slit (S: 720B). The encapsulated front and supporting metal layers (730, 750) may be laminated together via an adhesive layer (743A).

The construction of the smartcard 700 has been briefly described hereinabove, and comprises a number of layers. The stack-up (construction) of the smartcard is now described. Generally, the layers may be described starting with the front face metal layer with slit, and working both up (towards the front face of the card) and down (towards the rear face of the card) therefrom. Some details, which have already been described elsewhere, may be omitted from this description, for the sake of brevity. For descriptive purposes each layer may have a front surface and a rear surface.

700 smartcard (SC) or metal transaction card
  pre-lamination thickness of card body: ~823 µm
 710 transponder chip module/inductive coupling chip module (TCM/ICM)
 711 module antenna (MA)
 723 raised characters-post lamination varnish (PLV)
 724 laser reactive, protective gloss or matte coating
 725 a transparent coat of rigid ink (hard coat) for scratch protection applied over the graphic print layer (726), such as by means of digital printing
 726 graphic print layer-deposited ink (color)
 727 deposited primer. Combined thickness of the laser reactive, transparent hard coat, deposited ink and primer, approximately: 45 µm
 776 laser markings on the protective coating (724)
Alternative Option
 728 powder coating, decorative finish, PVD or DLC coating replacing the deposited primer (727), graphic print layer (726) and the transparent hard coat (725)

730 front metal layer (ML, FML), which may be a front face discontinuous metal layer (DML) with a laser-cut module opening (MO: 712) with metal edges (713) and a slit (720A)—thickness of the front metal layer: 304 µm stainless steel (12 mils)

712 laser-cut module opening (MO: $P_1$)

713 metal edges around the laser-cut module opening (MO: 712)

720A slit in the front face discontinuous metal layer (DML: 730)

738 inter-coat (an adhesion promoter in the form of a primer or an adhesive coating) applied to the backside surface of the front face discontinuous metal layer (DML: 730)—thickness of the inter-coat: 10 µm 768A a layer of transparent thermosetting resin encapsulating the bottom side of the front face discontinuous metal layer (DML: 730) filling the laser-cut module opening (MO: 712) and the slit (S: 720A)—thickness of the thermosetting resin: 40 µm 743A adhesive layer (AL), a thermosetting adhesive film layer (AL) joining by way of press lamination the front metal layer subassembly to the rear metal layer subassembly, an inter-coat layer (10 µm) may replace the adhesive layer (25 µm)—thickness of the adhesive layer (AL): 25 µm 750 rear metal layer (ML, RML), which may be a supporting discontinuous metal layer (DML) with a laser-cut module opening (MO: 714) and a slit (S: 720B)—thickness of the rear metal layer: 152 µm stainless steel (6 mils)

714 laser-cut module opening (MO: $P_2$)

716 metal edges around the laser-cut module opening (MO: 714)

720B slit in the rear discontinuous metal layer (DML: 750)

748 inter-coat (an adhesion promoter in the form of a primer or an adhesive coating) applied to the top surface of the rear discontinuous metal layer (DML: 750)—thickness of the inter-coat: 10 µm 768B a layer of thermosetting resin encapsulating the topside of the discontinuous metal layer (DML: 750) filling the laser-cut module opening (MO: 714) and the slit (S: 720)—thickness of the thermosetting resin: 40 µm 743B adhesive layer (AL), a thermosetting adhesive film layer (AL), an inter-coat layer (10 µm) may replace the adhesive layer (25 µm)—thickness of the adhesive layer (AL): 25 µm 760 graphic print layer (GPL), which may be a synthetic layer (PVC)—thickness of the graphic print layer: 125 µm 764 offset ink layer—lithographic printing—thickness of the printed ink: 16 µm 770 overlay layer (OL), which functions as a protective film—thickness of the overlay layer: 60 µm 774 magnetic stripe mounted to the rear overlay layer (770)

776 laser markings on the protective film (770)

FIG. 7B shows a smartcard (SC: 700) having a metal face, comprising the following main portions:
 a top protective portion comprising hard coat, ink and primer (723, 724, 725, 726, 727)
 a front face metal portion;
 a supporting metal portion; and
 a bottom portion comprising rear printed stock (760, 764, 770).

Method and apparatus will be described.

The front face metal portion of the smartcard, between the dashed lines "a" and "b" comprises:
 a metal layer (ML: 730) which is a discontinuous metal layer (DML) having a module opening (MO: 712, P1) and a slit (S: 720A);
 an inter-coat (738) covering the bottom surface of the metal layer (ML); and thermosetting resin (TR: 768A) covering the inter-coat (738) on the bottom surface of the metal layer (ML) and filling the module opening (MO) and slit (S).

The layer of thermosetting resin on the bottom surface of the metal layer (730), and filling the module opening and slit, may be applied by a process of coating, over-molding, casting, reaction injection molding (RIM), or the like. In order to facilitate the process, a sacrificial layer (SL: 709A) is applied on the top surface of the metal layer (730), covering the module opening (MO) and slit (S), to retain the thermosetting resin in the module opening and slit, with a top surface of the thermosetting resin being substantially coplanar with the top surface of the metal layer. The sacrificial layer may comprise polytetrafluoroethylene (PTFE, Teflon® or polyolefin backing film. The sacrificial layer will be removed after the thermosetting resin is sufficiently cured to remain in the module opening and slit, without leaking (bulging) out. The inter-coat (738) applied to the bottom surface of the metal layer promotes adhesion of the thermosetting resin (768A) and the metal layer (730).

The supporting metal portion of the smartcard comprises:
 a metal layer (ML: 750) which is a discontinuous metal layer (ML, DML) having a module opening (MO: 714, P2) and a slit (S: 720B);
 an inter-coat (748) covering the bottom surface of the discontinuous metal layer; and thermosetting resin (TR: 768B) covering inter-coat (738) on the bottom surface of the discontinuous metal layer and filling the module opening and slit.

The module opening (714) in the "lower" supporting metal layer (750) is aligned (such as, but not necessarily concentric) with the module opening (712) in the "upper" front face metal layer (730). The module opening (712) is sized ("P1") to receive the larger, front portion (with contact pads) of the chip module, and the module opening (714) is sized ("P2") to receive the smaller, rear portion (with IC) of the chip module. Refer to FIG. 6C. The "P1" and "P2" openings are "over-sized"—such as 0.4 or 0.5 mm larger than the corresponding portion of the chip module received therein—so that after milling the thermosetting resin from inside the module openings, a thin (0.2 or 0.25 mm thick layer of thermosetting resin will remain between the respective portion of the chip module and module opening in the corresponding metal layer. This may also apply to the comparable module openings (812 and 814) in the metal layers (830 and 850) FIG. 8 embodiment, described below. For the single module opening (614) in the single metal layer (650) embodiment of FIG. 6, the module opening (614) may be "stepped", having a larger upper "P1" portion disposed atop and aligned with and a smaller lower "P2" portion.

The layer of thermosetting resin on the bottom surface of the metal layer (750), and filling the module opening and slit, may be applied by a process of coating, over-molding, casting, reaction injection molding (RIM), or the like. In order to facilitate the process, a sacrificial layer (SL: 709B) is applied on the top surface of the metal layer (750), covering the module opening (MO) and slit (S), to retain the thermosetting resin in the module opening and slit, with a top surface of the thermosetting resin being substantially coplanar with the top surface of the metal layer.

The sacrificial layer may comprise polytetrafluoroethylene (PTFE, Teflon®) or polyolefin backing film. The sacrificial layer will be removed after the thermosetting resin is sufficiently cured to remain in the module opening and slit, without leaking (bulging) out. The inter-coat (748) applied to the bottom surface of the metal layer promotes adhesion of the thermosetting resin (768B) and the metal layer.

Regarding the processes of applying the thermosetting resin on the bottom surfaces of the metal layers (730, 750), injection molding is a problem because of the high temperature and pressure required. Other processes, such as Reaction Assisted Molding Process (RAMP) may be suitable. RAMP is already being used to encapsulate electronics into smart cards without requiring the traditional layering manufacturing process. Reference may be made to https://www.plasticsnet.com/doc/first-reaction-injection-molding-now-reaction-0001

This results in a front face metal component (between the dashed lines "a" and "b") comprising a metal layer (730) coated on its bottom surface by thermosetting resin, and having the module opening and slit filled with thermosetting resin. (The sacrificial layer 709A is part of the process, is removed before laminating, and is not part of the resulting front face metal component.)

This results in a supporting metal component (between the dashed lines "c" and "d") comprising a metal layer (750) coated on its bottom surface by thermosetting resin, and having the module opening and slit filled with thermosetting resin. (The sacrificial layer 709B is part of the process, is removed, and is not part of the resulting front face metal component.)

The thermosetting resin layers are cured.

The supporting metal component (between the dashed lines "c" and "d") is disposed behind the front face metal component (between the dashed lines "a" and "b") and may be joined thereto with an adhesive layer 743A (between the dashed lines "b" and "c") using a process such as press lamination.

The module openings (712, P1) and (714, P2), filled with thermosetting resin, may then be machined (milled) to accept insertion of a module (TCM, ICM). The module opening may be slightly larger than the module, so that the module does not contact the sides of the module opening of the metal layer. Also, the module will rest upon the thermosetting resins (768A, 768B).

The module typically has a front portion supporting contact pads on its front surface and a module antenna on its rear surface, and has a rear portion supporting the chip. The front portion of the module is typically larger (in area) than the rear portion of the module. The "P1" opening in the front face metal layer (730) is sized to receive the front (contact pads) portion of the module. The "P2" opening in the supporting metal layer (750) is sized to receive the rear (chip) portion of the module.

In a subsequent fabrication step, the front printed stock and rear printed stock may be laminated with elevated pressure and temperature to the upper and lower encapsulated metal layers, with the module implanted after lamination.

FIG. 8A—Metal face Transaction Card with Booster Antenna Circuitry

Generally, the smartcard 800 comprises two metal layers, a front face continuous metal layer (ML, CML: 830) which has a module opening (MO: 812) and no slit, and a supporting discontinuous metal layer (ML, DML: 850) having a module opening (MO: 814) and a slit (S: 820). A magnetic shielding layer (842) is disposed beneath the front face continuous metal layer, and attached thereto via an inter-coat layer (838).

Thermosetting resin (TR: 868A) covers the back surface of the front face continuous metal layer (and magnetic shielding layer, and also fills the module opening (812).

Thermosetting resin (TR: 868B) covers the back surface of the underlying, supporting discontinuous metal layer, and also fills the module opening (814) and slit (820).

A booster antenna circuit (BAC: 844) is mounted via an adhesive layer (843) to the magnetic shielding layer (842).

The thermosetting resin can be used to create a separation layer in lieu of an Adhesive Spacing Layer (ASL) or in combination thereof to distance the booster antenna circuit from the magnetic shielding layer. This distance should be 50 μm or greater to achieve optimum shielding and RF functionality.

The booster antenna circuit may be attached by means of an inter-coat to the rear discontinuous metal layer having its underside encapsulated with a thermosetting resin which further fills the laser-cut module opening and slit in the discontinuous metal layer, and the magnetic shielding layer with a void attached by means of an inter-coat to the front face continuous metal layer encapsulated with a thermosetting resin which further fills the void in the magnetic shielding layer and the laser-cut module opening in the continuous metal layer, with the adhesive spacing layer joining by way of press lamination the subassembly of the front face continuous metal layer with the attached magnetic shielding layer, to the subassembly of the rear discontinuous metal layer with the attached booster antenna circuit The following elements may be shown and described in FIG. 8A and may correspond with similarly numbered elements in FIG. 7A (e.g., 8 nn may correspond with 7 nn):
- 800 smartcard (SC) or metal transaction card pre-lamination thickness of card body: 849 μm
- 810 transponder chip module/inductive coupling chip module (TCM/ICM)
- 811 module antenna (MA)
- 823 raised characters—post lamination varnish (PLV)
- 824 laser reactive, protective gloss or matte coating
- 825 a transparent coat of rigid ink (hard coat) for scratch protection applied over the graphic print layer (826), such as by means of digital printing
- 826 graphic print layer—deposited ink (color)
- 827 deposited primer
  Combined thickness of the laser reactive, transparent hard coat, deposited ink and
- primer, approximately: 45 μm
- 876 laser markings on the protective coating (824)

Alternative Option
- 828 powder coating, decorative finish, PVD or DLC coating replacing the deposited primer (827), graphic print layer (826) and the transparent hard coat (825)
- 830 front (face) metal layer (ML, FML), which may be a continuous metal layer (CML) with a laser-cut module opening (MO: 812) with metal edges (813)—thickness of the front metal layer: 203 μm stainless steel (8 mils)
- 812 laser-cut module opening (MO: $P_1$)
- 813 metal edges around the laser-cut module opening (MO: 812)
- 838 inter-coat (an adhesion promoter in the form of a primer or an adhesive coating)—thickness of the inter-coat: 10 μm
- 842 magnetic shielding layer (MSL) with a void—thickness of the magnetic shielding layer: 65 μm 868A a layer of thermosetting resin encapsulating the magnetic shielding layer (MSL: 842) and filling the void in the magnetic shielding layer and the laser-cut module opening (MO: 812)—thickness of the thermosetting resin: 40 μm 843 adhesive spacing layer (ASL), a layer of thermosetting adhesive film joining by way of press lamination the top subassembly to the bottom subassembly—thickness of the adhesive spacing layer: 25 μm 844 booster antenna circuit (BAC) on a PET carrier layer (23 μm) having plated copper tracks and antenna circuitry on both sides (18 μm)—thickness of booster antenna circuit: 23 μm, assuming the copper tracks sink into the 25 μm adhesive layers 844A perimeter coil (PC)

844B PET (polyethylene terephthalate) carrier layer 844C coupler coil (CC)

844D capacitor bank 848 inter-coat (an adhesion promoter in the form of a primer, an adhesive coating or an adhesive film) with a thickness to insulate the copper plated tracks and circuitry on the PET carrier layer from the rear metal layer (ML, RML): 25 μm 850 rear metal layer (ML, RML), which may be a discontinuous metal layer (DML) with a laser-cut module opening (MO: 814) and a slit (S: 820)—thickness of the rear metal layer: 152 μm stainless steel (6 mils)

814 laser-cut module opening (MO: $P_2$)

816 metal edges around the laser-cut module opening (MO: 814)

820 slit in the discontinuous metal layer (DML: 850)

858 top inter-coat (an adhesion promoter in the form of a primer or an adhesive coating)—thickness of the inter-coat: 10 μm 868B a layer of thermosetting resin encapsulating the underside (backside) of the discontinuous metal layer (DML: 850) filling the laser-cut module opening (MO: 814) and the slit (S: 820)—thickness of the thermosetting resin: 40 μm 858 bottom inter-coat (an adhesion promoter in the form of a primer, an adhesive coating or an adhesive film)—thickness of the inter-coat: 10 μm 860 graphic print layer (GPL), which may be a synthetic layer (PVC)—thickness of the graphic print layer: 125 μm 862 primer 864 deposited ink (color)—combined thickness of primer and ink: 16 μm 870 overlay film or layer (OL), which functions as a protective film—thickness of the overlay layer: 60 μm 874 magnetic stripe mounted to the rear overlay layer (870)

876 laser markings on the protective film (870)

FIG. 8A is a diagram (exploded perspective view) of the stack-up construction of a dual interface metal face smartcard (SC: 800) with contactless "tap to pay" function operating from the rear side of the card body (CB) with two metal layers, one continuous (CML: 830) and the other discontinuous (DML: 850), sandwiching a booster antenna circuit (BAC: 844) mounted to a magnetic shielding layer (MSL: 842) using an adhesive spacing layer (ASL: 843), with the booster antenna circuit (BAC: 844) attached by means of an inter-coat (848) to the rear discontinuous metal layer (DML: 850) having its underside encapsulated with a thermosetting resin (868B) which further fills the laser-cut module opening (MO: 814) and slit (S: 820) in the discontinuous metal layer (DML: 850), and the magnetic shielding layer (MSL: 842) with a void attached by means of an inter-coat (838) to the front face continuous metal layer (CML: 830) encapsulated with a thermosetting resin (868A) which further fills the void in the magnetic shielding layer (MSL: 842) and the laser-cut module opening (MO: 812) in the continuous metal layer (CML: 830), with the adhesive spacing layer (ASL: 843) joining by way of press lamination the subassembly of the front face continuous metal layer with the attached magnetic shielding layer, to the subassembly of the rear discontinuous metal layer with the attached booster antenna circuit.

The adhesive spacing layer 25 μm (ASL: 843) and the encapsulation (868A) over the magnetic shielding layer 40 μm (MSL: 842) provides a gap of 65 μm between the booster antenna circuit (844) and the magnetic shielding layer (MSL: 842), thus improving the contactless communication in terms of activation distance.

The front face solid metal layer (CML: 830) is continuous metal layer with no discontinuity. The rear metal interlayer (DML: 850) is a discontinuous metal layer having a laser module opening (MO: 814) and a slit (S: 820) to function as a coupling frame for contactless communication. The laser-cut module opening (MO: 814) accepts the placement of a transponder chip module (TCM: 810) with its module antenna (MA: 811) inductively coupling with the coupler coil (CC: 844C) of the booster antenna circuit (BAC: 844) and overlapping the laser-cut module opening (MO: 814) and slit (S: 820) in the rear metal layer (DML: 850). The dimensional arrangement of the module antenna (MA: 811), coupler coil (CC: 844C) and laser-cut module opening (MO: 814) is one of concentricity.

The stack-up construction of the card body (CB) 800 (smartcard (SC) or transaction card (TC)) with a front face continuous metal layer without a discontinuity and a rear discontinuous metal layer with a discontinuity may comprise the following layers (all dimensions and parameters are exemplary and approximate):

810: Dual-interface transponder chip module (TCM) or inductive coupling chip module (ICM);

812: Laser-cut module opening (MO: $P_1$) with metal edges (813) in the front face metal layer (CML: 830) without a slit;

814: Laser-cut module opening (MO: $P_2$) with metal edges (816) in the rear metal layer (DML: 850) with a slit (S: 820);

876: Operation of laser marking the laser reactive protective layer (824) with personalization data;

824: Laser reactive protective layer (10 μm)—a hard top-coat lamination film or a deposited coating (ink, varnish, enamel, lacquer or a polymer as a matte or gloss finish) which can be laser marked or laser engraved;

825: Optionally a hard coat layer of rigid ink for scratch protection (10 μm) as opposed to stretchable ink used in the deposition of the graphic print layer (826);

826: A print layer (35 μm) which may comprise: (i) a digital, silk screen, lithographic or thermo-graphic layer of clear or colored ink, (ii) a baked-on-ink layer, (iii) a PVD or DLC coating, or (iv) a combination thereof, including an adhesion promoter or primer applied between the metal layer (CML: 830) and subsequent print/coating layers;

830: Front face metal layer without a slit ("continuous"), which may have the graphic print layer (826) disposed on it. A typical thickness for this metal layer may be 203 μm (8 mils);

838: Inter-coat (10 μm), an adhesion promoter in the form of a primer or an adhesive coating, attaching the magnetic shielding layer with void (MSL: 842, ferrite or non-ferrite material) to the front face continuous metal layer (CML: 830);

842: High permeability magnetic shielding layer (MSL) with void having a thickness of 50 μm, 65 μm, 75 μm or 100 μm which may compose of the following: calcium carbonate ($CaCO_3$), silicon dioxide ($SiO_2$), magnesium fluoride ($MgF_2$), SiO2, chromium (Cr) and iron (Fe), to offset the effects of electromagnetic shielding caused by the front face metal layer (CML: 830) and having a booster antenna circuit (BAC: 844) assembled to its face downside by means of an adhesive spacing layer (ASL: 843);

868A: Thermosetting resin 40 μm (epoxy or polyurethane) encapsulating the magnetic shielding layer (MSL: 842) and filling the void in the magnetic shielding layer and the laser-cut module opening (MO: 812);

843: Adhesive spacing layer (ASL: 25 μm), a layer of thermosetting adhesive film joining by way of press lamination the top subassembly to the bottom subassembly;

844: Open or closed loop booster antenna circuit (chemically etched copper tracks, plated copper tracks, conductive printed tracks or equivalent) attached to the high permeability magnetic shielding layer (MSL: 842), low magnetic loss ferrite layer (50 μm, 65 μm, 75 μm or 100 μm in thickness) by means of an adhesive spacing layer (ASL: 843) (50 μm), with the booster antenna circuit (BAC) comprising of a perimeter coil (844A), a coupler coil (844C) and a set of parallel plate trimming capacitors (844D, capacitor bank for tuning), with the booster antenna circuitry (BAC) being assembled on a PET carrier layer (844B, 23 μm) having a top antenna layer (perimeter coil with 10-13 windings (copper track width: 150-300 μm, spacing between tracks: 100 μm, copper track thickness: 18 μm), vertical interconnects and the upper capacitor plate electrodes) with said top antenna layer facing the magnetic shielding layer (MSL: 842), and having a bottom antenna layer (coupler coil (844C) with 10-15 windings (copper track width: 100-150 μm, spacing between tracks: 100 μm, copper track thickness: 18 μm), connection jumpers and the lower capacitor plate electrodes) with said bottom antenna layer facing the rear metal layer (DML: 850) acting as a one turn (RLC) antenna circuit;

Notably, the arrangement of the perimeter coil (844A) and the coupler coil (844C) on the PET carrier layer (844B) being respectively positioned on the top and bottom surfaces thereof may be interchanged or portions of their antenna structures may be located on both sides of the carrier layer;

848: Inter-coat 25 μm, an adhesion promoter in the form of a primer, an adhesive coating or an adhesive film with a thickness to insulate the copper plated tracks and circuitry on the PET carrier layer (844B) from the rear metal layer (DML: 850);

850: Rear discontinuous metal layer (DML) with a laser-cut module opening (MO: 814) and a slit (S: 820) having a thickness of approximately 152 μm (6 mils) is attached to the rear synthetic layers by an inter-coat 858;

858: Top inter-coat 10 μm, an adhesion promoter in the form of a primer or an adhesive coating, applied to underside (backside) of the rear discontinuous metal layer (DML: 850);

868B: Thermosetting resin 40 μm (epoxy or polyurethane) encapsulating the underside of the discontinuous metal layer (DML: 850) filling the laser-cut module opening (MO: 814) and the slit (S: 820);

858: Bottom inter-coat 10 μm, an adhesion promoter in the form of a primer, an adhesive coating or an adhesive film, attaching the encapsulated rear metal layer (DML: 850) to the top side of the synthetic layer (860);

860: Transparent, translucent, white or colored synthetic layer (e.g. PVC, PC, PETG), typically having a thickness of 125 μm;

862 primer;

864 ink (printed information (PI)), typically having a combined thickness of 16 μm;

The position of 862 and 864 may be interchangeable depending on the printing process.

870: Laser engravable overlay layer (PVC) typically having a thickness of 60 μm;

874: Magnetic stripe mounted to the rear overlay layer 870;

876: Operation of laser marking to the rear overlay layer 870 with personalization data; and Security elements (signature panel and hologram) are not shown.

FIG. 8B shows a smartcard (SC: 800) having a booster antenna circuit (BAC), comprising the following main portions:

a top protective portion comprising hard coat, ink and primer (823, 824, 825, 826, 827)

a front face metal portion;

a supporting metal portion; and a bottom portion comprising rear printed stock (860, 862, 864, 870).

The smartcard (SC: 800) is a metal face smartcard similar to the metal face smartcard having two discontinuous metal layers which was shown in FIGS. 7A, 7B.

Method and apparatus will be described.

The front face metal portion of the smartcard, between the dashed lines "a" and "b" comprises:

a metal layer (ML: 830) which is a continuous metal layer (ML, CML) having a module opening (MO: 812, P1). The metal layer 830 does not have a slit (compare 720A);

magnetic shielding material (842) disposed below the metal layer (ML);

an inter-coat (838) disposed between the bottom surface of the metal layer (ML) and the magnetic shielding material;

thermosetting resin (TR: 868A) covering inter-coat (738) on the bottom surface of the metal layer (ML) and filling the module opening (MO) and slit (S).

The magnetic shielding material (842) may be a layer of ferrite or non-ferrite material having a void corresponding with the module opening (MO: 812) in the metal layer (830) and prevents the continuous metal layer from attenuating radio frequency (RF) signals passing between the card and an external reader (such as a POS terminal) when the back of the card is presented to the reader.

The thermosetting resin (858A) may be applied to the magnetic shielding layer (842) with or without a primer. Alternatively, the magnetic shielding layer (842) may be disposed below the thermosetting resin (868A), rather than above it (as shown). Alternatively, the magnetic shielding layer (842) may be disposed on the adhesive layer (843) (between dashed lines "b" and "c"), rather than above or below the thermosetting resin (868A).

The layer of thermosetting resin on the bottom surface of the continuous metal layer (830), and filling the module opening, may be applied by a process of coating, over-molding, casting, reaction injection molding (RIM), or the like. In order to facilitate the process, a sacrificial layer (SL: 809A) is applied on the top surface of the continuous metal layer (830), covering the module opening (MO), to retain the thermosetting resin in the module opening, with a top surface of the thermosetting resin being substantially coplanar with the top surface of the metal layer. The sacrificial layer may comprise polytetrafluoroethylene (PTFE, Teflon® or polyolefin backing film. The sacrificial layer will be removed after the thermosetting resin is sufficiently cured to remain in the module opening, without leaking (bulging) out. The inter-coat (838) applied to the bottom surface of the metal layer promotes adhesion of the thermosetting resin (868A) and the magnetic shielding material (842) on the back side of the continuous metal layer (730).

The supporting metal portion of the smartcard, between the dashed lines "c" and "d" may be the same as the supporting metal portion shown in FIG. 7B, and comprises:
- a metal layer (ML: 850) which is a discontinuous metal layer (ML, DML) having a module opening (MO: 814, P2) and a slit (S: 820);
- an inter-coat (858) covering the bottom surface of the discontinuous metal layer; and
- thermosetting resin (TR: 868B) covering the inter-coat (858) on the bottom surface of the discontinuous metal layer and filling the module opening and slit.

The layer of thermosetting resin on the bottom surface of the metal layer (850), and filling the module opening and slit, may be applied by a process of coating, over-molding, casting, reaction injection molding (RIM), or the like. In order to facilitate the process, a sacrificial layer (SL: 809B) is applied on the top surface of the metal layer (850), covering the module opening (MO) and slit (S), to retain the thermosetting resin in the module opening and slit, with a top surface of the thermosetting resin being substantially coplanar with the top surface of the metal layer.

The sacrificial layer may comprise polytetrafluoroethylene (PTFE, Teflon® or polyolefin backing film. The sacrificial layer will be removed after the thermosetting resin is sufficiently cured to remain in the module opening and slit, without leaking (bulging) out. The inter-coat (858) applied to the bottom surface of the metal layer promotes adhesion of the thermosetting resin (868B) and the metal layer.

Regarding the processes of applying the thermosetting resin on the bottom surfaces of the metal layers (830, 850), injection molding is a problem because of the high temperature and pressure required. Other processes, such as Reaction Assisted Molding Process (RAMP) may be suitable. RAMP is already being used to encapsulate electronics into smart cards without requiring the traditional layering manufacturing process. Reference may be made to https://www.plasticsnet.com/doc/first-reaction-injection-molding-now-reaction-0001

This results in a front face metal component (between the dashed lines "a" and "b") comprising a metal layer (830) coated on its bottom surface by thermosetting resin (and with magnetic shielding material), and having the module opening filled with thermosetting resin. (The sacrificial layer 809A is part of the process, is removed before laminating, and is not part of the resulting front face metal component.)

This results in a supporting metal component (between the dashed lines "c" and "d") comprising a metal layer (850) coated on its bottom surface by thermosetting resin, and having the module opening and slit filled with thermosetting resin. (The sacrificial layer 709B is part of the process, is removed, and is not part of the resulting front face metal component.)

The thermosetting resin layers are cured.

In FIG. 7B, an adhesive layer (743A) between the dashed lines "b" and "c" is disposed between the front face metal component (between the dashed lines "a" and "b") and the supporting metal component (between the dashed lines "c" and "d").

In FIG. 8B, a booster antenna circuit (BAC: 844) is disposed is disposed between the front face metal component (between the dashed lines "a" and "b") and the supporting metal component (between the dashed lines "c" and "d"). An adhesive layer (843) may be disposed on a front (top) surface of the booster antenna circuit. A layer (848) of adhesive and inter-coat may be disposed on a back (bottom) surface of the booster antenna circuit.

The supporting metal component (between the dashed lines "c" and "d"), front face metal component (between the dashed lines "a" and "b") and may be joined with the layers of adhesive and inter-coat using a process such as press lamination.

The module openings (812, P1) and (814, P2), filled with thermosetting resin, may then be machined (milled) to accept insertion of a module (TCM, ICM). The module opening may be slightly larger than the module, so that the module does not contact the sides of the module opening of the metal layer. Also, the module will rest upon the thermosetting resins (868A, 868B).

The module typically has a front portion supporting contact pads on its front surface and a module antenna on its rear surface, and has a rear portion supporting the chip. The front portion of the module is typically larger (in area) than the rear portion of the module. The "P1" opening in the front face metal layer (830) is sized to receive the front (contact pads) portion of the module. The "P2" opening in the supporting metal layer (850) is sized to receive the rear (chip) portion of the module.

In a subsequent fabrication step, the front printed stock and rear printed stock may be laminated with elevated pressure and temperature to the upper and lower encapsulated metal layers, with the module implanted after lamination.

FIG. 8C shows the stack-up construction of the subassembly (between dashed lines "a" and "b") as depicted in FIG. 8B, comprising a sacrificial layer (SL: 809A) of polyolefin backing film, a front (continuous) metal layer (FML: 830) with an array (16-up format) of card body sites with a laser-cut module opening (MO: 812) wherein each card body site is supported by metal struts with laser-cut void sections between struts; an inter-coat layer (838) acting as an adhesion promoter in the form of a primer or an adhesive coating bonding the front metal layer (FML: 830) to an underlying magnetic shielding layer (MSL: 842); the magnetic shielding layer (MSL: 842) having an array of card body sites (16-up) with a module opening (void) wherein at each site in the array the shielding material is supported by side struts with void sections between the struts; and the assembly is encapsulated with thermosetting resin (868A) with the voids filled with resin, applied by a method of pressure molding, coating, reaction injection molding, or any similar production technique.

FIG. 8D shows the stack-up construction of the subassembly (between dashed lines "c" and "d") as depicted in FIG. 8B, comprising a sacrificial layer (SL: 809B) of polyolefin backing film, a rear (discontinuous) metal layer (RML: 850) with an array (16-up format) of card body sites with a laser-cut module opening (MO: 814) and a slit (S: 820) wherein each card body site is supported by metal struts with laser-cut void sections between struts; an inter-coat layer (858) acting as an adhesion promoter in the form of a primer or an adhesive coating to enhance the bonding of the rear metal layer (RML: 850) to the layer of thermosetting resin (868B); and the assembly is encapsulated with said thermosetting resin (868B) filling any voids and openings with resin, applied by a method of pressure molding, coating, reaction injection molding, or any similar production technique.

FIG. 8E shows the subassemblies "a to b" as shown in FIG. 8C, and "c to d" as shown in FIG. 8D, with a center component section "b to c" as presented in FIG. 8B ready for press lamination with the subassemblies. The adhesive attachment of the components (booster antenna circuit (BAC: 844)) to the front and rear subassemblies ("a to b" & c to d) is achieved by the adhesive spacing layer (ASL: 843) a layer of thermosetting adhesive film and an inter-coat layer (848) in the form of a primer, an adhesive coating or an adhesive film.

Pressure Molding Encapsulation of a Metal Inlay

The urethane pressure molding method involves a low filling pressure and an exothermic chemical reaction, producing an encapsulated metal inlay with both thick and thin sections of thermoset resin (polyurethane).

The pressure molding takes place in a sealed chamber. The chamber is held at either high pressure or in a vacuum, helping to eliminate air bubbles in the thermoset resin encapsulating the metal inlay.

At a basic level, pressure molding is about using a time-sensitive chemical reaction under temperature control to cure a liquid into a solid. The chemical reaction is initiated when the raw ingredients of the thermoset resin, consisting of a polyol component (resin) and an isocyanate component (hardener), are mixed together. The thermoset resin mix is poured into a mold and fills all of the mold's details before it becomes too viscous. The thermoset resin (polyurethane) cures and the solid (resin encapsulated metal inlay) is removed from the mold.

FIG. 9A is a front view diagram of a 16-up metal inlay with each card body site supported by corner struts with void sections between struts, similar to the prior art in FIG. 5 (FIG. 16 of U.S. Ser. No. 17/882569 (ML 029)), and each card body site in the metal inlay provided with a laser-cut module opening.

FIG. 9B is an exploded view of a card body site supported by a corner strut from the 16-up metal inlay array in FIG. 9A.

FIG. 9C is a front view diagram of a layer of magnetic shielding (ferrite or non-ferrite material) having an array of card body sites with a module opening at each site in the 16-up format, with each card body site in the array suspended by supporting struts and between struts void sections around all four edges, wherein the card body site of magnetic shielding material is sized slightly smaller than ISO 7810 card dimensions (ID-1) so that after final lamination of the card stack-up construction the magnetic shielding layer does not protrude to all four sides of the metal transaction card except in the areas of the supporting struts.

FIG. 9D is an exploded view of a card body site supported by multiple struts from the 16-up array of magnetic shielding material in FIG. 9C.

FIG. 9E is a diagram, enlarged view, of a single card body site of magnetic shielding material from the array of card body sites presented in FIG. 9C, with the card body of magnetic shielding sized slightly smaller than ISO card dimensions and suspended by 10 struts on the straight edges and corners for mechanical stability during handling and processing, ready for assembly to a front face metal layer and or for encapsulation with a thermosetting resin.

FIG. 9F is a perspective view of a metal inlay (front layer) with an array of card body sites supported by corner struts in the 16-up format and an underlying magnetic shielding layer (rear layer) with a corresponding array of card body sites of magnetic shielding supported by multiple struts.

FIG. 9G is detailed view of the area around a corner strut after adhesive attachment of the magnetic shielding layer to the metal inlay, illustrating that the magnetic shielding material does not extend to the edges of the metal card body, accept at the position of the struts.

In an embodiment of the invention, the magnetic shielding material in a 16-up format may be first encapsulated with thermosetting resin through the process of coating or casting, before laminating the 16-up front metal layer to the resin encapsulated magnetic shielding layer after curing using a thermosetting adhesive film for bonding. Equally, the array of booster antenna circuits in a 16-up format may be encapsulated with thermosetting resin through the process of coating or casting, before laminating the 16-up rear metal layer to the resin encapsulated array of booster antenna circuits using a thermosetting adhesive film for bonding. In a further step, the two encapsulated subassemblies may be laminated together with other synthetic layers to complete the stack-up construction.

In an embodiment of the invention, the thermosetting resin may be used to space (50 µm) the magnetic shielding layer (MSL) from the booster antenna circuit (BAC) replacing the adhesive spacing layer (ASL).

In their various embodiments, the invention(s) described herein may relate to payment smartcards (metal, plastic or a combination thereof), electronic credentials, identity cards, loyalty cards, access control cards, and the like.

While the invention(s) may have been described with respect to a limited number of embodiments, these should not be construed as limitations on the scope of the invention(s), but rather as examples of some of the embodiments of the invention(s). Those skilled in the art may envision other possible variations, modifications, and implementations that are also within the scope of the invention(s), and claims, based on the disclosure(s) set forth herein.

What is claimed is:

1. A smartcard (SC) comprising:
   a first metal layer (ML) having a top surface, a bottom surface, and a module opening (MO) extending between the top and bottom surfaces for receiving a transponder chip module (TCM); and
   a first layer of thermosetting resin encapsulating the bottom surface of the first metal layer and filling the module opening of the first metal layer;
   further comprising:
   a second metal layer (ML) having a top surface, a bottom surface, and a module opening (MO) extending between the top and bottom surfaces for receiving the transponder chip module; and
   a second layer of thermosetting resin disposed on the bottom surface of the second metal layer and into the module opening of the second metal layer.

2. The smartcard (SC) of claim 1, further comprising:
   a first layer of inter-coat disposed between the first layer of thermosetting resin and at least the bottom surface of the first metal layer.

3. The smartcard (SC) of claim 1, further comprising:
a second layer of thermosetting resin encapsulating the top surface of the first metal layer.

4. The smartcard (SC) of claim 1, wherein:
the first metal layer is a discontinuous metal layer having a slit(S); and
the first layer of thermosetting resin encapsulates the bottom surface of the first metal layer also fills the slit in the first metal layer.

5. The smartcard (SC) of claim 1, further comprising:
a second layer of inter-coat disposed between the second layer of thermosetting resin and the bottom surface of the second metal layer.

6. The smartcard (SC) of claim 1, wherein:
the second metal layer is a discontinuous metal layer having a slit(S); and
the second layer of thermosetting resin on the bottom surface of the second metal layer also fills the slit in the second metal layer.

7. The smartcard (SC) of claim 1, wherein:
the second metal layer is a continuous metal layer, not having a slit(S).

8. The smartcard (SC) of claim 7, further comprising:
a booster antenna circuit (BAC) disposed between the second continuous metal layer and the first discontinuous metal layer; and
magnetic shielding material disposed between the second continuous metal layer and the booster antenna circuit.

9. The smartcard of claim 8, wherein:
the second layer of thermosetting resin separates the booster antenna circuit a given distance from the magnetic shielding layer to achieve optimum shielding and RF functionality.

10. The smartcard (SC) of claim 1, further comprising:
an adhesive layer disposed between the first resin encapsulated metal layer and the second resin encapsulated metal layer.

11. The smartcard (SC) of claim 1, wherein:
the transponder chip module is a dual-interface module.

* * * * *